United States Patent
Wadlow et al.

(10) Patent No.: US 12,527,694 B2
(45) Date of Patent: Jan. 20, 2026

(54) STRAINED SKIN TREATMENT DEVICES AND METHODS

(71) Applicant: Neodyne Biosciences, Inc., Fremont, CA (US)

(72) Inventors: Philip James Wadlow, Campbell, CA (US); Jasper Jackson, Newark, CA (US); Kelley J. Lipman, Livermore, CA (US); Reuben Elmar Lasrado, Mangalore (IN); William James Van Syoc, Los Altos, CA (US); John A. Zepeda, Los Altos, CA (US)

(73) Assignee: Neodyne Biosciences, Inc., Fremont, CA (US)

( * ) Notice: Subject to any disclaimer, the term of this patent is extended or adjusted under 35 U.S.C. 154(b) by 214 days.

(21) Appl. No.: 18/179,270

(22) Filed: Mar. 6, 2023

(65) Prior Publication Data
US 2023/0285201 A1    Sep. 14, 2023

Related U.S. Application Data

(60) Provisional application No. 63/317,839, filed on Mar. 8, 2022.

(51) Int. Cl.
*A61F 13/02* (2024.01)
*A61F 13/00* (2006.01)

(52) U.S. Cl.
CPC ...... *A61F 13/0289* (2013.01); *A61F 13/0266* (2013.01); *A61F 2013/0028* (2013.01)

(58) Field of Classification Search
CPC .. A61F 13/02; A61F 13/023; A61F 13/01038; A61F 13/0236; A61F 13/0276; A61F 13/0289; A61F 13/0266; A61F 2013/0028; A61L 27/60; A61L 27/54
See application file for complete search history.

(56) References Cited

U.S. PATENT DOCUMENTS

| | | | |
|---|---|---|---|
| 5,516,274 A * | 5/1996 | Maggert | B29C 31/006 425/534 |
| 2006/0037091 A1 | 2/2006 | Gurtner et al. | |
| 2011/0152738 A1 * | 6/2011 | Zepeda | A61L 15/26 602/53 |
| 2013/0110026 A1 * | 5/2013 | Jackson | A61F 13/00995 602/53 |
| 2019/0083321 A1 | 3/2019 | Rule et al. | |

FOREIGN PATENT DOCUMENTS

| | | |
|---|---|---|
| CN | 209351695 U | 9/2019 |
| CN | 119212656 A | 12/2024 |
| EP | 4489706 A2 | 1/2025 |

OTHER PUBLICATIONS

Extended European Search Report issued in European Patent Application No. 23767590.5, mailed on Aug. 1, 2025, 7 pages.
International Preliminary Report on Patentability issued in International Application No. PCT/US2023/063794, issued on Sep. 19, 2024, 9 pages.
International Search Report and Written Opinion issued in International Application No. PCT/US2023/063794, mailed on Nov. 2, 2023, 12 pages.

\* cited by examiner

*Primary Examiner* — Vishal I Patel
(74) *Attorney, Agent, or Firm* — Dorsey & Whitney LLP

(57) ABSTRACT

Devices, kits and methods described herein may include a dressing that is pre-strained and stored for a period of time after which the dressing is applied to the skin of a subject.

8 Claims, 37 Drawing Sheets

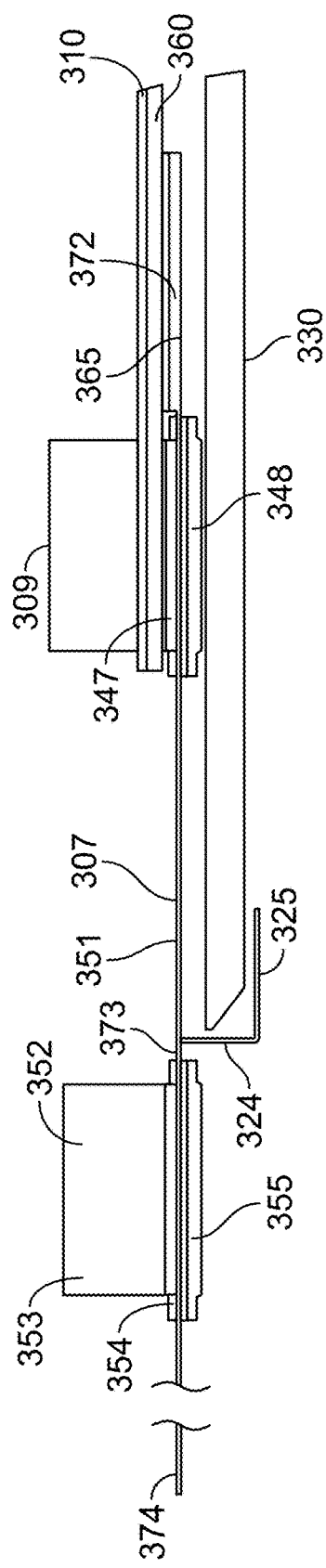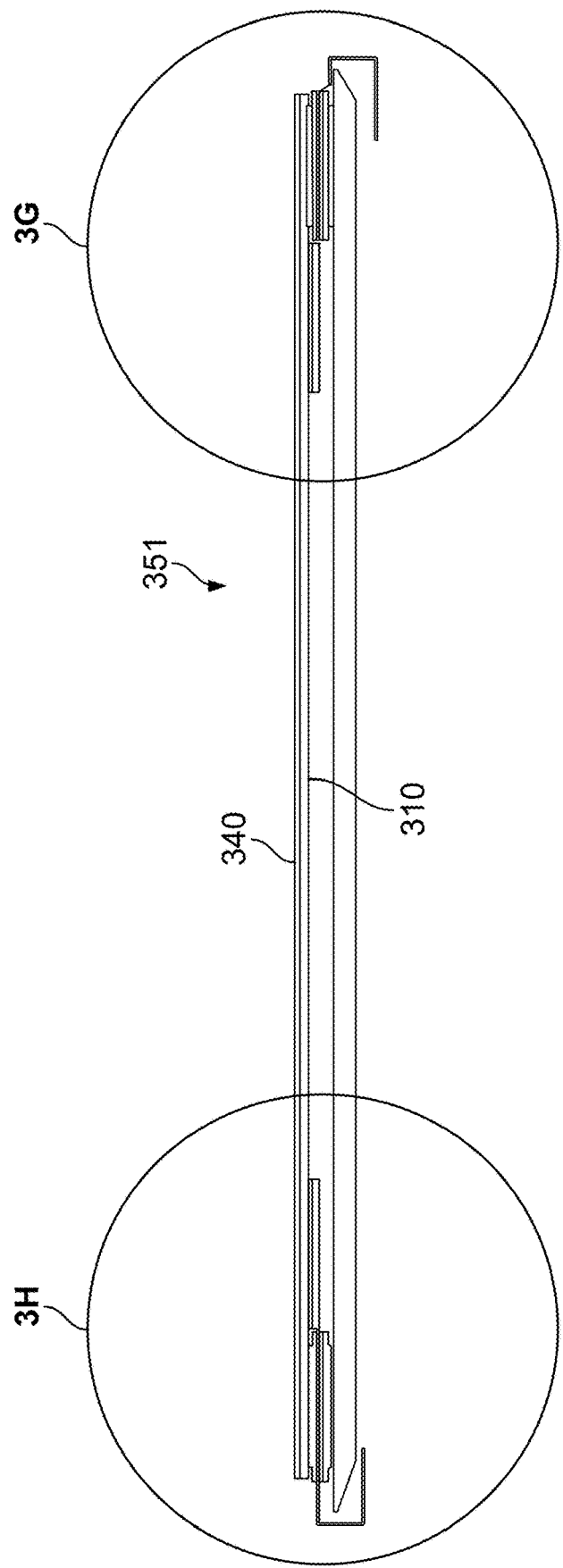
FIG. 3E
FIG. 3F

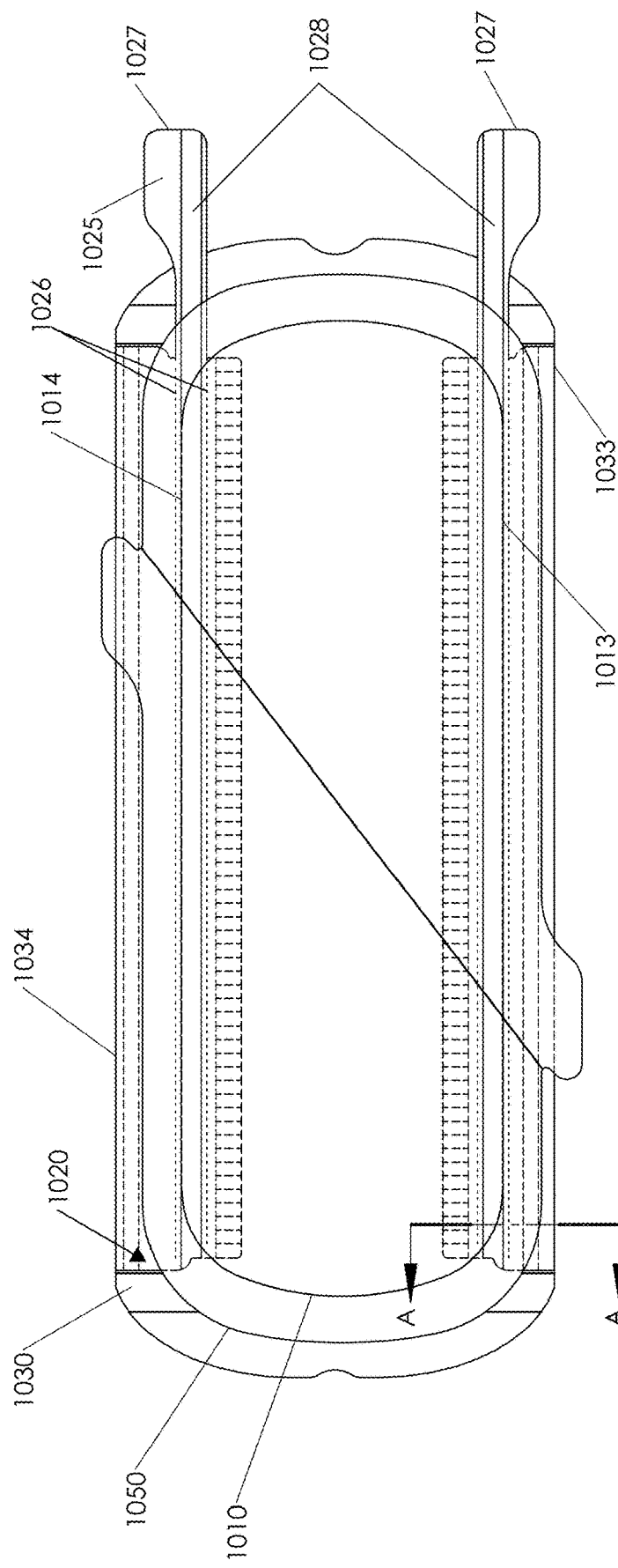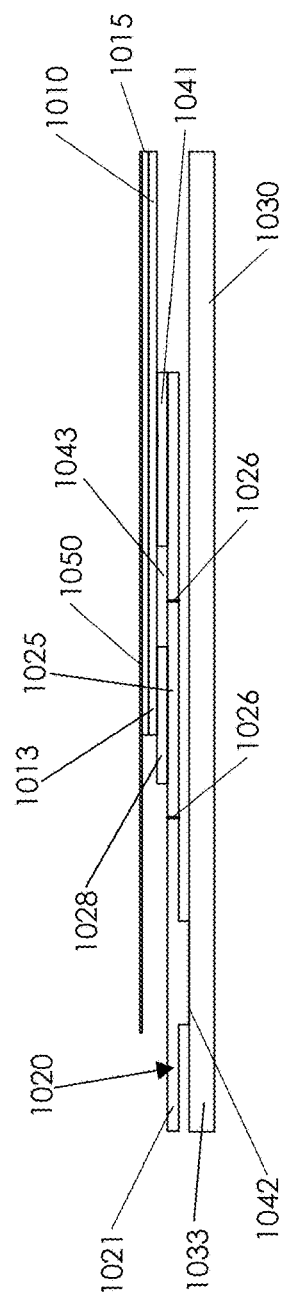
FIG. 10A
FIG. 10B

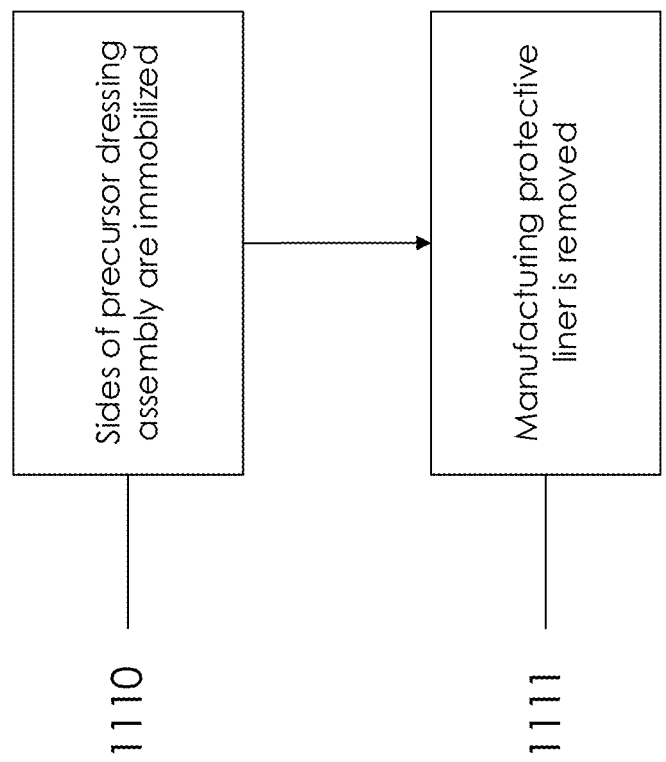

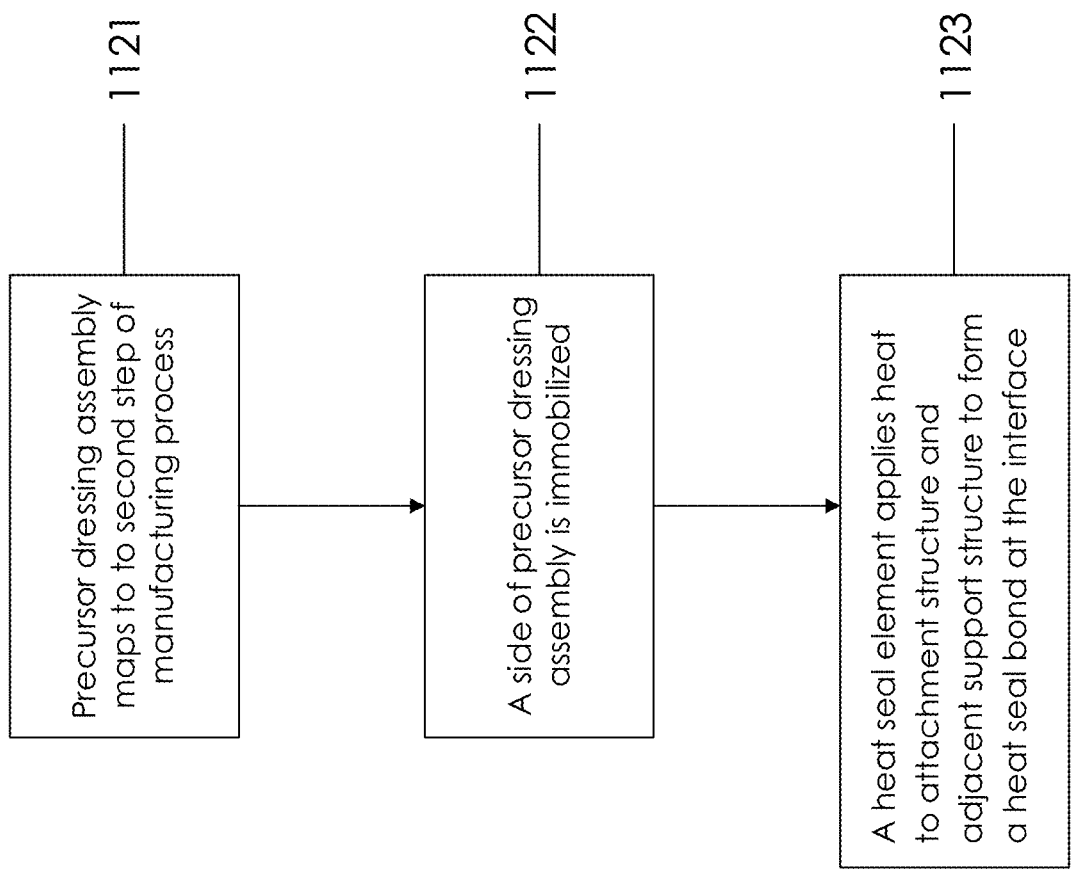

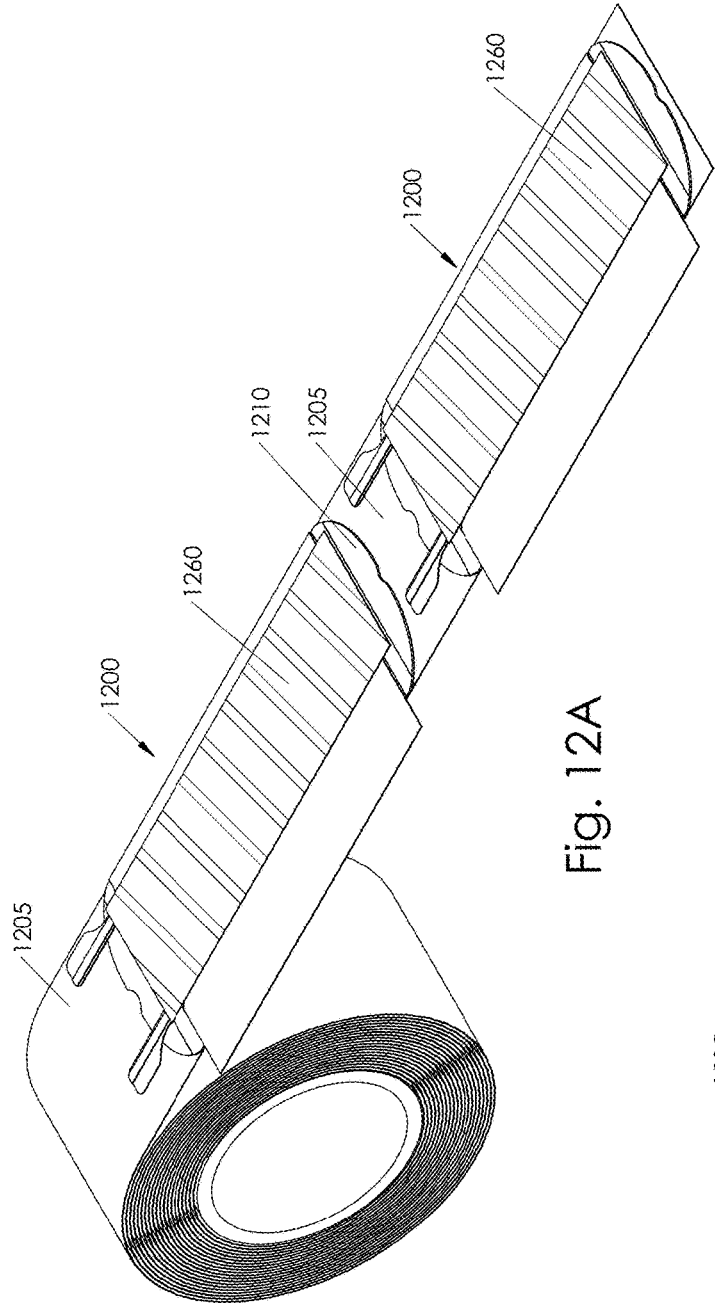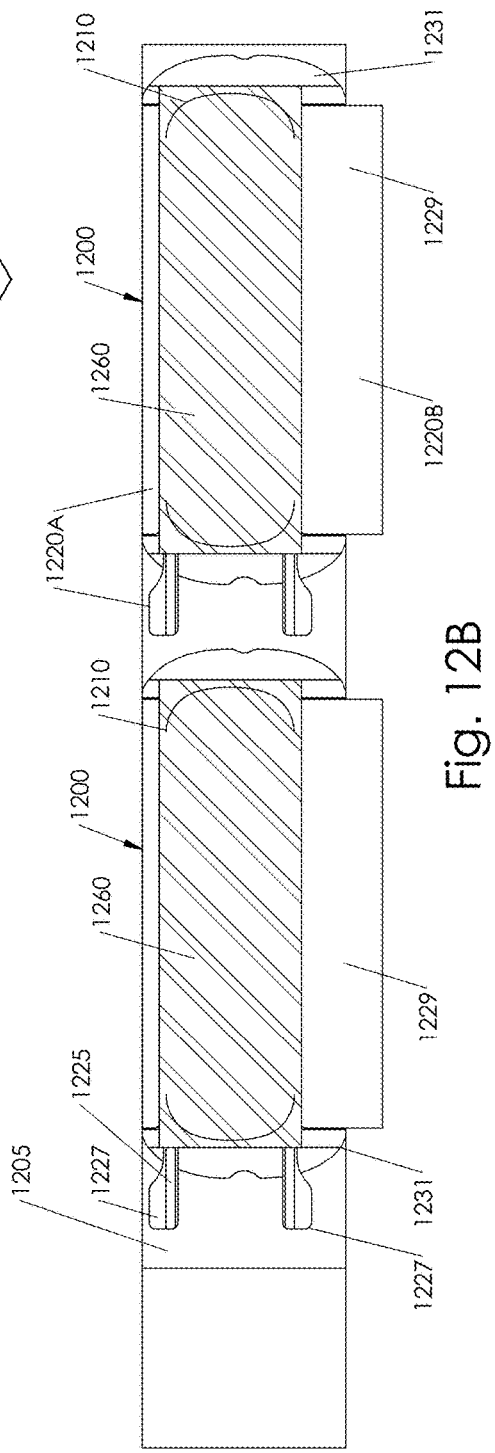
Fig. 12A
Fig. 12B

STRAINED SKIN TREATMENT DEVICES AND METHODS

CROSS-REFERENCE TO RELATED APPLICATIONS

This application claims priority to U.S. Provisional Patent Application No. 63/317,839, filed Mar. 8, 2022, entitled "STRAINED SKIN TREATMENT DEVICES AND METHODS", which is incorporated by reference herein, in its entirety and for all purposes.

This application is related to U.S. application Ser. No. 13/552,521, filed on Jul. 18, 2012, which is incorporated by reference in its entirety.

BACKGROUND

Scar formation in response to cutaneous injury is part of the natural wound healing process. Wound healing is a lengthy and continuous process, although it is typically recognized as occurring in stages. The process begins immediately after injury, with an inflammatory stage. During this stage, which typically lasts from two days to one week (depending on the wound), damaged tissues and foreign matter are removed from the wound. The proliferative stage occurs at a time after the inflammatory stage and is characterized by fibroblast proliferation and collagen and proteoglycan production. It is during the proliferative stage that the extracellular matrix is synthesized in order to provide structural integrity to the wound. The proliferative stage usually lasts about four days to several weeks, depending on the nature of the wound, and it is during this stage when hypertrophic scars usually form. The last stage is called the remodeling stage. During the remodeling stage the previously constructed and randomly organized matrix is remodeled into an organized structure that is highly cross-linked and aligned to increase mechanical strength.

While the histological features characterizing hypertrophic scars have been well documented, the underlying pathophysiology is not well known. Hypertrophic scars are a side effect of excessive wound healing, and generally result in the overproduction of cells, collagen, and proteoglycans. Typically, these scars are raised and are characterized by the random distribution of tissue bundles. The appearance (i.e., size, shape, and color) of these scars varies depending on the part of the body in which they form, and the underlying ethnicity of the person affected. Hypertrophic scars are very common, and may occur following any full thickness injury to the skin. Recently, it has been shown in U.S. Patent Application Publication 2006/0037091 (U.S. patent application Ser. No. 11/135,992 entitled "Method for Producing Hypertrophic Scarring Animal Model for Identification of Agents for Prevention and Treatment of Human Hypertrophic Scarring," filed May 24, 2005) which is hereby incorporated by reference in its entirety, that mechanical stress may increase hypertrophic scarring in a murine model.

Keloids are typically characterized as tumors consisting of highly hyperplastic masses that occur in the dermis and adjacent subcutaneous tissue in susceptible individuals, most commonly following trauma. Keloids are often more severe than hypertrophic scars, since they tend to invade normal adjacent tissue, while hypertrophic scars tend to remain confined within the original scar border.

BRIEF SUMMARY

Devices, kits and methods described herein may be for skin treatment where it is desirable to manipulate, or alter inherent or endogenous stresses within skin and/or to control or manipulate an effect of exogenous stresses on skin. Such treatment may include, but is not limited to wound treatment or the treatment, amelioration, or prevention of scars and/or keloids and/or treat wound dehiscence. According to the devices, kits and methods described herein, a device may be attached to or coupled to one or more layers of the skin or tissue of a subject.

In one variation, a skin treatment device is provided, comprising: a dressing comprising a pre-strained elastic member coupled to a strain maintaining structure, wherein the strain maintaining structure is configured to maintain the elastic member in a strained configuration, and wherein the pre-strained elastic member is configured to maintain at least a desired amount of tensile force for a predetermined period of time after an initial straining period of time. In some variations, the initial straining period of time is more than about 24 hours, or more than about one week. In other variations, the predetermined period of time may be at least twelve weeks, at least 24 weeks, or at least 52 weeks. The elastic member may exhibit less than about 5%, 15%, or 25% loss of force during the predetermined time period. In some variations, the elastic member may exhibit at least about 25% or 35% loss, 40% loss, 45% loss or more of force during the initial period. In some examples, the elastic member may exhibit a greater percentage loss of force during the initial period than during the predetermined period of time.

In another variation, a skin treatment device assembly is provided, comprising a dressing comprising an elastic member, a support structure configured to be removably coupled to the pre-strained dressing and configured to maintain the pre-strained dressing in a strained configuration; a straining element configured to pre-strain the dressing, wherein the straining element is configured to be removably coupled to the support structure, a releasable locking element configured to maintain the pre-strained dressing in strain maintaining engagement with the support structure; and a release mechanism configured to release the dressing from the support structure.

In another variation, a skin treatment device assembly is provided, comprising a dressing comprising an elastic member; a straining element configured to couple to the dressing; to prestrain the dressing and to uncouple from the dressing; a support structure configured to be removably coupled to the dressing to maintain the dressing in a prestrained configuration after the dressing is uncoupled from the straining element.

In still another variation, a method of manufacturing a dressing is provided, comprising straining a dressing a predetermined amount with a straining element, coupling the dressing in a strained configuration in a releasable locking engagement to a removable strain maintaining element to form a pre-strained assembly comprising the dressing and strain maintaining element, and removing the straining element from the pre-strained assembly.

In another variation, a method of manufacturing a pre-strained dressing is provided, comprising straining a dressing to an initial tensile force amount greater than a desired tensile force amount desired when a dressing is to be applied to the skin of a subject, and coupling the strained dressing to a removable strain maintaining device, and suggesting a period of use of the dressing during a period of time when the tensile force amount is predicted to diminish a desired reduced amount. The desired reduced amount may be reduced about 25%, 35%, 40% 45%, or more than the initial tensile force. The desired reduced amount may be reduced less than 25% than the initial tensile force.

In one variation, a skin treatment device is provided, comprising a pre-strained polymeric structure, and an unstrained adhesive layer attached to the pre-strained polymeric structure. The skin treatment device may further comprise a release liner attached to the unstrained adhesive layer. The pre-strained polymeric structure and the unstrained adhesive layer may be located within a sealed package. The sealed package may be a sterilized sealed package.

In another variation, a method of manufacturing a skin treatment device is provided, comprising straining an elastic polymeric structure with a removable straining structure, and applying an unstrained adhesive layer to a surface of the elastic polymeric structure and removing the straining structure. The method may further comprise attaching a release liner to the unstrained adhesive layer. The method may also further comprise enclosing the elastic polymeric structure and the unstrained adhesive layer in a sealed packaging structure, and optionally sterilizing the sealed packaging structure.

In one variation, a skin treatment device is provided comprising: a pre-strained polymeric structure, an adhesive layer attached to the pre-strained polymeric structure, and an unstrained release liner attached to the adhesive layer.

In another variation, a method of manufacturing a skin treatment device is provided, comprising straining an elastic polymeric structure, applying an adhesive layer to a surface of the elastic polymeric structure, and applying a release liner to the adhesive layer after straining the elastic polymeric structure.

In one embodiment, a strained treatment device is provided, comprising a strained elastic dressing, an adhesive layer located on a surface of the elastic dressing, a support structure, comprising a polycoated paperboard with a Taber Stiffness of at least 160, two or more attachment structures located between the strained elastic dressing and the support structure, the attachment structures comprising flexible inelastic strips, wherein the attachment structures are adhered to the dressing by an high shear adhesive and are thermally bonded to the polycoat of the paperboard, wherein an area of the thermal bond has a width in the range of 0.10" to 0.25". The length of the area of the thermal bond may be equal to or greater than a length of the adhesive bond between the attachment structure and the dressing.

In another embodiment, a method of making a strained treatment device is provided, comprising attaching a device carrier to a precursor dressing assembly, removing a manufacturing liner from the precursor dressing assembly, heat melting a first region of the dressing to a first region of a support structure, straining the dressing and heat melting a second region of the dressing in a strained configuration to a second region of the support structure, and applying an adhesive liner. The dressing may further comprise a first and second attachment structures. The method may further comprise attaching a straining element to the dressing, and pulling the straining element away from the first region of the dressing to strain the dressing. The method may further comprise lifting the straining element before pulling the straining element, and lowering the straining element after pulling the straining element. Attaching the straining element to the dressing may occur after the heat melting of the first region. Heat melting the first and second regions of the dressing may be located in on the first and second attachment structures. The first and the second attachment structures may each comprise two lengths of perforations spaced apart from each other. The heat melting of the first and second regions may be performed lateral to the two lengths of perforations on each of the attachment structures.

In another embodiment, a manufacturing assembly is provided, comprising a transport assembly to move a plurality of components along a movement path, a first clamp assembly configured to reversibly clamp together a first side of a subset of the plurality of components, a first heat melt assembly configured to heat melt the subset of the plurality of components together, adjacent to the first side of the subset of the plurality of components, a straining assembly, comprising a second clamp assembly configured to reversibly clamp together a second side of the subset of the plurality of components, a first separation assembly, configured to reversibly displace the second clamp assembly, and a second assembly, configured to reversibly displace the straining assembly away from the first clamp assembly, and a second heat melt assembly configured to heat melt the subset of the plurality of components together, adjacent to the second side of the subset of the plurality of components. The first clamp assembly and the second clamp assembly may be configured to clamp in a first direction. The first separation assembly may be configured to lift the second clamp assembly in a second direction opposite the first direction. The second separation assembly may be configured to displace the straining assembly in a third direction orthogonal to the first direction. The assembly may further comprise a third clamp assembly configured to reversibly clamp together the subset of the plurality of components, wherein the third clamp assembly is located between the first clamp assembly and the second clamp assembly. The third clamp assembly may be located between the first clamp assembly and the second heat melt assembly. The assembly may further comprise a cutting assembly configured to cut the subset of the plurality of components. The cutting assembly may be configured to cut the subset of the plurality of components near the second side of the subset of the plurality of components.

In still another embodiment, a straining assembly or subassembly is provided, comprising a first clamp assembly configured to reversibly clamp together a second side of the subset of the plurality of components, a first separation assembly, configured to reversibly displace the second clamp assembly, a second assembly, configured to reversibly displace the straining assembly away from the first clamp assembly, and a first heat melt assembly configured to heat melt the subset of the plurality of components together, adjacent to the second side of the subset of the plurality of components.

BRIEF DESCRIPTION OF THE DRAWINGS

FIG. 3E is an enlarged, schematic, detailed side view of a portion of the dressing and support structure of FIG. 3D.

FIG. 3F is a schematic side view of the dressing assembly and support structure in a pre-strained configuration.

FIG. 10A is a top view of a pre-strained assembly.

FIG. 10B is a cross section of FIG. 10A along the lines A-A.

FIG. 11B is a flow chart illustrating a process for removing a manufacturing liner.

FIG. 11C is a flow chart illustrating a process for securing a dressing to a support structure.

FIG. 12A is a top perspective view of a roll of dressing pre-assemblies.

FIG. 12B is a top view of dressing pre-assemblies of FIG. 12A.

DETAILED DESCRIPTION

Figure 1A:
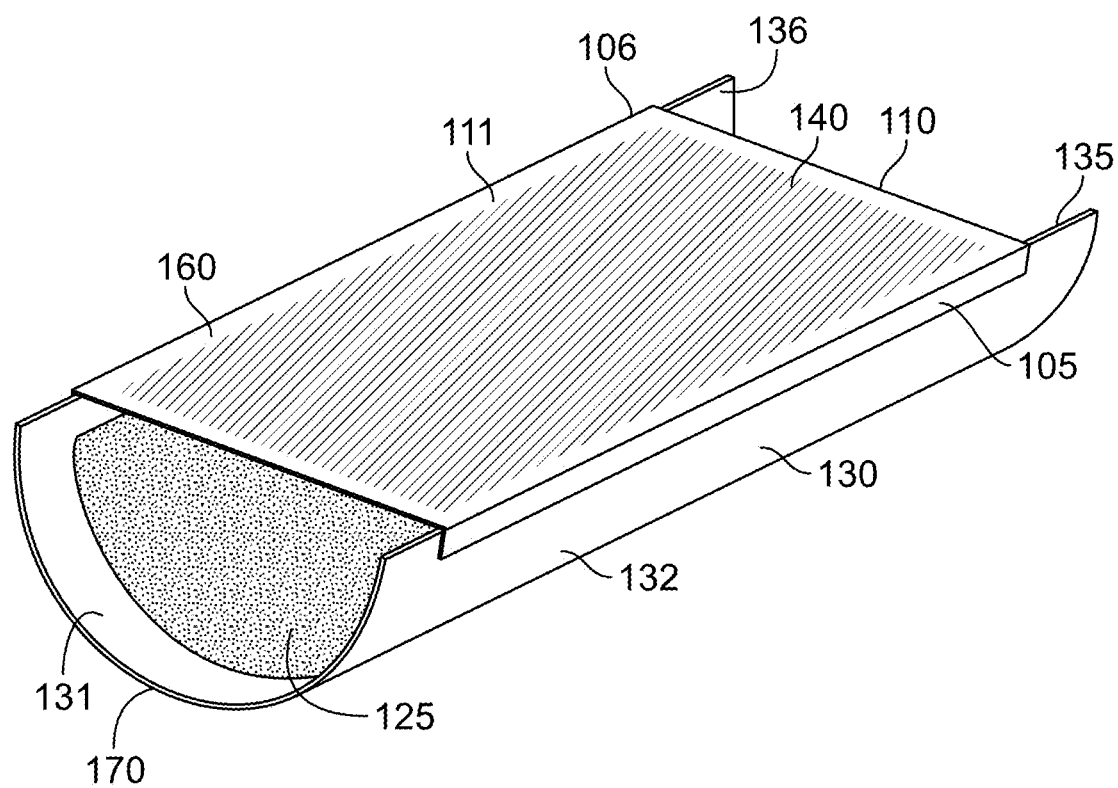
FIG. 1A is a perspective view of a dressing and support structure in a first position.

According to the devices, kits and methods described herein, a skin treatment device, skin device, wound treatment device, scar or keloid treatment device, scar or keloid amelioration or prevention device, bandage, or dressing may be provided that may be applied, attached to or coupled to one or more layers of the skin or tissue of a subject (hereinafter referred to as "dressing", "skin device" or "skin treatment device").

Devices are described herein that may be used for ameliorating the formation of scars and/or keloids at a wound site. The scars may be any type of scar, e.g., a normal scar, a hypertrophic scar, etc. In general, the devices may be configured to be removably secured to a skin surface near a wound.

In addition to amelioration of scar formation, other uses for such skin treatment device may or may not include without limitation, for example, treating skin related conditions such as acne, blemishes, rosacea, warts, rashes (including but not limited to erythematous, macular, papular and/or bullous conditions), psoriasis, skin irritation/sensitivity, allodynia, telangiectasia, port wine stains and other arteriovenous malformations, and ectopic dermatitis; treating or improving existing scars, wrinkles, stretch marks, loose or sagging skin or other skin irregularities; lifting, pinning, holding, moving skin for various purposes such as during pre-operative preparation, during surgical procedures for example as a low-profile tissue retractor, to stabilize blood vessels during needle or catheter insertion, postoperatively, pre or post operatively for pre-treating or preconditioning skin for example, prior to scar revision, wound incision, body contouring, in mastectomy skin expansion, aesthetic skin treatment or resurfacing whether topical or subdermal, whether or not using an energy modality such as, for example, microwave, radio-frequency ablation, high-intensity focused ultrasound, laser, Infrared, incoherent light, during weight loss, or for aesthetic purposes; hair removal or hair loss; treating and/or closing skin injuries for example, incisions, wounds, chronic wounds, bed sores, ulcers (including venous stasis ulcers), preventing or reducing the incidence of wound dehiscence, diabetic skin or wound conditions, burn healing and/or relief; acting as an occlusive or negative-pressure wound dressing; protecting incisions or wounds, e.g. prevention of splitting or opening, protecting newborn belly buttons after cutting umbilical cord. Such treatments may include use of a drug or other therapeutic agent that may be applied to the skin with such device. The agents may include but are not limited to antibiotics, antifungals, immune modulators including corticosteroids and non-steroidal immune modulators. The agents may be provided in any of a variety of formulations, including but not limited powders, gels, lotions, creams, pastes, suspensions, etc. The devices may also be used for purposes of delivering a drug to the skin or through the skin, for example by stretching the skin and applying a drug thereto. Different configurations of the device may be amenable to the size or geometry of different body regions. The treatments may be applied to regions of any shape (e.g. linear, curved, stellate), size or depth, and to one or more regions of the body, including but not limited to the scalp, forehead, face (e.g. nose, eyelid, cheeks, lips, chin), ears, neck, shoulder, upper arm, lower arm, palm, dorsum of the hand, fingers, nailbed, axilla, chest, nipple, areola, back, abdomen, inguinal region, buttocks, perineal region, labia, penis, scrotum, thigh, lower leg, plantar surface of the foot, dorsal surface of the foot, and/or toes. Such devices may also be referred to herein as a "dressing", "skin device" or "skin treatment device".

Unloading of exogenous and/or endogenous stress in the vicinity of the wound may ameliorate the formation of scars, hypertrophic scars, or keloids. The mechanical environment of an injury may be an important factor in tissue response to that injury. The mechanical environment includes exogenous stress (i.e., physiological stress which includes stress transferred to the wound via muscle action or physical body movement) and endogenous stress (i.e., dermal stress originating from the physical properties of the skin itself, including stress induced at the wound site due to swelling or contraction of the skin). The devices, dressings, kits and methods described herein may control or regulate the mechanical environment of a skin including but not limited to the mechanical environment of a wound. The devices, dressings, kits and methods described herein may also control or regulate the mechanical environment to ameliorate scar and/or keloid formation. The mechanical environment of skin may include stress, strain, or any combination of stress and strain. The control of a wound's mechanical environment may be active or passive, dynamic (e.g., by applying an oscillating stress) or static. The stresses and strains acting on the wound may involve the layers of the skin, such as the outer stratum corneum, the epidermis and dermis, as well as the underlying connective tissue layers, such as the subcutaneous fat. Devices and methods described here may shield a wound from its mechanical environment. The term "shield" is meant to encompass the unloading of stress experienced by the wound as well as providing a physical barrier against contact, contaminants, and the like. The devices and methods described here may shield a wound by unloading the wound and surrounding tissues from endogenous stress and/or exogenous stress. Thus, devices and methods described here may reduce the stress experienced by a wound and surrounding tissues to a lower level than that experienced by normal skin and tissue. Unloading of exogenous and/or endogenous stress in the vicinity of the wound may ameliorate the formation of scars, hypertrophic scars, or keloids.

A cell's external mechanical environment may trigger biological responses inside the cells and change cell behavior. Cells can sense and respond to changes in their mechanical environment using integrin, an integral membrane protein in the plasma membrane of cells, and intracellular pathways. The intracellular pathways are initiated by receptors attached to cell membranes and the cell membrane that can sense mechanical forces. For example, mechanical forces can induce secretion of cytokines, chemokines, growth factors, and other biologically active compounds that can increase or trigger the inflammatory response. Such secretions can act in the cells that secrete them (intracrine), on the cells that secrete them (autocrine), on cells surrounding the cells that secrete them (paracrine), or act at a distance from the point of secretion (endocrine). Intracrine interference can alter cell signaling, which can in turn alter cell behavior and biology including the recruitment of cells to the wound, proliferation of cells at the wound, and cell death in the wound. In addition, the extracellular matrix may be affected.

As noted above, the wound healing process may be characterized in three stages: early inflammatory phase, the proliferative phase, and remodeling. The inflammatory phase occurs immediately after injury and typically lasts about two days to one week. Blood clotting takes place to halt blood loss and factors are released to attract cells that can remove debris, bacteria and damaged tissue from the wound. In addition, factors are released to initiate the proliferative phase of wound healing. In the proliferative phase, which lasts about four days to several weeks, fibroblasts grow and build a new extracellular matrix by secreting collagen and proteoglycans. At the end of the proliferative phase, fibroblasts can act to contract the wound further. In the remodeling phase, randomly oriented collagen is organized and cross-linked along skin tension lines. Cells that are no longer needed can undergo apoptosis. The remodeling phase may continue for many weeks or months, or indefinitely after injury. Scars typically reach about 75-80% of normal skin breaking strength about 6-8 weeks after injury. In general, scars typically have a triangular cross-section. That is, a scar is usually smallest in volume near the skin surface (i.e., stratum corneum and epidermis) and increases in volume as it progresses into the deeper layers of the dermis.

There are three common possible outcomes to a wound healing process. First, a normal scar can result. Second, a pathologic increase in scar formation can result, such as formation of a hypertrophic scar or a keloid. Third, the wound may not heal completely and become a chronic wound or ulcer. The devices, kits and methods described herein can ameliorate the formation of any type of scar. In addition, the devices, kits and methods described here can be adapted for a variety of wound sizes, and for different thicknesses of skin, e.g., the devices may be configured for use in different areas of the body. In addition, the devices, kits and methods described here can be adapted to ameliorate scar formation in any type of skin, e.g., body location, age, race, or condition.

Without wishing to be bound by any particular theory, we believe that mechanical strain acting on a wound or incision early in the proliferative phase of the wound healing process may inhibit cellular apoptosis, leading to a significant accumulation of cells and matrix, and hence increased scarring or the production of hypertrophic scars. Given the underlying similarities between hypertrophic scars and keloids with respect to excessive matrix formation, we believe that the devices and methods described herein may also be useful in preventing and treating keloids by offloading or neutralizing at least some of the strain that may be acting on the wound or incision. This tensile strain may be exogenous and/or endogenous strain, and may include but is not limited to the strain from the intrinsic tensile forces found in normal intact skin tissue.

Devices, kits and methods described herein may be for treatment of a subject at a skin site ("skin treatment device")

including without limitation for wound treatment or the treatment, amelioration, or prevention of scars and/or keloids, by manipulating mechanical or physical properties of skin or by shielding skin from stresses, and/or by controllably stressing or straining the epidermis and layers of dermal tissue at or near a skin site, i.e., at or adjacent a wound or a treatment site of a subject's skin. According to variations, manipulating mechanical or physical properties may thereby modulate tensile or compressive stress at the skin site. The stress at the skin site may be reduced to levels at or below that experienced by normal skin and tissue. The stress at the skin site may be increased to levels above that experienced by normal skin and tissue. The stress or strain may be applied to surrounding tissue in one, two, or more directions to manipulate endogenous or exogenous stress at the skin site in one, two or more directions. According to variations, devices and methods described herein may reduce or otherwise manipulate the stress experienced by skin and/or a wound and surrounding tissues in order to treat a subject. The devices may also assist in preventing or reducing the incidence of wound dehiscence.

Devices, kits and methods described herein may be for the treatment of skin, and/or amelioration, or prevention of scars and/or keloids, by creating and/or maintaining a pre-determined strain and/or a predetermined minimum or maximum strain in an elastic skin treatment device or dressing that is then affixed to the skin surface using a skin attachment mechanism, such as, e.g., a skin adhesive, to transfer a generally planar (e.g. compressive) force from the device or dressing to the skin surface. "Pre-strain", pre-strained" or "pre-straining" as used herein refers to straining a device prior to application of the device to a subject.

Devices kits and methods herein may include a support, packaging and/or applicator configured to maintain a pre-strained dressing in a strained configuration for a period of time after straining and prior to application to skin of a subject. Devices and methods herein may include a method of manufacturing such a pre-strained dressing.

According to one variation, a pre-strained and strain shielded dressing assembly may be stored for a period of time after straining and prior to use. In some variations, the dressing may be configured to maintain a predictable and/or desired amount of tensile force during a pre-determined period of time after initial straining. In some variations, the dressing may be configured to lose a predetermined maximum and/or minimum amount of tensile force (measured in a direction of tensile straining of the dressing) during one or more periods of time.

A desired time for application of the dressing to a subject may be when the dressing, in its pre-strained and strain shielded configuration, has a tensile force characteristic or range thereof that is desired. Such desired range may be selected to provide sufficient modulation of the forces on the skin to treat the skin while avoiding or minimizing disruption irritation to the skin. As noted herein, for a given dressing, different levels of stress or strain may be imparted to the skin at different locations and/or on different subjects. Also different levels of force offloading may be desirable for different individuals or different locations on a subject's skin. Thus different ranges of dressing force properties may be appropriate for different skin treatment applications.

Such desired force range may be selected based on a determination desired force properties to be applied to a particular subject, portion of skin and/or for a particular skin treatment purpose. Such desired force may be high enough to provide a therapeutic mechanomodulation of the skin while be low enough to prevent significant skin irritation.

Force properties of a pre-strained dressings may vary over time. An initial strain may be applied to the dressing where the elastic material or other structure, of the dressing has an initial tensile force characteristic. The dressing may be maintained in a strained configuration at a particular strain level after it is pre-strained for an initial period of time. During the initial period of time, the force properties of the elastic material may diminish, decay or exhibit a loss of force. After an initial predetermined period of time, the force properties of the elastic material may reach, diminish to or decay to a desired force level and/or range of force levels. The dressing elastic material force characteristics may be within the desired range for at least a subsequent period of time. In some variations, the dressing material may have an elastic modulus in the range of about 1 MPa to about 15 MPa, sometimes about 1.5 MPa to about 6 MPa, and other times about 2 Mpa to about 5 MPa, about 3 MPa to about 4 MPa, or about 3.5 MPa to 5 MPa, while having a peak load per width up to a 0.6 strain of less than 3 N/mm, sometimes less than about 2.5 N/mm, sometimes less than 2 N./mm, sometimes less than 1 N/mm, sometimes less than about 0.75 N/mm and other times less than about 0.6 N/mm or less than about 0.5 N/mm. The peak load per width up to a 0.6 strain, may be at least about 0.35 N/mm, sometimes at least about 0.5 N/mm, and other times at least about 0.6 N/mm, 0.7 N/mm, 0.8 N/mm, 0.9 N/mm or 1 N/mm. The material may be selected such that the material, at a constant engineering strain of 20%, is able to maintain an engineering stress of at least about 200 kPa, 250 kPa, 300 kPa, 400 kPa, or 500 kPa, 1000 kPa, 1500 kPa, 2000 kPa, 2500 kPa, 3000 kPa or more for at least 8 hours with less than a 10% or 5% variation or decrease in engineering stress.

According to a variation, for example, the initial force or strain properties of a dressing may be selected so that the desired range of force values occur during a period of time where the percentage loss of force is reduced and occurs over a longer period of time.

The initial strain and/or force level of the dressing may be selected so that the time of use falls within a desired time frame or period based on the percentage loss of force of the dressing over time.

According to variations, the dressing may be initially strained or over-stressed to provide a greater initial force per unit width than that of a desired range at the time of application to skin. According to variations, the initial strain and resulting initial force per width of a dressing may be selected based on desired on desired final and resulting force properties and/or a desired time frame for use of the dressing. Such initial strain level may be, for example, 20% or more, 30% or more, 40% or more, 50% or more, 60% or more, 70% or more, 80% or more, 90% or more, 100% or more. According to variations, the initial force is greater than a desired force range. Such initial force level may be for example about or up to 25%, about or up to 35%, about or up to 50%, about or up to 75% or more than the desired force at time of application of the dressing. Such initial force level may be but is not limited to, for example, between 2 and 5 Lbf/inch, 1.54 and 3.85 Lbf/inch, 1.33 and 3.33 Lbf/inch. or 0.85 to 2.20 Lbf/inch.

According to variations, a dressing may be configured to be initially strained or tensile stressed to a desired strain or force level and maintained in the strained configuration for an initial time frame. According to variations, the initial time frame may be, for example, 1 hour or more, 1 day or more, 1 week or more, or up to 1 month or more prior to application. According to variations, the initial time frame may be 1 hour or more, 1 day or more, 1 week or more, or up to 1 month or more in a material pre-conditioning state prior to final assembly or manufacture. Such preconditioning state may be straining the material at a constant strain or straining the material at varied levels of strain.

Then according to some variations, for the duration of a subsequent pre-determined time frame after the initial time frame, the dressing may be configured to maintain a desired minimum final force or force range. During the subsequent time frame, the device may be applied to a subject's skin for treatment. Such desired force range may be from about 0.5 to 1.0 Lbf/inch, 1.0 to 2.5 Lbf/inch or from about 1.6 to 2.1 Lbf/inch. The force loss during the subsequent time period may be up to 3%, up to 5%, up to 8%, up to 10%, up to 15%, up to 20%, up to 25% or more. The duration of the subsequent time period may be, for example 2 months, or more 3 months or more, 6 months or more, 12 months or more, 36 months or more, or 48 months or more.

The pre-strained dressing may then be coupled to a strain maintaining element during an initial period of time. The strain maintaining element may remain on the dressing during a portion of the subsequent period of time until it is used.

According to a variation for example, the average initial force or strain properties (average may include or may comprise an average, for example, per manufacturing lot, or a specified average within a given tolerance level) of a dressings pre-strained at manufacturing may be provided so that the desired range of average force values occur during a period of time where the average percentage loss of force is reduced and occurs over a longer period of time. In other variations, the pre-straining is initiated at the point-of-use. In still other variations, a portion of the pre-straining is performed at the point-of-manufacture, and additional straining or strain relief is performed at the point-of-use. After pre-straining, the dressing may then be packaged, sealed and sterilized for future use.

The initial average strain and/or force level of the dressings may be selected so that the time of use falls within a desired time frame or period based on the average percentage loss of force of the dressings over time.

According to variations, the dressings may be initially strained or over-stressed to provide a greater average initial force per unit width than that of a desired range at the time of application to skin. According to variations, the average initial strain and resulting initial force per width of a dressing may be selected based on desired final and resulting force properties and/or a desired time frame for use of the dressing. Such average initial strain level may be, for example, less than 20%, 20% or more, 30% or more, 40% or more, 50% or more, 60% or more, 70% or more, 80% or more, 90% or more, 100% or more. According to variations, the average initial force is greater than a desired force range. Such average initial force level may be for example about or up to 25%, about or up 35%, about or up to 50%, about or up to 75%, or more than the desired force at the time of application of the dressing. Such average initial force level may be but is not limited to, for example, between 2 and 5 Lbf/inch, 1.54 and 3.85 Lbf/inch, 1.33 and 3.33 Lbf/inch. or 0.85 to 2.20 Lbf/inch.

According to variations, a dressing may be configured to be initially strained or tensile stressed to a desired average strain or force level and maintained in the strained configuration for an initial time frame. According to variations, the initial time frame may be 1 hour or more, 1 day or more, 1 week or more, or up to 1 month or more prior to application. According to variations, the initial time frame may be 1 hour or more, 1 day or more, 1 week or more or up to 1 month or more in a material pre-conditioning state prior to final assembly or manufacture. Such preconditioning state may be straining the material at an average constant strain or straining the material at varied levels of average strain.

Then according to some variations, for the duration of a subsequent pre-determined time frame after the initial time frame, the dressings may be configured to maintain a desired minimum average final force or average force range. During the subsequent time frame, the devices may be applied to a subject's skin for treatment. Such desired average force range may be from about 0.5 to 1.0 Lbf/inch, 1.31 Lbf/inch to 1.41 Lbf/inch. The average force loss during the subsequent time period may be up to 3%, up to 5%, up to 8%, up to 10%, up to 15%, up to 20%, up to 25% or more. The duration of the subsequent time period may be, for example 2 months, or more 3 months or more, 6 months or more, 12 months or more, 36 months or more, or 48 months or more.

A pre-strained dressing may be coupled to a strain maintaining element during an initial period of time during one or more manufacturing steps. The strain maintaining element may remain on the dressing during a portion of the subsequent period of time during manufacturing or in transport or storage until it is used.

Example I below illustrates a percent change in force per unit width of selected pre-strained dressings maintained at a constant strain for a period of time under testing conditions.

Example I

Figure 6:
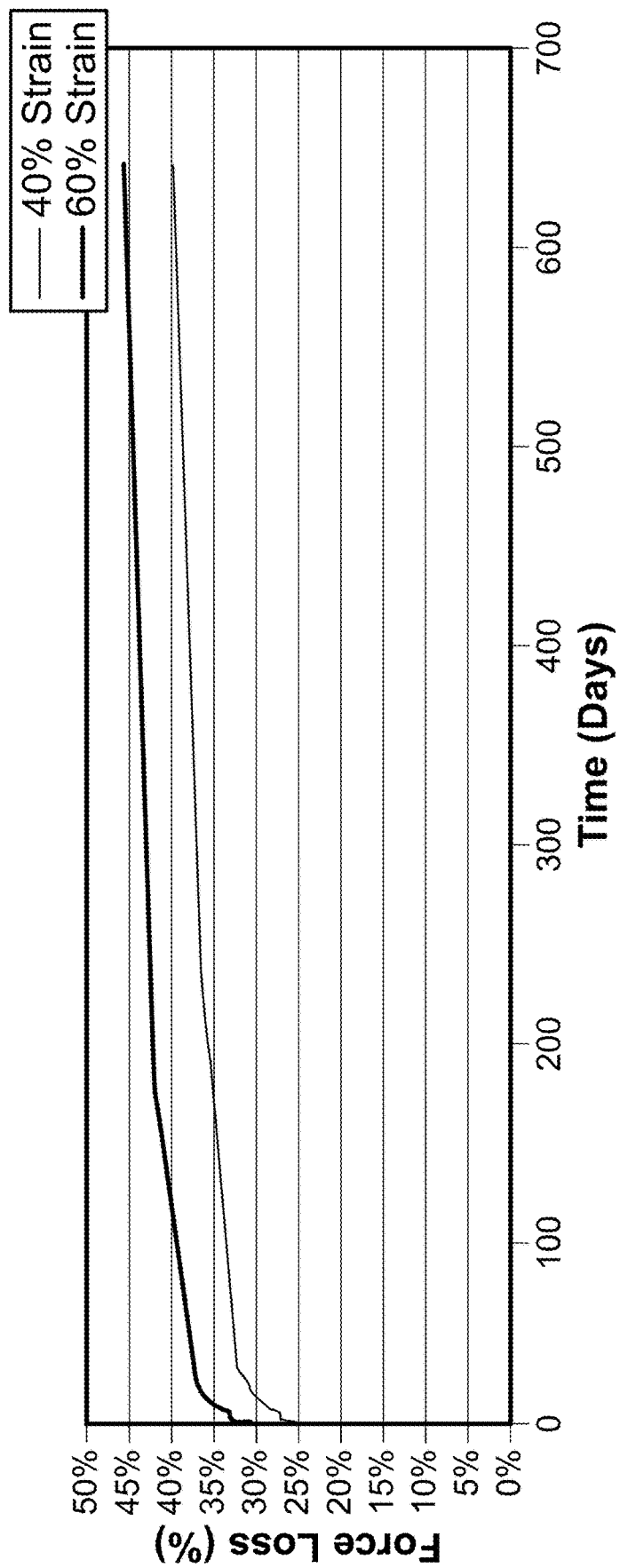
FIG. 6 illustrates the percent loss of force over time for elastic dressing material as describe in Example I.

In this example, five (5) dressings were strained at 40% and 5 dressings were strained at 60%. The dressings were constructed of MED 82-5010-10 by NUSIL TECHNOLOGY LLC (Carpinteria, CA). A maximum of 5 particulates per sheet less than or equal to 0.020" and a maximum of 5 surface gels and/or bubbles per sheet a size no greater than 0.020" were present in the samples. The samples were initially 8" (+−0.02")×1" (+−1") with a thickness of 0.010". The samples had a durometer value of about 50 (Shore A scale), a tensile strength of about 1,450 psi, elongation of about 1000% and a specific gravity of about 1.16. Six inch (6") centered gage marks were added. The 40% strain samples' gage lengths increase to 8.4" when strained. The 60% strain samples' gage lengths increase to 9.6" when strained. The samples were attached in a strained configuration to sample fixtures or clamps with a locking bar between the sample fixtures. Samples fixtures were constructed of Acrylic (PMMA) and coated with an anti-skid tape. When tested, the ends of the sample fixtures were attached to grips of a Tensile Tester Chatillon Model TCD225, 50 LBF load cell. Measurements were then taken after releasing the locking bar. The samples were stored in the test lab at ambient lab temperatures for the duration of the test. The tensile forces of the dressings were measured at various time intervals. FIG. 6 illustrates the percent loss of force over time for each of the dressings. An initial average post strain loss after one hour at 60% strain was about 30% and after 1 hour at 40% strain was about 25%. Following the initial post strain loss, it was surprising that the additional loss after the initial loss decreased at a slower rate and was on average was about 15% for a period of 2 years (total of 45% loss average).

In other examples, the maximum number of particulates per sheet may be 1, 5, 10, 20 or 25 or more, with a 0.01", 0.02", 0.040", 0.050" or 0.07", or 0.1" maximum size, and the maximum number of surface gels and/or bubbles may be 1, 5, 10, 20 or 25 or more, with a 0.01", 0.02", 0.040", 0.050" or 0.07", or 0.1" maximum size. In other variations, the dressing material may have a durometer value of about Shore A 15 to about 90, sometimes about Shore A 35 to 75 and other times about Shore A 50 to 60, or Shore a 50 to 75.

Example II below illustrates a percent change in force per unit width of selected pre-strained dressings maintained at a constant strain for a period of time under testing conditions.

Example II

Figure 9:
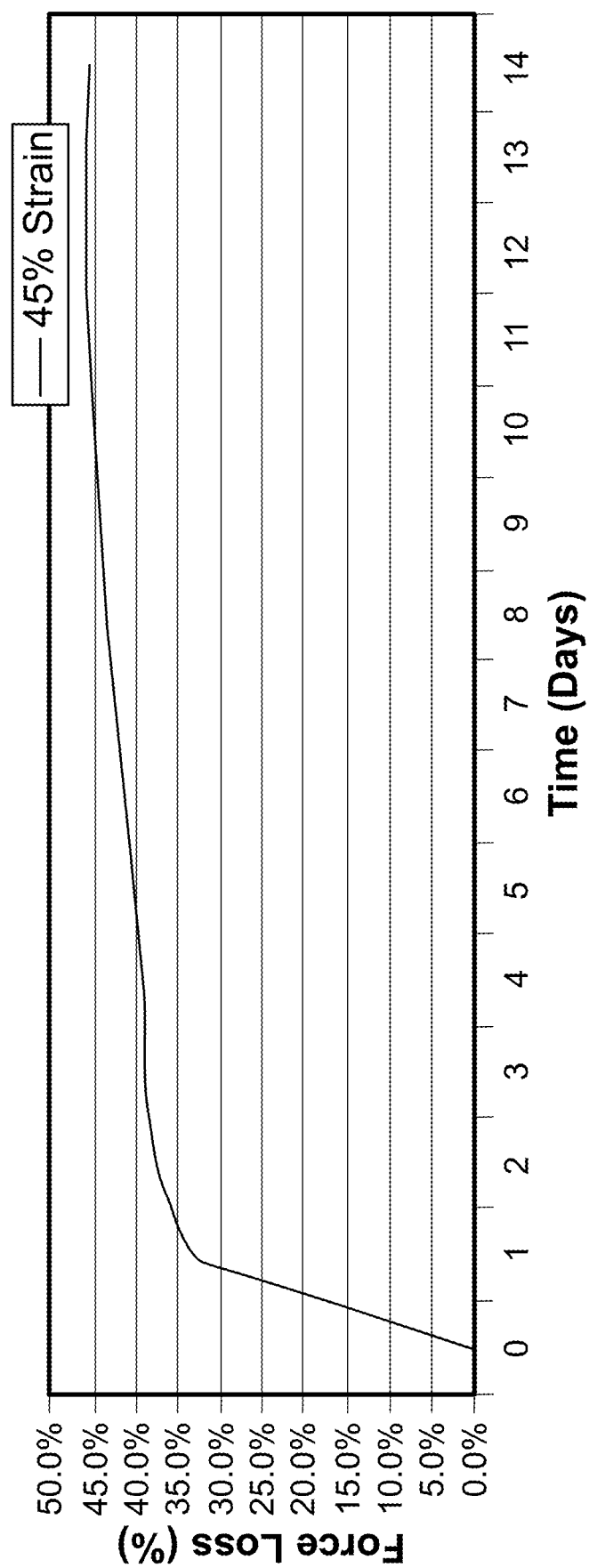
FIG. 9 illustrates the percent loss of force over time for elastic dressing material as describe in Example II.

In this example, 10 dressing membranes were strained at 45%. The dressing membranes were constructed of polyurethane by 3M (St. Paul, MN). The samples were initially 8" (+−0.02")×1" (+−1") with a thickness of 0.002". The samples had a tensile strength of about 2.2 lbs/in, and elongation of about 300%. Six inch (6") centered gage marks were added. The 45% strain samples' gage lengths increase to 8.7" when strained. The samples were attached in a strained configuration to sample fixtures or clamps with a locking bar between the sample fixtures. Samples fixtures were constructed of Acrylic (PMMA) and coated with an anti-skid tape. When tested, the ends of the sample fixtures were attached to grips of a Tensile Tester Chatillon Model TCD225, 50 LBF load cell. Measurements were then taken after releasing the locking bar. The samples were stored in the test lab at ambient lab temperatures for the duration of the test. The tensile forces of the dressings were measured at various time intervals FIG. 9 illustrates the percent loss of force over time for each of the dressings. An initial average post strain loss after one day at 45% strain was about 33%. Following the initial post strain loss, it was surprising that the additional loss after the initial loss decreased at a slower rate and was on average was about 12% for a period of 13 days (total of 45% loss average).

Figure 7:
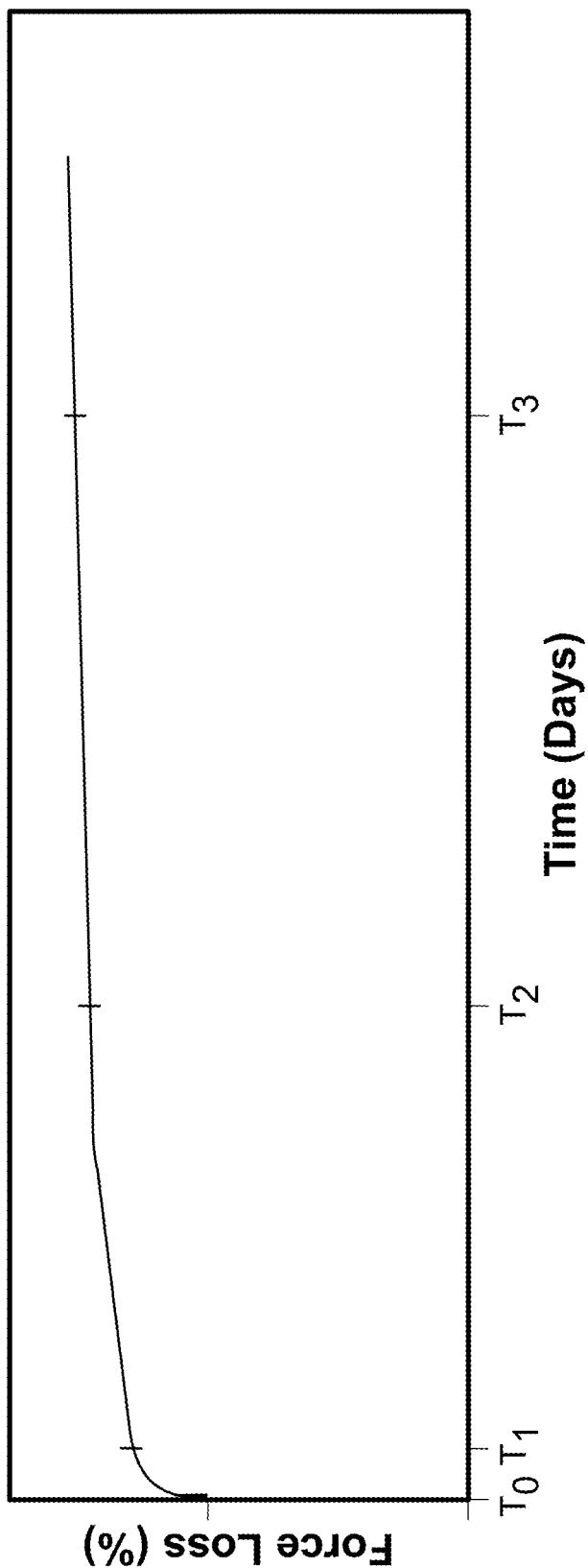
FIG. 7 is a schematic illustration of percent force loss over time for a pre-strained elastic material component of a dressing.

FIG. 7 is a schematic illustration of percent loss of force over time of a variation of an elastic material of a dressing strained a predetermined amount and held in a strained configuration over time. According to FIG. 7, the dressing and/or dressing material is held at a constant strain for a period of time. The initial strain may be selected to provide for different percent force loss values at particular times. The percent force loss values and force values may vary for different initial strain levels and different materials. The curve plot for a particular dressing material may be determined for example as described with respect to Example I. As the percentage force loss increases, the force value decreases for a particular material or dressing, and/or the average force loss value for a lot of manufactured material or dressings, pre-strained substantially the same amount. At time T0, the material is strained. During an initial time frame of T0 to T1, the percent force loss of the material occurs at a more rapid rate than it does in subsequent time periods or time frames, for example from T1 to T3, from T1 to T2, and/or from T2 to T3. The time frames T1 to T3, T1 to T2, and/or T2 to T3 represent exemplary time frames that may or may not be selected based on desired force properties for a dressing, desired times for use of property, and/or desired rates of loss of force. For example, a dressing may be pre-strained at manufacture and then stored or transported for later use during a specified time frames, for example T1 to T2, T2 to T3 and/or T1 to T3.

Figure 8:
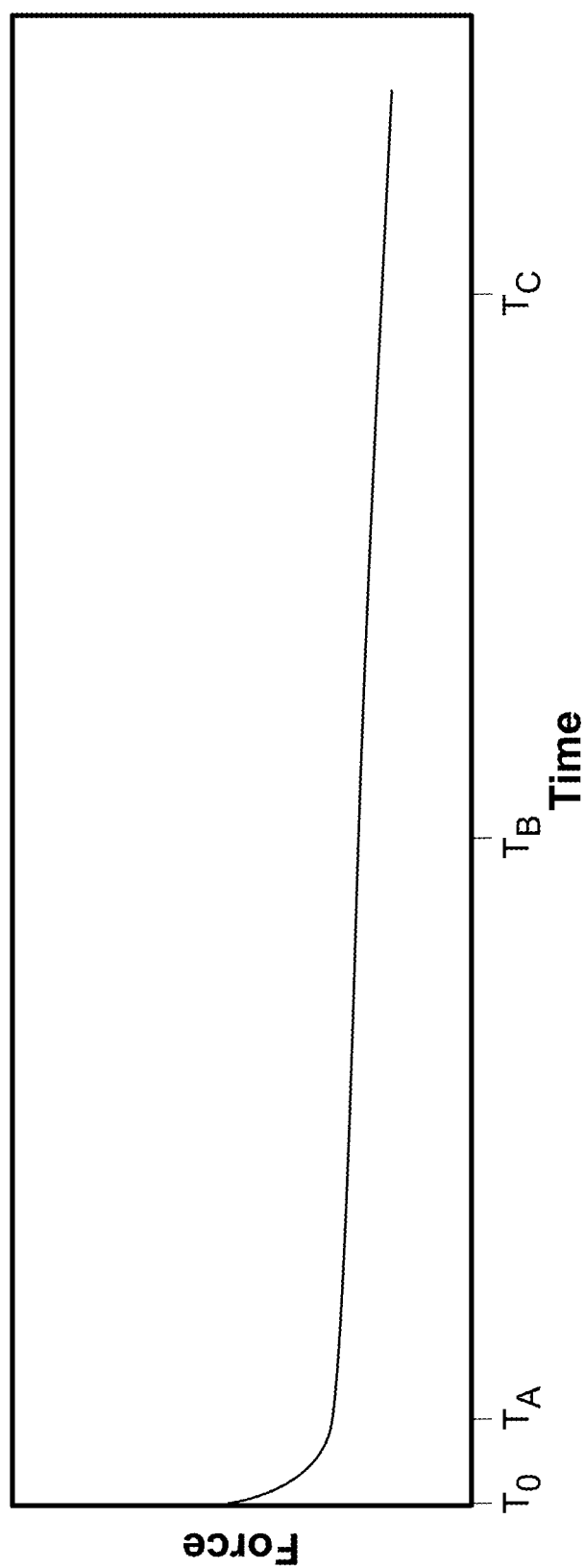
FIG. 8 is a schematic illustration of tensile force over time for a pre-strained elastic material component of a dressing.

FIG. 8 is a schematic illustration of force over time of a variation of an elastic material of a dressing strained a predetermined amount and held in a strained configuration over time. According to FIG. 8, the dressing and/or dressing material is held at a constant strain for a period of time. The initial strain may be selected to provide for different force values at particular times. The force values and percent force value losses may vary for different initial strain levels and different materials. The curve plot for a particular dressing material may be determined for example as described with respect to Example I. As the percentage force loss increases, the force value decreases for a particular material or dressing, and/or the average force loss value for a lot of manufactured material or dressings, pre-strained substantially the same amount. At time T0, the material is strained. During an initial time frame of T0 to TA, the material loses force at a more rapid rate than it does in subsequent time periods or time frames, for example from TA to TC from TA to TB and/or from TB to TC. The time frames T0 to TA, TA to TB, and/or TB to TC represent exemplary time frames that may or may not be selected based on desired force properties for a dressing, desired times for use of property, and/or desired rates of loss of force. For example, a dressing may be pre-strained at manufacture and then stored or transported for later use during a specified time frames, for example TA to TB, TB to TC and/or TB to TC.

According to some variations, the elastic device may be strained at different strain values during pre-conditioning.

Variations of a support device, strain shield or packaging herein may or may not also operate as an applicator where one or more elements of the packaging may be used to position and/or apply the dressing to the skin of a subject. Variations of applicator devices with dressings attached may be pre-strained at manufacture and releasably fixed into a pre-strained configuration using a lock or restrained attached to the applicator, for example, a locking bar or a flexible restraint or tie. Examples of applicators may be used with a lock or restraint include those described in co-pending U.S. Patent Publication no. US 2011/152,738 entitled: "Devices and Methods For Dressing Applicators" and incorporated in its entirety herein by reference.

The devices, kits or methods described herein may include a support, packaging, applicator, and/or other devices which may: contain, hold or support a pre strained dressing; may be used to prepare a dressing for application; may be used to deliver, orient or apply a dressing; may be used to maintain a dressing in a stressed or strained configuration; may be used to stress or strain a dressing; may be used to stress or strain a dressing to a desired degree or within a window of desired amounts, degrees or percentages of strain; and/or may be used during or after application of a dressing to provide additional treatment to skin, wound, incision and/or other treatment location, e.g., to apply pressure to a wound, incision or other treatment location. According to variations, a support device, packaging or applicator is configured to provide support for the dressing before and/or while the dressing is applied to a subject. A dressing support structure described herein may comprise a structure that interfaces, supports and/or is coupled to, whether directly or indirectly, a back surface of a dressing that is to be applied to a subject. A dressing support may optionally comprise a structure that interfaces, supports and/or is coupled to, whether directly or indirectly, a front surface of a dressing that is to be applied to a subject.

The support structure may further comprise at least in part, a material or structure that is more rigid or less flexible than the dressing to be applied to a subject. The support structure may comprise one or more elements or segments for example that permit flexibility with respect to adjacent elements or segments. Such material may comprise, for example, a plastic, e.g., PVC or acrylic, or a paperboard. The elements or segments may be a laminate of a material, such as a solid bleach sulfate paperboard with a layer of flexible material between layers of paperboard, for example, silicone, polyurethane, low-density polyethylene, a rubber material, or a transfer adhesive with or without a carrier. The material may also be a metal. Such support structure may be constructed of a single substrate, a laminate or a plurality of elements coupled together and/or to the dressing. According to some variations, a support, packaging or applicator is more rigid in at least one direction or supportive of a dressing, while being flexible in at least one direction to provide for a more conforming application to a curved or shaped skin surface of a subject, or to permit curvature or shaping of the dressing where it is applied. According to some variations, the support, packaging or applicator may comprise segments of relatively more rigid material flexibly coupled to adjacent segments to provide flexibility to permit shaping of packaging/applicator and/or dressing while providing sufficient support of the dressing during application. According to some variations, segments are coupled to adjacent segments by way of a flexible material, such as a low-density polyethylene (LDPE) material, or a composite of adhesive and a thinner more flexible substrate. Alternatively, segments may be formed as a structure by manufacturing a substrate with cut-outs, slots, grooves, scoring or other openings or variations in thickness of the substrate at different locations.

The support, packaging, applicator, and/or elements thereof may have a profile that is straight, curved or otherwise varied, to interface directly or indirectly with a subject's body. A support, packaging device, applicator, and/or elements thereof may be selected or configured to closely match a portion of a subject's body profile to which the skin treatment device is to be attached. A support, packaging device, applicator or elements thereof may be selected or configured to have a profile that has a desirable profile for a particular body location or profile where the skin treatment device is to be placed on a subject's skin. The support, packaging device, applicator and/or an element or segment thereof, may be curved, curvable, flexible, bendable, malleable, deformable, shapeable or movable to provide alternative shapes or profiles of an attached dressing. They may be relatively curved, curvable, flexible, malleable, bendable, deformable, shapeable or movable in at least one direction while being more rigid in another direction.

A number of wound dressings have backings, adhesive liners and/or packaging that are removed prior to application of a wound dressing. Many existing dressings can be clumsy to orient and apply and can have a tendency to fold and adhere to themselves. According to some variations, a backing, support packaging and/or applicator may provide structural support or stability for a dressing while or after an adhesive liner is released. The packaging and/or applicator may also provide structural support or stability of the dressing as it is oriented and/or applied to the skin of a subject. According to some variations, the assembly may be constructed to avoid folding or bending of the dressing to the extent that the adhesive on the dressing sticks to itself. According to some variations, the packaging or applicator is configured to be used with one hand to orient and/or apply the device to the skin of a subject. For example, in some situations, particularly where a longer or larger dressing is used, a packaging or applicator provides structural support for a dressing such that a user can effectively hold onto, manipulate and/or apply a prepared dressing with one-hand. According to one variation, the applicator and or packaging may be sufficiently supportive or rigid to hold a dressing's form so that it is easy to manipulate. According to a variation, the applicator may be sufficiently wider and/or longer or have a sufficiently larger area than a dressing so that it may provide sterile application and/or one-handed application. According to variations, a support structure is provided for a dressing. According to a variation, a margin is provided as part of a support structure between the dressing or dressing adhesive and one or more edge portions of the support structure. Such margins provide a supported edge or area to grasp or manipulate the dressing or its carrier without necessitating or creating a great likelihood of touching the adhesive.

The support, packaging assembly, and/or applicator device may comprise a tension maintaining structure configured to assist in maintaining the dressing in a pre-strained configuration. Some acceptable level of reduction in strain may occur during storage of a pre-strained device coupled to a support, packaging, or applicator for a period of time.

According to a variation, the tension maintaining structure may comprise a first attachment portion configured to releasably attach to a dressing and a second attachment portion configured to releasably attach to the dressing, wherein the tension maintaining structure may be configured to maintain a previously applied separation force between the first attachment portion and the second attachment portion to maintain a strain in a dressing attached to the first and second attachment portions. An elastic dressing may be configured to releasably attach to the first and second attachment portions of a dressing and packaging assembly and may include an attachment structure or may be integral with attachment structures of a packaging device, applicator or tensioning member.

A variety of attaching, coupling, locking, latching or detent mechanisms may be used to maintain the dressing and/or packaging, applicator or tensioning device in a various configurations including but not limited to various pre-strained or strained configurations. By coupling, attaching or locking the packaging, applicator, tensioning device, or dressing in a strained position, a predetermined strain and/or force properties of a given dressing may be achieved The pre-determined amount of strain may be based on desired strain or force properties applied to the skin by the dressing after application. After application to skin the strain may relax by a certain amount or percentage.

A support, packaging device, and/or applicator, or dressing or dressing assembly, may include any attachment structures that are used to attach or couple the support, package, and/or applicator, to a dressing or dressing assembly. Attachment features or structures of a dressing device may be integral with or include any of the attachment structures or corresponding structures to the attachment structures of the support, packaging, applicator and/or elements thereof. Such releasable attachment structures may include but are not limited to attachment sheets, adhesives, pockets and tabs, hook and loop mechanism, hooks, angled bars, adhesives, pegs, rip cords, towel bar configurations, sliding pins, friction locks, cam locks, vacuum or suction devices, snap connectors, carpet tack, press fit connections or other connections, cuttable, tearable or otherwise severable structures, that permit removal of dressing from the support, packaging, and/or applicator.

According to some variations, the packaging and/or applicator provide a release mechanism to separate an applied dressing from the support, packaging and/or applicator after the dressing is applied to the skin. A release mechanism may be configured to facilitate separation, release, removal or detachment of the attachment structures attaching the dressing to the support, packaging, applicator or portions thereof, including but not limited to the separation devices and methods described herein. The dressing release may comprise, for example, a high tack removable adhesive such as a pressure sensitive adhesive. For example, a silicone dressing may have an acrylic pressure sensitive adhesive that does not permanently bond to silicone. The dressing release may comprise, for example, tear strip, one or more perforations or pre-creased regions, a cutting member or a tearable material. Releasing mechanisms may also include but are not limited to pivoting, rolling, rocking or sliding features associated with or coupled to attachment structures. They may be self-releasing latches or spring members. They may be actuated when a pressure member is applied to a skin treatment device prior to removing the applicator. They may be manually actuated. The mechanisms may include levers, latches, locking members, spring members, for example, or other mechanisms such as cutters or rip cords or other structures or features to facilitate tearing, cutting or separation of attachment structures or elements.

According to some variations, the applicator may be further used to help reduce bleeding, e.g., by allowing application of a compressive force using a support structure while or after the device is applied. One or more hemostatic or coagulative agents may be applied to, or otherwise integrated with dressing to help reduce bleeding. Potential agents include chitosan, calcium-loaded zeolite, microfibrillar collagen, cellulose, anhydrous aluminum sulfate, silver nitrate, potassium alum, titanium oxide, fibrinogen, epinephrine, calcium alginate, poly-N-acetyl glucosamine, thrombin, coagulation factor(s) (e.g. II, VII, VII, X, XIII, Von Willebrand factor), procoagulants (e.g. propyl gallate), anti-fibrinolytics (e.g. epsilon aminocaproic acid) and the like. In some variations, the agents may be freeze-dried and integrated into the dressing and activated upon contact with blood or other fluid. In some further variations, an activating agent may be applied to the dressing or the treatment site before the dressing is used on the subject. In still other examples, the hemostatic agent may be applied separately and directly to the wound before application of the dressing, or after application to the dressing via a catheter or tube. The devices may also comprise one or more other active agents that may be useful in aiding in some aspect of the wound healing process. For example, the active agent may be a pharmaceutical compound, a protein (e.g., a growth factor), a vitamin (e.g., vitamin E), or combinations thereof. A further example of such medicament may include, but is not limited to various antibiotics (including but not limited to cephalosporins, bacitracin, polymyxin B sulfate, neomycin, polysporin), antiseptics (such as iodine solutions, silver sulfadiazine, chlorhexidine), antifungals (such as nystatin), antiproliferative agents (sirolimus, tacrolimus, zotarolimus, biolimus, paclitaxel), grow factors (such as vascular endothelial growth factor (VEGF)) and other treatments (e.g. botulism toxin). Of course, the devices may comprise more than one medicament or agents, and the devices may deliver one or more medicaments or agents.

In some variations, a dressing is provided, comprising an elastic member e.g., sheet structure (e.g., a comprising a silicone polyurethane, TPE (thermoplastic elastomers), synthetic rubber or co-polyester material) comprising an upper surface, a lower surface, a first edge and a second edge opposite the first edge, and one or more adhesive regions. The dressing may further comprise a first release liner releasably attached to the adhesive region or regions. The adhesive region(s) may comprise a pressure sensitive adhesive. The dressing may be tapered or otherwise shaped to reduce skin tension at the edges. The dressing may have modified, reduced or no adhesive near its edges to reduce skin tension at the edges. Portions of the dressing may be unstrained and may thereby reduce strain in certain areas of the skin where the dressing is applied. In some specific examples, the unstrained area or areas are found between the edges of the dressing and the strained area(s). In some further examples, the unstrained areas are limited to this area and are not found, during application or use, between the strained areas of a single dressing, in use. In still further examples, the unstrained areas are limited to areas along the edges of a dressing that intersect the strain axis of the strained area(s), but not to areas along the edges of the dressing that are generally parallel to the strain axis.

The elastic material of the dressing may comprise a single layer of material or multiple layers of the same or different materials. The material may have any of a variety of configurations, including a solid, foam, lattice, or woven configuration. The elastic material may be a biocompatible polymer, e.g., comprising a silicone polyurethane, TPE (thermoplastic elastomers), synthetic rubber or co-polyester material. The thickness of polymer sheets, e.g., polymer sheets or shape memory polymer sheets, may be selected to provide the dressings with sufficient load carrying capacity to achieve desired recoverable strains, and to prevent undesired amounts of creep deformation of the dressings over time. In some variations, the thickness across dressings is not uniform, e.g., the thickness across the dressing may be varied to change the stiffness, the load carrying capacity, or recovery strains in selected orientations and/or locations. The elastic material of an exemplary dressing may have a thickness in the range of about 50 microns to 1 mm or more, about 100 microns to about 500 microns, about 120 microns to about 300 microns, or in some variations about 200 microns to about 260 microns. Exemplary dressings may have an edge thickness of about 500 microns or less, 400 microns or less, or about 300 microns or less may exhibit less risk of skin separation from inadvertent lifting when inadvertently brushed against clothing or objects. In some variations, the dressings may be tapered near the edges to reduce thickness. A tapered edge may also ameliorate peak tensile forces acting on skin tissue adjacent to the adhesive edges of the dressing. This may or may not reduce the risk of skin blistering or other tension-related skin trauma. In other variations, the edges of the dressing may be thicker than the middle of the dressing. It is hypothesized that in some configurations, a thicker dressing edge may provide a relative inward shift of the location of the peak tensile forces acting near the dressing edge, compared to dressings of uniform thickness. The elastic material may have a load per width when a dressing is applied to the skin of at least 0.35 Newtons per mm or a load per width of at least 0.25 Newtons per mm, or a load per width of at least 0.10 Newtons per mm. The elastic material may have a load per width when a dressing is applied to the skin of no greater than about 2 Newtons per mm, about 1 Newtons per mm, about 0.7 Newtons per mm or no greater than about 0.5 Newtons per mm The system elastic material may have a load per width that does not decrease from an engineering strain of 0% to 60%, a load per width plot that increases linearly from an engineering strain of 0% to 60%, or a load per width plot that is not convex from an engineering strain of 0% to 60%. The elastic material may comprise an adhesive configured to maintain a substantially constant stress in the range of 200 kPa to about 500 kPa for at least 8 hours when strained to an engineering strain of about 20% to 30% and attached to a surface. The dressing may comprise an adhesive on the elastic material configured to maintain a substantially constant stress in the range of 200 kPa to about 400 kPa for at least 8 hours when strained to an engineering strain of about 20% to 30% and attached to a surface. The substantially constant stress may vary by less than 10% over at least 8 hours, or by less than 5% over at least 8 hours.

Although the depicted dressings may have a generally rectangular configuration with a size of about 160 mm to about 50 mm, in other variations the dressing may have any of a variety of lengths and widths, and may comprise any of a variety of other shapes. Also, the corners of the dressing may be squared or rounded, for example. The lengths and/or widths of an exemplary dressing may be in the range of about 5 mm to about 1 meter or more, in some variations about 20 mm to about 500 mm, and in other variations about 30 mm to about 50 mm, and in still other variations about 50 mm to about 100 mm. In some variations, the ratio of the maximum dimension of the dressing (e.g. its length) to an orthogonal dimension to the maximum dimension (e.g. width), excluding the minimum dimension of the dressing (e.g. the thickness), may be in the range of about 1:1, about 2:1, about 3:1, about 4:1 about 5:1, about 6:1, about 7:1, about 8:1, about 9:1 or about 10:1 or greater. In some variations, the strain axis of the dressing in use may be oriented with respect to the maximum dimension or to the orthogonal dimension to the maximum dimension. In some variations, the final compressive stress and strain imposed onto the skin by the elastic material may be the result of the dynamic equilibrium between the tensile stress in the skin and the elastic material of the dressing. The elastic material and the adhesive region may be configured to be applied to a skin location so that when the dressing is stretched to a particular tension and then adhered to the skin site, tensile stress in the dressing is transferred to the skin site to compress the tissue directly under the dressing along a tangential axis to the skin surface, the stress and strain imposed onto the skin location has a net or resultant orientation or axis is also generally tangential or planar to the elastic material and/or the outer surface of the skin location, with a similar axis to the orientation or axis of the tensile stress in the dressing. The tension in the dressing will relax to a tension level that maintains equilibrium with increased tension in the skin adjacent to the dressing. The application of the dressing to the skin location may involve the placement of the dressing without overlapping or being wrapped onto itself, e.g. wherein only adjacent regions of the dressing are interconnected and wherein non-adjacent regions of the dressing are not interconnected. The actual amount of stress and strain imposed on the skin may vary, depending upon the particular person, skin location, the thickness or various mechanical characteristics of the skin layers (e.g. epidermis, dermis, or underlying connective tissues), and/or the degree of pre-existing scarring, for example. In some further variations, the skin treatment dressing may be selected or configured for use at a specific body location, such as the scalp, forehead, cheek, neck, upper back, lower back, abdominal region, upper torso (including but not limited to the breast folds), shoulder, upper arm, lower arm, palm regions, the dorsum of the hand, finger, thigh, lower leg, the dorsum or plantar surface of the foot, and/or toe. Where applicable, some body regions may be further delineated into anterior, posterior, medial, lateral, proximal and/or distal regions, e.g. the arms and legs.

The dressing may be configured to impose a skin strain in the range of about 10% or less to about 60% or more, in other configurations about 15% to about 50%, and in still other configurations, about 20% to about 30% or about 40%. To achieve the desired degree of skin strain, the dressing may be configured to undergo elastic tensile strain in the range of about 20% to about 80% or more, sometimes about 30% to about 60%, and other times about 40% to about 50% or about 60%. The dressing may comprise any of a variety of elastic materials, including but not limited to silicones, styrenic block copolymers, natural rubbers, fluoroelastomers, perfluoroelastomers, polyether block amides, thermoplastic elastomers, thermoplastic polyurethane, polyisoprene, polybutadiene, and the like. The material of the exemplary dressing may have a Shore A durometer in the range of about 20 to about 90, about 30 to about 80, about 50 to about 80. The exemplary dressing was constructed of MED 82-5010-05 (MED 4050) by NUSIL TECHNOLOGY LLC (Carpinteria, CA). Other examples of suitable materials are described in U.S. application Ser. No. 11/888,978, which was previously incorporated by reference in its entirety. Other exemplary materials include the DUPONT™ LIVEO™ QP1-60 silicone elastomer (DuPont; Wilmington, DE), or LAIMEISI silicone elastomer (Shenzhen Laimeisi Silicone Industry; Shenzhen, China).

When the dressing is applied to a skin location and allowed to at least partially recover to its base configuration, the recovery level or equilibrium level of strain in the dressing may be in the range of about 10% or less to about 60% or more, in other configurations about 15% to about 50%, and in still other configurations, about 20% to about 30% or about 40%. The ratio between the initial engineering tensile strain placed onto the dressing before recovery and the resulting engineering compressive strain in the skin may vary depending upon the skin type and location, but in some examples, may be about 2:1. In other examples, the ratio may be in the range of about 4:1 to about 5:4, about 3:1 to about 5:3, or about 5:2 to about 2:1. These skin strain characteristics may be determined with respect to a reference position of the body or body part, e.g. anatomical position, to facilitate reproducible measurements. The particular degree of strain may be characterized as either an engineering strain or a true strain, but may or may not be calculated based upon or converted from the other type of strain (e.g. the strain may be based upon a 45% engineering strain that is converted to a true strain).

In some further variations, one or more characteristics of the elastic material may correspond to various features on the stress/strain curve of the material. For example, the engineering and true stress/strain curves for one specific example of the dressing comprises a material that exhibits an engineering stress of about 1.2 MPa at about 60% engineering strain within a period of initial straining. In other examples, the engineering stress within a period of initial straining may be in the range of about 900 kPa to about 2.5 MPa, about 1 MPa to about 2.2 MPa, about 1 MPa to about 2 MPa, about 1.1 MPa to about 1.8 MPa, about 1.1 MPa to about 1.5 MPa, about 1.2 MPa to about 1.4 MPa. When unloading or relieving stress from the dressing, the material may be configured with an engineering stress of about 380 kPa at about 40% engineering strain, but in other examples, the engineering stress during unloading of the material to about a 40% strain may be in the range of about 300 kPa to about 700 kPa, about 325 kPa to about 600 kPa, about 350 kPa to about 500 kPa, or about 375 KPA to about 425 kPa. When unloading the material to an engineering strain of about 30%, the material may exhibit an engineering stress of about 300 kPa, but in other examples, the engineering stress when unloading the material to about 30% strain may be in the range of about 250 kPa to about 500 kPa, about 275 kPa to about 450 kPa, about 300 kPa to about 400 kPa, or about 325 KPA to about 375 kPa. When unloading to an engineering strain of about 20%, the material may have an engineering stress of about 100 kPa, but in other examples, the unloading engineering stress at about 20% may be in the range of about 50 kPa to about 200 kPa, about 75 kPa to about 150 kPa, or about 100 kPa to about 125 kPa. According to some variations, the thickness of the material may be more or less by a particular factor and the engineering stresses may be similarly factored, i.e., for example, with the engineering stress increasing with a thinner material. In some examples, the material may be configured to at least achieve a specific range or level of engineering stress at each of the specified engineering strain levels described above, but in other examples, the material may be configured for lower levels of maximum engineering strain at the time period of initial straining, e.g. up to about 30% or about 40% or for higher maximum engineering strain and higher engineering stress at the time period of initial straining, e.g. greater than 60% engineering strain.

In some examples, certain portions of the stress/strain curve may have a particular morphology. For example, for a particular level of maximum strain at the time of initial straining, the loading curve may be generally linear on the corresponding true stress/strain curve. In an example using a dressing described herein, up to a true strain of about 45%, the loading curve had a generally linear configuration. In other examples, the configuration may only be linear along a portion of the loading curve or may be curved along the entire loading curve. Where the loading curve is non-linear, the loading curve may be convex, concave or both. Also, in some examples, the tangent line of the loading curve (i.e. the line between the two triangles) may also be generally co-linear.

In some variations, the elastic material may comprise a material having an elastic modulus E of at least about 1 MPa, about 1.5 MPa, about 2 MPa, about 2.5 MPa, about 3 MPa, about 3.5 MPa, about 4 MPa, about 5 MPa, about 6 MPa, about 7 MPa, about 8 MPa, about 9 Mpa, about 10 Mpa, about 11 MPa, about 12 MPa, about 13 MPa, about 14 MPa, or at least about 15 MPa or greater. The material elastic modulus E may be no greater than about 20 MPa, about 15 MPa, about 10 MPa, about 9 MPa, about 8 MPA, about 7 MPa, about 6 MPa, or about 5 MPa, or about 4 MPa.

In addition to the absolute stress levels at certain strain levels described above, the material may also be characterized with respect to the ratio between a) the stress to achieve a particular strain during loading, and b) the stress at the same strain during unloading. For example, the material may have a ratio of at least 4:1 to about 3:2 at each of the 20%, 30% and 40% strain levels, but in other examples, the material may exhibit these ratios only at 20%, at 30%, or at 40% strain levels, or at both 20% and 30% but not 40%, or at both 30% and 40% but not 20%. In other examples, the ratio at one, some or all of the strain levels may be in the range of about 3:1 to about 2:1, or about 5:2 to about 2:1.

In some examples, the elastic material of the dressing may be configured under testing conditions to achieve a stable level of stress at a constant strain, e.g. the material exhibits a limited amount of stress relaxation over a particular period of time and at a particular level of strain. The period of time may be at least about 8 hours, about 12 hours, about 18 hours, about 24 hours, about 36 hours, about 48 hours, about 72 hours, about 4 days, about 5 days, about 6 days, or about a week or more. The level of strain may be about 10%, about 20%, about 30%, about 40%, about 50%, about 60%, about 70%, or about 80% or more. The stress of the exemplary dressing over various time curves may be configured to maintain an engineering stress of about 300 kPa at an engineering strain of about 30% without noticeable deviation over a period of about 1 hour, about 2 hours, about 3 hours, about 4 hours, about 5 hours, about 6 hours, about 7 hours, or about 8 hours or more. The stresses at 10% strain, 20% strain, and at 40% may be lower or higher.

In some variations, the elastic material or the dressing may be configured under testing conditions to maintain a particular minimum level of stress when held at a constant strain over a particular time period. In an example to assess the ability of a backing material to maintain a stress and strain on skin over time, engineering strains were measured while each backing material was tensile strained to 60% at a rate of 100 microns per second and held for 10 minutes, and then dropped to a strain of 30% at a rate of 100 microns per second and held for 9 hours. For example, the exemplary dressing is able to maintain an engineering stress level of about 350 kPa at an engineering strain of 30%. In some other examples, the minimum level of stress may be about 100 kPa, about 120 kPa, about 140 kPa, about 160 kPa, about 180 kPa, about 200 kPa, about 220 kPa, about 240 kPa, about 260 kPa, about 280 kPa, about 300 kPa, about 320 kPa, about 340 kPa, about 360 kPa, about 380 kPa, about 400 kPa, about 420 kPa, about 440 kPa, about 460 kPa, about 480 kPa, about 500 kPa, about 600 kPa, about 700 kPa, about 800 kPa, about 900 kPa or about 1000 kPa or greater. The level of constant strain may be different in other configuration, with a level of about 15%, about 20%, about 25%, about 30%, about 35%, about 40%, about 45%, about 50%, about 55%, about 60%, about 65%, about 70%, about 75%, or about 80%. The time period over which the dressing is able to maintain a stress level may be at least about 2000 seconds, about 3000 seconds, about 4000 seconds, about 5000 seconds, about 6000 seconds, about 7000 seconds, about 8000 seconds, about 9000 seconds, about 10000 seconds, about 20000 seconds, about 30000 seconds, about 40000 seconds, about 50000 seconds, about 60000 seconds, about 70000 seconds, about 24 hours, about 36 hours, about 48 hours, about 72 hours, about 4 days, about 5 days, about 6 days, about 7 days, about 10 days, about 2 weeks, about 1 month or more. In some variations, the dressing, the elastic material and/or the adhesive material is configured to exhibit less than about a 15% change in stress or strain level over the particular period when applied to a skin surface or test surface. In other examples, the degree of change may be about 12%, about 10%, about 8%, about 6%, about 5%, about 4%, about 3%, or about 2% or less. The stress or strain may be an engineering stress or strain, and/or a true stress or strain. In some variations, a dressing comprises an elastic sheet structure (e.g., a silicone sheet) having an upper surface, a lower surface, a first edge and a second edge opposite the first edge, and one or more adhesive regions. The dressing may further comprise a first release liner releasably attached to the adhesive region or regions. The adhesive region(s) may comprise a pressure sensitive adhesive. The dressing may be tapered or otherwise shaped to reduce skin tension at the edges. The dressing may have modified, reduced or no adhesive near its edges to reduce skin tension at the edges. Portions of the dressing may be unstrained and may thereby reduce strain in certain areas of the skin where the dressing is applied. In some specific examples, the unstrained area or areas are found between the edges of the dressing and the strained area(s). In some further examples, the unstrained areas are limited to this area and are not found, during application or use, between the strained areas of a single dressing, in use. In still further examples, the unstrained areas are limited to areas along the edges of a dressing that intersect the strain axis of the strained area(s), but not to areas along the edges of the dressing that are generally parallel to the strain axis.

The adhesive used to attach a dressing to the skin may be, for example, a pressure activated adhesive (PSA), as a silicone, acrylic, styrene block copolymer, vinyl ether, nitrile or other PSA. In other variations, a non-pressure sensitive adhesive may be used, including but not limited a heat or light-cured adhesive. The pressure sensitive adhesive may be made from, e.g., polyacrylate-based, polyisobutylene-based, silicone-based pressure sensitive adhesives, and the like. The T-peel release force and blunt probe tack force of the adhesive may be measured by a standardized test method, such as ASTM D1876 and ASTMD2979 or other appropriate method. In some variations, the T-peel release force or blunt probe tack test value of the adhesive is configured to maintain loads of at least about 50 mPa/mm for at least about 24 hours, about 48 hours, about 72 hours, about 1 week, about 2 weeks, about 3 weeks, about 4 weeks or more. In other variations, the loads may be at least about 75 mPa/mm, about 100 mPa/mm, about 125 mPa/mm, or at least about 150 mPa/mm over the particular time period. The degree of adhesion (e.g. as measured by the T-peel release force or blunt probe tack test value) may vary depending upon the degree of strain placed onto the skin or incision site, and in some variations, these time periods may be based upon an average skin strain of about 10%, about 20%, about 30%, about 40%, or about 50% or more. In some variations, the adhesive may have a T-peel release force of at least about 150 kg/m, about 160 kg/m, about 170 kg/m, about 180 kg/m, about 190 kg/m, about 200 kg/m, about 210 kg/m, about 220 kg/m, about 230 kg/m, about 240 kg/m, about 250 kg/m, about 260 kg/m, about 270 kg/m, about 280 kg/m, about 290 kg/m, about 300 kg/m, about 310 kg/m, about 320 kg/m, about 330 kg/m, about 340 kg/m, about 350 kg/m, about 400 kg/m, about 450 kg/m, or at least about 500 kg/m or higher. In some further variations, the T-peel release force may be no greater than about 1000 kg/m, about 900 kg/m, about 800 kg/m, about 700 kg/m, about 600 kg/m, about 500 kg/m, about 400 kg/m or about 300 kg/m. The blunt probe tack test value of the adhesive may be at least about 0.50 kg, about 0.55 kg, about 0.60 kg, about 0.65 kg, about 0.70 kg or about 0.75 kg or higher, and may be no greater than about 1 kg, about 0.9 kg, about 0.8 kg, about 0.7 kg, or about 0.6 kg. The T-peel release force and blunt probe tack force may be measured by a standardized test method, such as ASTM D1876 and ASTMD2979 or other appropriate method. Other features or variations of the device are described in U.S. application Ser. No. 11/888,978, filed on Aug. 3, 2007, incorporated in its entirety herein by reference.

A release liners that protects the skin adhesive before application may comprise any of a variety of materials, including both opaque and transparent materials. The release liners may comprise Mylar or paper, or any other material with reduced adhesion to the adhesive material(s) of the device. In variations where the device has multiple separate adhesive regions, separate release liners may be provided for each region, or some regions may be covered by the same release liner.

The dressing packaging device, dressing support and/or dressing applicator may also comprise a tensioning device configured to stress and/or strain a dressing prior to application to a subject. A device may be used to strain and/or maintain a strain on a dressing.

Referring to FIG. 1A, a dressing 110 is shown in a first configuration where it is relatively unstrained. The dressing 110 may comprise an elastic sheet 160, such as a silicone sheet or other elastic material, for example, as described herein, with one or more adhesive regions comprising a layer of skin adhesive 140. The adhesive 140 may be applied before straining the dressing 110 as shown in FIG. 1A or after straining the dressing 110. The adhesive used may be, for example, a suitable pressure activated adhesive (PSA), or a non-pressure sensitive adhesive.

The dressing 110 may be coupled in an unstrained configuration (FIG. 1A) at its edges or sides 105, 106, by way of a high tack adhesive to the outer surface 132 of a support structure 130 at the sides 135, 136 of the support structure 130. An adhesive 125 may be applied between sides 135, 136 of the support structure 130 where the dressing 110 is to be attached to the inner surface 131 of the support structure 130. The adhesive 125 may be continuous or discontinuous. Other attachment structures as described herein may additionally or alternatively be used to attach the dressing 110 in a strained configuration to the support structure 130. The dressing 110 may be strained by pulling the edges or sides 135, 136 apart, with or without pushing the peak or central region 170 of the support structure 130 toward the dressing 110, straightening the support structure 130, and by applying a pressure to the dressing 110 against the adhesive 125 to secure the dressing in a stressed configuration. For example, clamps may be attached to the support structure 130 at opposing sides 135, 136 and then pulled apart to strain the dressing and straighten the support structure 130.

Figure 1B:
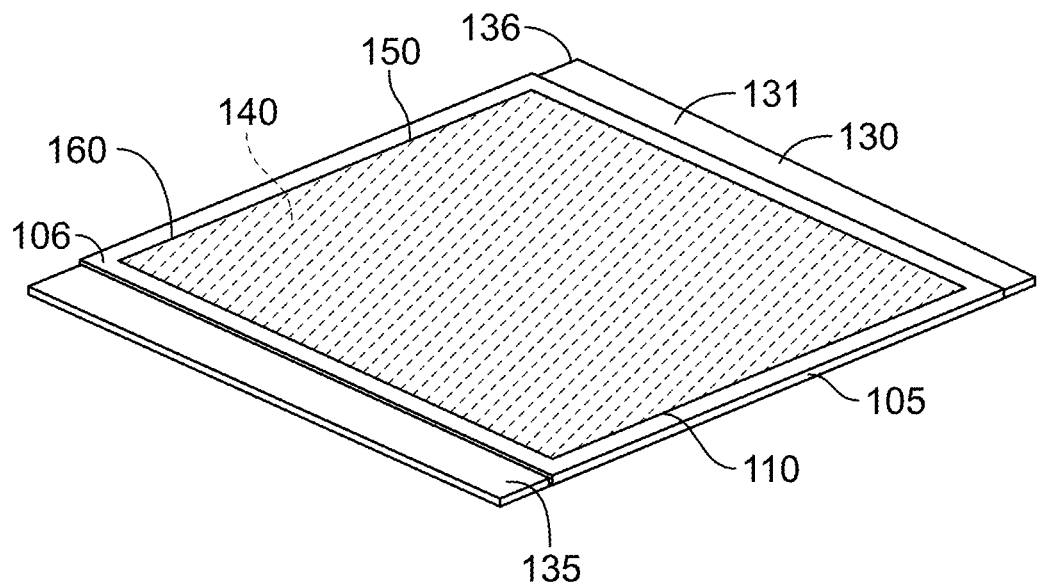
FIG. 1B is a top perspective view of the dressing and support structure of FIG. 1A in a pre-strained configuration.
Figure 1C:
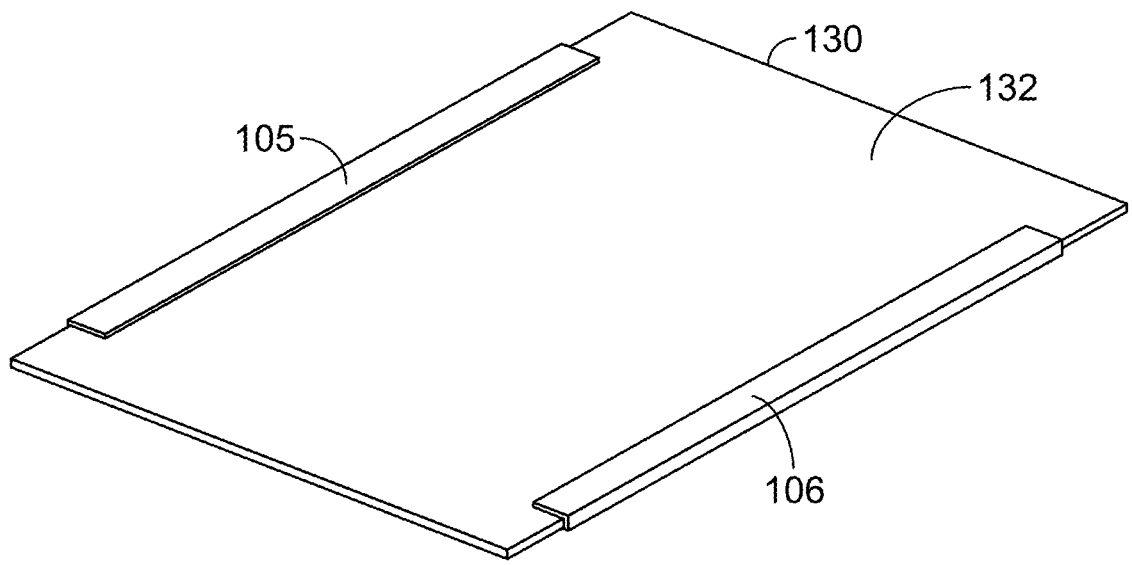
FIG. 1C is a bottom perspective view of a dressing and support structure of FIG. 1A in a pre-strained configuration.

The support structure 130 and adhesive 125 (or other attachment structures) maintain the dressing 110 in its strained configuration as shown in FIGS. 1B and 1C. The skin adhesive layer 140 may be applied to the top surface 111 of the dressing 110 and a removable liner 150 is placed over the adhesive layer 140. This process thus forms a pre-strained dressing 110 with a pre-attached, unstrained adhesive layer 140, but in other variations, the adhesive layer 140 may be applied before the pre-straining process, thereby forming a pre-strained dressing 110 with a pre-strained adhesive layer 140. In some variations, the removable liner 150, in contrast to traditional release liners for adhesive dressings comprising paper or polymeric films, comprises an elastic material that can be adhered to the adhesive layer 140 and dressing 110 prior to straining and then is pre-strained along with the adhesive layer 140 and dressing 110. In other variations, the adhesive may be pre-applied to the release liner, and then the combined release liner and adhesive layer is then attached to the dressing.

In use, the adhesive liner 150 is removed and the dressing 110 may be applied to the surface of a subject's skin. The support structure 130 may then be removed from the dressing 110 whereupon the stress or strain of the dressing strains the skin and/or applies a compressive force to the skin and/or compressively strains the skin to thereby treat the skin. The liner 150 may further provide support, at least in part, to maintain the strain in the dressing 110.

The support structure 130 may be removed from the dressing 110 by peeling the support structure 130 from the dressing 110 where the adhesion between the dressing 110 and the support structure 130 is less than the adhesion between dressing 110 and the skin to which it is applied. Alternatively, the dressing 110 may include a release mechanism as further described herein, for example, as described with respect to FIGS. 3A to 3I.

Figure 2A:
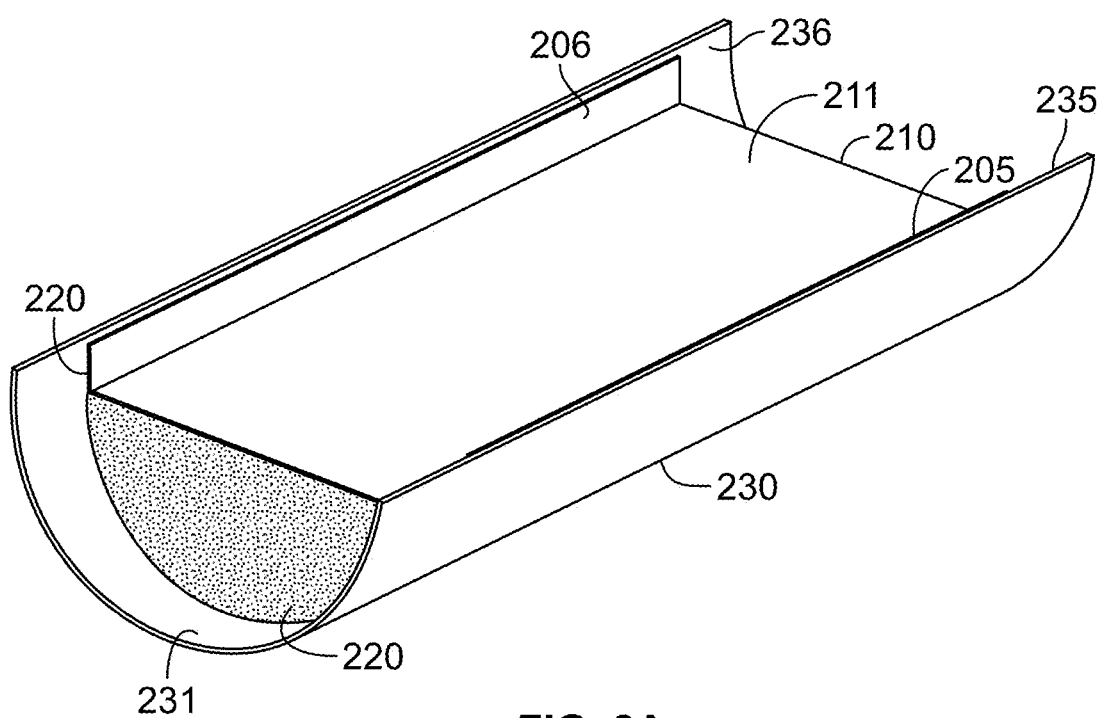
FIG. 2A is a perspective view of a dressing and support structure in a first position
Figure 2B:
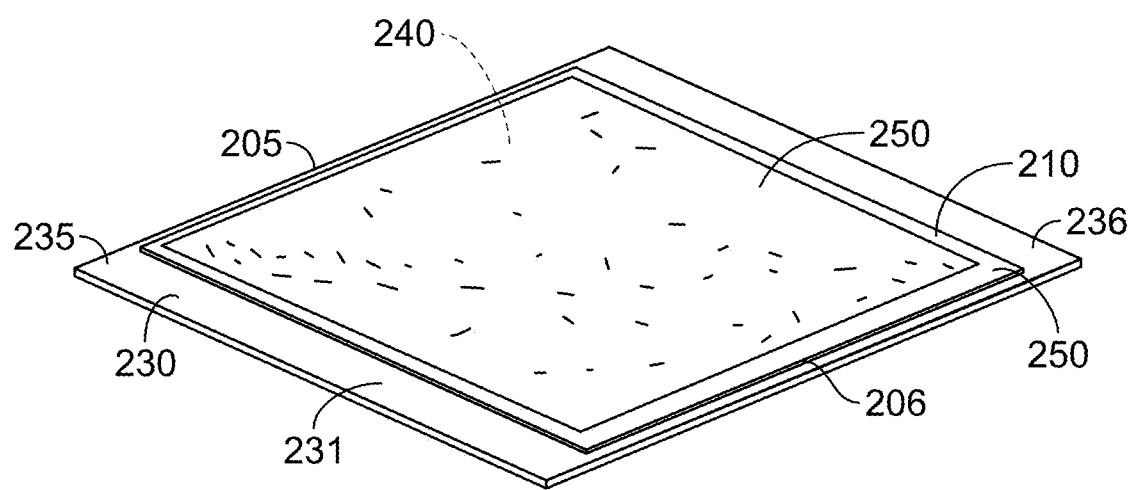
FIG. 2B is a top perspective view of the dressing and support structure of FIG. 2A in a pre-strained configuration.

Referring to FIG. 2A, a dressing 210 is shown in a first configuration where it is relatively unstrained. The dressing 210 may comprise an elastic sheet, such as a silicone sheet or other elastic material, for example, as described herein, with one or more adhesive regions comprising a layer of skin adhesive 240. The adhesive used may be, for example, a suitable pressure activated adhesive (PSA), or a non-pressure sensitive adhesive. The dressing 210 may be coupled at its edges or sides 205, 206 by way of a high tack adhesive 220, to the inner surface 231 of a support structure 230 at its sides 235, 236. A relatively continuous layer of the high tack adhesive 220 may be further applied on the inner surface 231 between sides 235, 236 of the support structure 230 where the dressing 210 is to be attached to the inner surface 231 of the support structure 230. Other attachment structures, for example, as described herein may additionally or alternatively be used to attach the dressing 210 in a strained configuration to the support structure 230. The dressing 210 may be strained by pulling the edges or sides 235, 236 of the support structure 230 apart, straightening the support structure 230, and applying pressure to the dressing 210 against the adhesive 220. For example, clamps may be attached to the support structure 230 at opposing edges 235, 236 and then pulled apart to strain the dressing 210 and straighten the support structure 230. The support structure 230 and adhesive 220 (or other attachment structures) may maintain the dressing 210 in its strained configuration as shown in FIG. 2B. A skin adhesive layer 240 may be applied to the top surface 211 of the dressing 210 and a removable liner 250 is placed over the adhesive layer 240. The adhesive liner 250 may further provide support, at least in part, to maintain the strain in the dressing 210.

In use, the liner 250 is removed and the dressing 210 may be applied to the surface of a subject's skin. The support structure 230 may then be removed from the dressing 210 whereupon the stress or strain of the dressing applies a (tangential) compressive force to the skin to thereby treat the skin.

The dressing 210 may include a release mechanism as further described herein, for example, as described with respect to FIGS. 3A to 3I.

Referring to FIGS. 3A to 3I, preparation of a pre-strained assembly 351 that includes a pre-strained dressing is illustrated. A tensioning device 341 used to prestrain the dressing is shown in use in FIGS. 3A to 3D. Various features and stages of preparing prestrained assembly 351 are further shown in FIGS. 3E to 3I.

The pre-strained assembly 351 may comprise a dressing assembly 308 and strain maintaining structure or support structure 330. (See FIG. 3I) The pre-strained assembly 351 may be stored for a period of time prior to use.

The dressing assembly 308 may include a dressing 310 comprising a relatively planar elastic sheet 360 defining a plane. The elastic sheet 360 may comprise a silicone sheet or other elastic material, for example, as described herein. The dressing assembly 308 may further comprise an attachment sheet 304, tensioning sheet 307, a pre-strained assembly release 352 and a dressing release 319.

The attachment sheet 304 may be configured to attach the dressing 310 to a support structure 330 by way of engaging element 322. The attachment sheet 304 of the dressing assembly 308 may include a first engaging wall or element 322 extending downward with respect to the plane of the dressing 310 and including an inwardly extending hook 323. Engaging element 322 may be attached to the attachment sheet 304, for example, with an adhesive. The tensioning sheet 307 of the dressing assembly 308 may include a second engaging element 324 extending downward with respect to the plane of the dressing 310 and including an inwardly extending hook 325. The tensioning sheet 307 may be configured to attach the dressing 310 to the support structure 330 by way of engaging element 324. Engaging element 324 may be attached to tensioning sheet 307, for example, with an adhesive. The tensioning sheet 307 may also be configured to translate tension from the tensioning device 341 to the dressing 310 to strain the dressing 310.

Figure 3A:
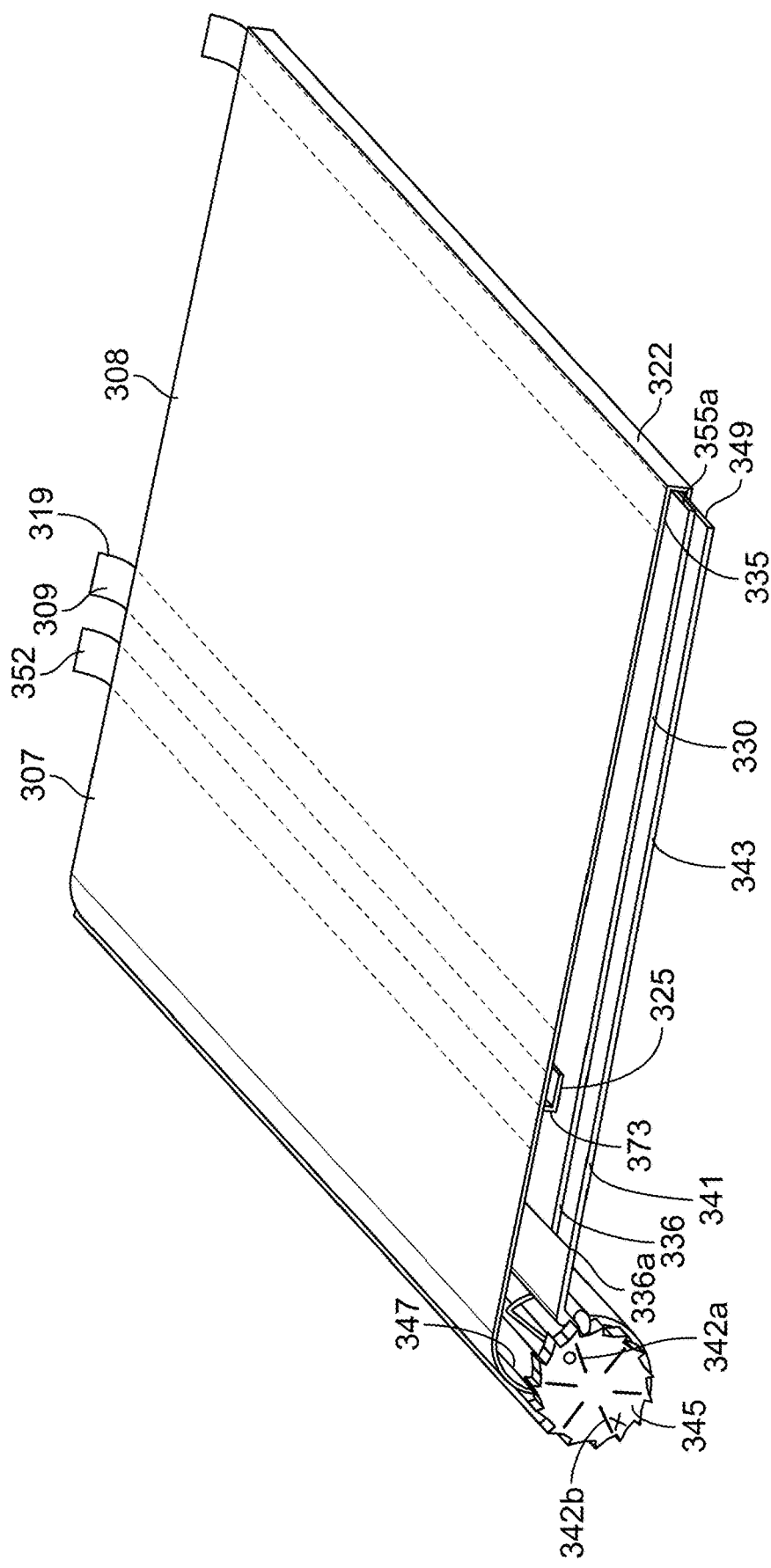
FIG. 3A is a top perspective view of the dressing assembly, support structure, and tensioning device in a relatively unstrained configuration.
Figure 3B:
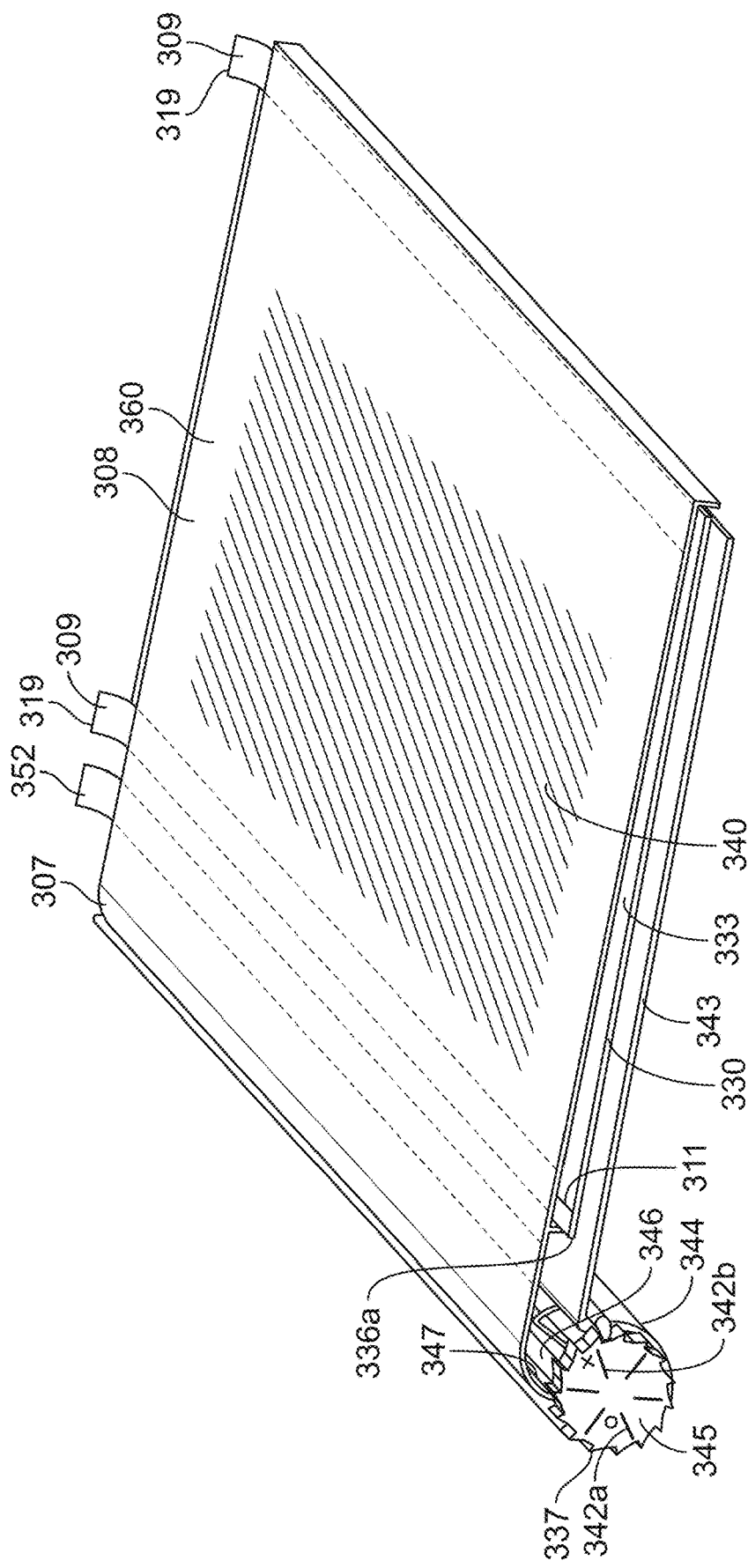
FIG. 3B is a top perspective view of the dressing assembly, support structure, and tensioning device in a pre-strained configuration.
Figure 3C:
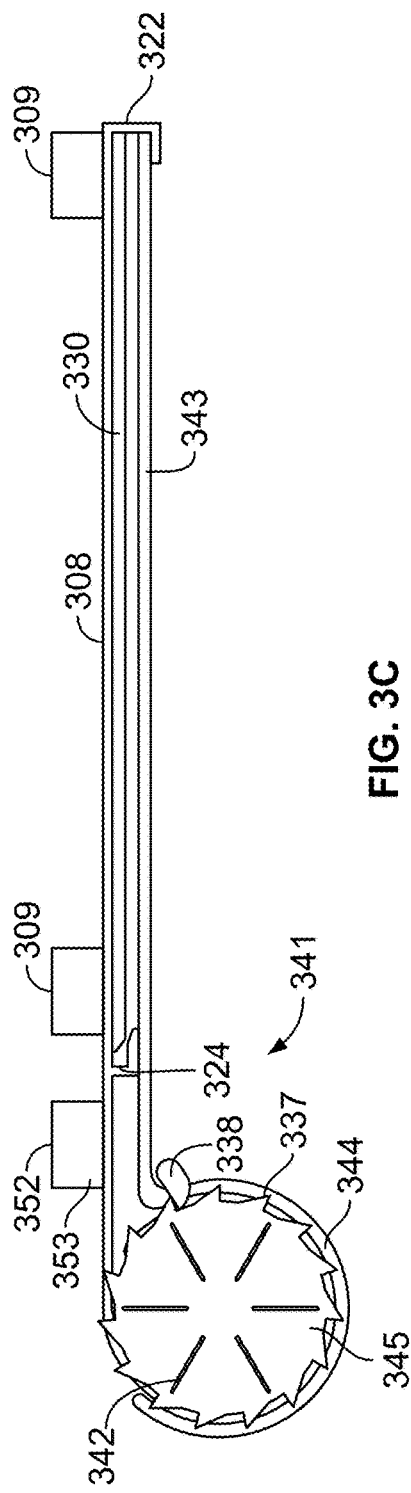
FIG. 3C is a schematic side view of the dressing assembly, support structure and tensioning device of FIG. 3B.
Figure 3D:
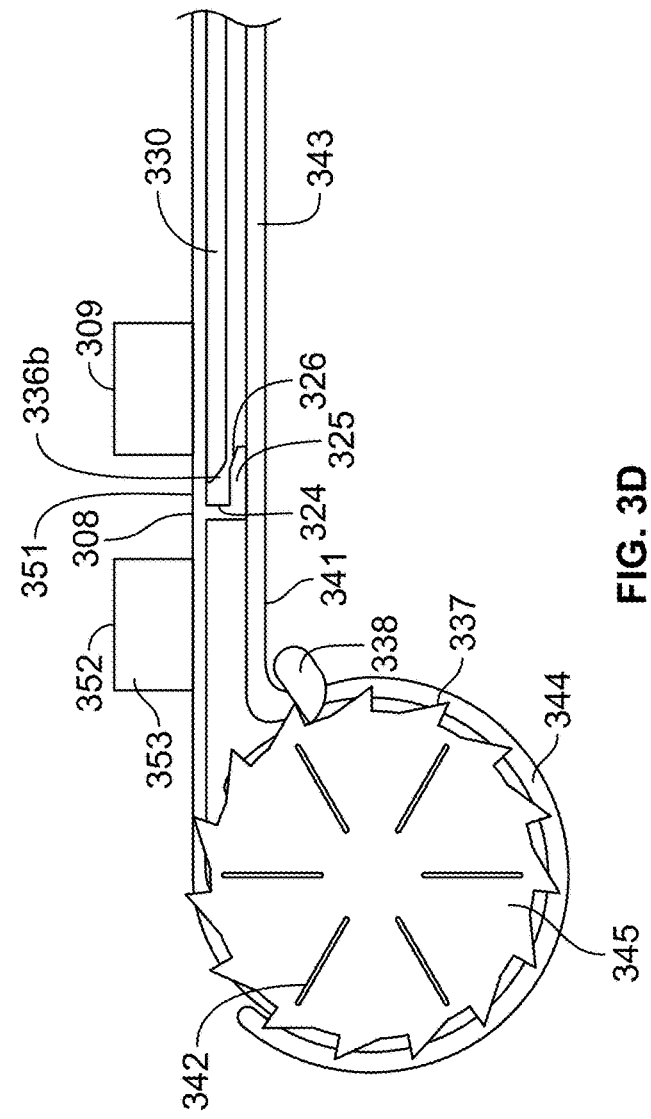
FIG. 3D is an enlarged schematic side sectional view of the dressing assembly, support structure, and tensioning device of FIG. 3C.
Figure 3G:
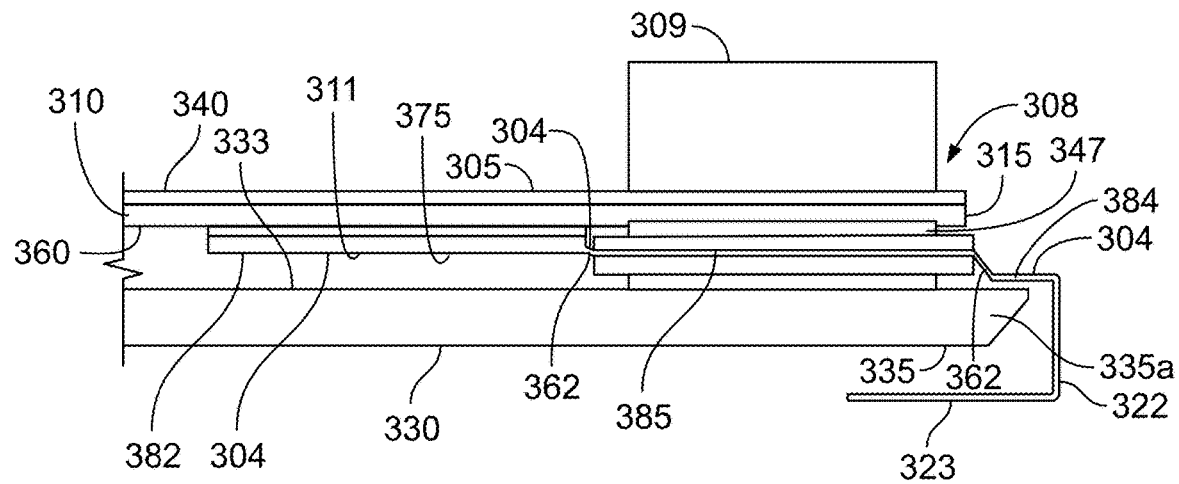
FIG. 3G is an enlarged side view of the dressing assembly and support structure of Section A of FIG. 3F
Figure 3H:
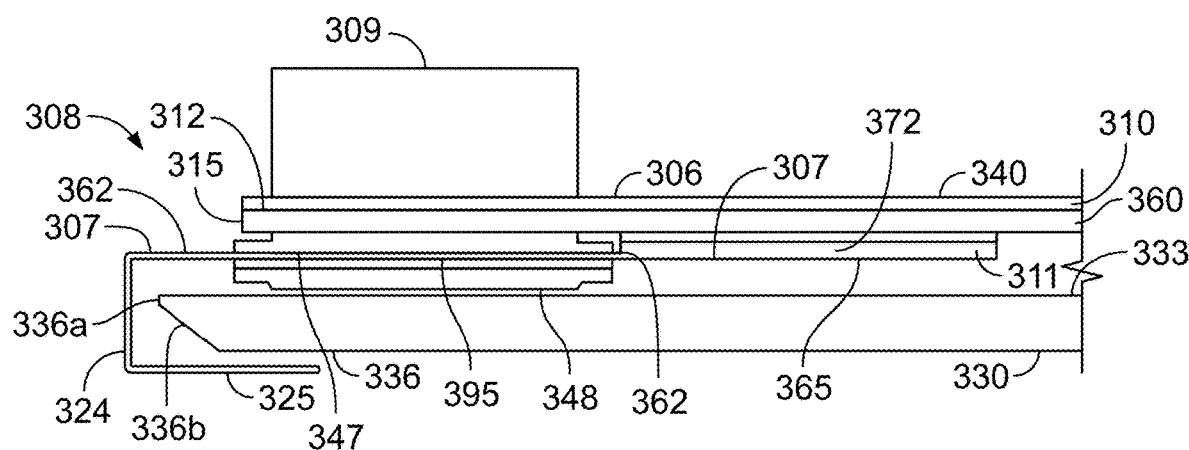
FIG. 3H is an enlarged side view of the dressing assembly and support structure of Section B of FIG. 3F.
Figure 3I:
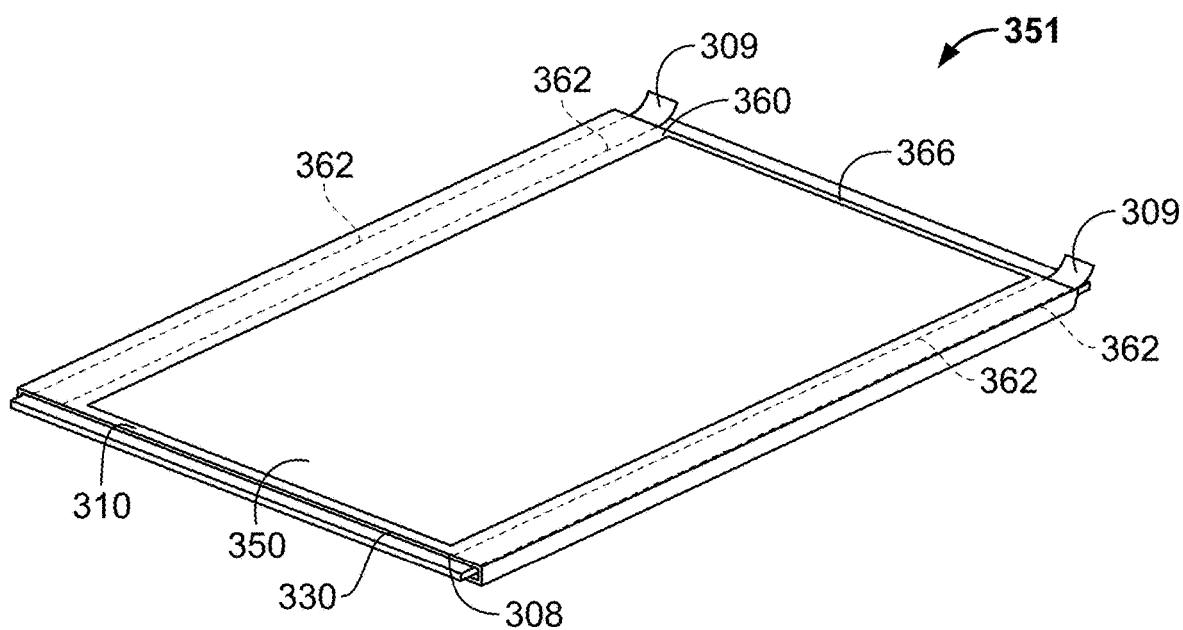
FIG. 3I is a top perspective view of a pre-strained assembly including remaining elements of a dressing assembly and a support structure.

The pre-strained assembly release 352 may be configured to release the pre-strained assembly 351 (the dressing 310 and support structure 330) from the tensioning device 341 (see, e.g., FIGS. 3E and 3I). The dressing release mechanism 319 may be configured to release the dressing 310 from the engaging elements 322, 324 (including hooks 323, 325) and thus from the support structure 330. The dressing release mechanism 319 may be configured to release the dressing 310 after the dressing 310 is applied to a subject.

The dressing 310 of the dressing assembly 308 may have a first edge or side 305 having a length, and a second edge or side 306 having a length. The dressing 310 may be coupled at a first edge or side 305 to the attachment sheet 304 which may be flexible yet relatively less elastic or in-elastic than the dressing 310. The attachment sheet 304 may have a first side 382 and a second side 384. When assembled, the attachment sheet 304 may be bonded to the elastic sheet 360 of the dressing 310 at section 375 of attachment sheet 304 at or near the side 382 of the attachment sheet 304, for example, using a combination of a silicone PSA/acrylic PSA. The attachment sheet 304 may be coupled at its side 384 to engaging element 322 and hook 323, for example, by bonding with an adhesive material, e.g., using a combination of a silicone PSA/acrylic PSA. The attachment sheet 304 may couple the dressing 310 by way of engaging element 322 and hook 323, to the support 330 near the first side 305 of the dressing 310. The dressing 310 may be coupled at its second edge or side 306 to the tensioning sheet 307 which may be flexible yet non-elastic or less elastic than the dressing 310. The tensioning sheet 307 may have a first side 372 a middle location 373 and a second side 374. When assembled, the tensioning sheet 307 may be bonded to the elastic sheet 360 of the dressing 310 at section 365 of tensioning sheet 307 at or near the side 372 of the tensioning sheet 307, for example, using a combination of a silicone PSA/acrylic PSA. The tensioning sheet 307 may be coupled at a middle location 373 to side wall 324 and hook 325, for example, by bonding with an adhesive material, for example, using a combination of a silicone PSA/acrylic PSA. When assembled into the pre-strained assembly 351, the tensioning sheet 307 may couple the dressing 310 by way of side wall 324 and hook 325 to the support structure 330 near the second side 306 of the dressing 310. The tensioning sheet 307 may be loaded onto the tensioning device 341 at the second side 374 as described in more detail herein. According to some variations, the attachment sheet 304 or tensioning sheet 307 may be constructed, e.g., out of a low density polyethylene.

The dressing assembly 308 is shown in FIG. 3A, positioned over a support structure 330 to which it may be removably attached when or after the dressing 310 is pre-strained to form the pre-strained assembly 351. The support 330 may be generally planar and include sides 335, 336 with corresponding edges 335a and 336a defining its length. Other support elements, support structures and/or strain maintaining elements may be used, for example, the sides of the dressing 310 or dressing assembly 308 may be clamped and a desired distance maintained between the clamps, e.g., using a separating element.

The dressing 310 of the dressing assembly 308 may be strained, for example, with a tensioning device 341 as shown in FIGS. 3A to 3D. The pre-strained dressing 310 may then be stored in a pre-strained configuration for a period of time prior to use. The tensioning device 341 may be used at a point of manufacture, by an intermediary, or by an end user. The tensioning device 341 may comprise a planar portion 343 and a circular portion 344 configured to contain a rotating element 345. The rotating element 345 may have a middle section 346 with a slot 347 to receive and engage the tensioning sheet 307 of the dressing assembly 308.

In FIG. 3A the dressing assembly 308 may be shown in a first configuration on the tensioning device 341 where it is relatively unstrained. The dressing assembly 308 may be positioned over support structure 330. This support structure 330 may be positioned over the tensioning device 341 with the upper surface 333 of the support structure 330 interfacing the back side 311 of the dressing 310. A first edge 335a of the support structure 330 and a first side or edge 349 of the planar portion 343 of the tensioning device 341 may be engaged and held by engaging wall 322 and hook 323. The second end 336 and edge 336a of the support 330 may initially be free from engagement with but is in a position interfacing the dressing 310. This may permit the dressing 308 to be strained to a desired degree without interference of the support structure 330.

In use, the end 374 of the tensioning sheet 307 may be inserted into the slot 347 in the middle section 346 of the rotating element 345 of the tensioning device 341. Then the rotating element 345 may be rotated until the tensioning sheet 307 is engaged. Initially the tensioning sheet 307 and dressing 310 may be in an unstrained configuration but with minimal slack, when attached to the tensioning device 341. As the rotating element 345 is rotated, the dressing 310 may be strained as the tensioning sheet 307 is pulled in a tensile straining direction with respect to the dressing 310 by the rotating element 345.

The dressing 310 may be strained by turning the rotating element 345 as shown in FIGS. 3A-3D. Once the tensioning sheet is loaded as the rotating element 345 is turned, the tensioning sheet 307 may wrap around the rotating element 345 thereby shortening the distance between the rotating element 345 and the dressing 310, to stretch or strain the dressing 310. A locking mechanism comprising ratchets 337 on the rotating element 345 and a pawl 338 on the circular portion 344 may be used to lock the dressing 310 in a strained configuration as shown in FIGS. 3B to 3D. When the tensioning sheet 307 is pulled in a tensile straining direction towards the circular portion 344 of the tensioning device 341, the engaging element 324 and hook 325 may also move in the tensile straining direction. The edges 336a of the support comprises a ramp 336b that may engage with a ramp 326 on the hook 325 to guide the edge 336a of the support 330 into engagement with the hook 325 as the hook 325 moves towards the circular portion 344 of the tensioning device. (See FIGS. 3C to 3H). The strain of the pre-strained dressing 310 may be controlled or determined using measurement elements or marks 342 on the rotating element 345 the distance between each of which may correspond to an increment of increased strain or distance. Once a dressing assembly 308 is loaded on the tensioning device 341, the strain may be determined by the amount the rotating element 345 rotates. Each mark 342 may correspond to a percentage strain or a distance. A 0% strain may be identified as the position in which the dressing assembly 308 is loaded onto the tensioning device 341 with no slack and minimal strain or tension. As shown in FIG. 3A the 0% position may be shown where mark 342a is aligned with the pawl 338. As the rotary element 345 is rotated, the identified 0% mark 342a may rotate a certain degree which corresponds to a percent strain. Mark 342b as shown in FIG. 3B is aligned with the pawl 338 when the dressing is strained to a desired amount x indicated by mark 342b.

The support structure 330 may maintain the dressing 310 in its strained configuration as shown in FIGS. 3B to 3I during storage where the engaging elements 322, 324 and hooks 323, 325 engaging the support structure 330, prevent movement of the dressing 310 or loss of strain. One or more adhesive regions comprising a layer of skin adhesive 340 may be applied to the top surface 312 of the dressing 310. The adhesive 340 used may be, for example, a suitable pressure activated adhesive (PSA), or a non-pressure sensitive adhesive. The adhesive 340 is shown on a dressing 310 in an unstrained configuration. However, the adhesive may be applied to the dressing 310 after the dressing 310 has been strained. A removable liner 350 may be placed over the adhesive layer 340. The liner 350 may further be selected to maintain the strain in the dressing 310. Such liner may comprise rigid or semi-rigid material, for example, ultra-high molecular weight polyethylene (UHMWPE) with a release coating or layer, e.g., a fluoropolymer such as perfluoroalkoxy (PFA), fluorinated ethylene propylene (FEP), polytetrafluoroethylene (PTFE) or expanded PTFE (ePTFE). Other hard plastics or resins that may be used include melamine, fiberglass, acrylonitrile butadiene styrene (ABS) or polyvinyl chloride (PVC). In other variations, the rigid liner may be a composite structure comprising a flexible liner with a rigid frame or rigid struts, which may comprise, for example, a metal (e.g. stainless steel), or a hard plastic/resin.

Once the dressing 310 is strained and the dressing assembly 308 may be secured in engagement with the support structure 330, the dressing assembly 308 and support structure 330 may be separated from the tensioning device 341 to form the pre-strained assembly 351 that may be used immediately or stored for a period of time.

The pre-strained assembly release 352 may comprise a tear strip 353 that is attached to the tensioning sheet 307 between the middle location 373 and the second side 374 with upper and lower portions 354, 355 respectively (See FIG. 3E). The tear strip 353 may act to separate the pre-strained assembly 351 from the tensioning device 341 by tearing across the tensioning sheet 307 between the pre-strained assembly 351 and the tensioning device 341.

In use, after the liner 350 is released, the dressing 310 may be applied to a desired location on a subject's skin. The user may apply pressure to the back side 333 of the support 330 to activate the adhesive on the dressing 310 and/or to apply compression to a wound. Once applied to a subject, the dressing 310 may be released from the support 330 using the release mechanism 319.

The release mechanism 319 may comprise tear strips 309. The tear strips 309 of the release mechanism 319 may each extend proud of the end 366 of elastic sheet 360. The tear strips 309 may each be coupled to the dressing assembly 308. A tear strip 309 may be coupled to the attachment sheet 304 of the dressing assembly 308 in a manner that defines tear path 362 along which the tear strip 309 is pulled to separate the dressing 310 from the support 330. A tear strip 309 may be coupled to the tensioning sheet 307 of the dressing assembly 308 in a manner that defines tear path 362 along which the tear strip 309 is pulled to separate the dressing 310 from the support 330. Each tear strip 309 may comprise a top section 347 and bottom section 348. The bottom sections 348 may be unattached or free from the support 330 as illustrated. The top sections 347 of each tear strip 309 may be adjacent but unattached to the dressing 310.

The tensioning sheet 307 and attachment sheet 304 may be manufactured to be tearable along the material length while providing tensile strength in other directions, in particular in the tensioning direction of the material of the tensioning sheet 307 (direction in which dressing is tensioned, stressed or strained) An example of such material is an LDPE polymer which is produced by an extrusion process that creates a directionally biased grain whereby the material is tearable with the direction of the grain, but has a relative resistance to tearing in the direction transverse to the grain. Notches may be made in the tensioning sheet 307 and attachment sheet 304 that facilitate tearing along paths 362. The tensioning sheet 307 and attachment sheet 304 may additionally or alternatively comprise a material such as a low-density polyethylene (LDPE) with perforations formed along tear lines 362.

The dressing 310 may be released from the support 330 by pulling the tear strips 309 to draw the tear strips across paths 362 of the tensioning sheet 307 and attachment sheet 304. Sections 365 and 375 respectively of the tensioning sheet 307 and attachment sheet 304 may remain on the back side 311 of the elastic sheet 360. The sections 385, 395 respectively, of the attachment sheet 304 and tear sheet 307 bonded to the tear strips 309 may thereby be separated from the tensioning sheet 307 and attachment sheet 304. The sections 365 and 375 respectively of the tensioning sheet 307 and attachment sheet 304 that are attached to the dressing 310 may thereby be separated from the remainder of the tensioning sheet 307 and attachment sheet 304 that are attached to the support structure 330 at its ends 305 and 306. Thus, the dressing 310 may be released from the remainder of the support structure 330.

The dressing 310 may have unattached portions or edges 315 at its sides 305, 306 where the elastic sheet 360 is free from the tensioning sheet 307 and attachment sheets 304 respectively. Accordingly, the dressing 310 may be unstrained at unattached portions 315. Unattached sections 315 of the elastic dressing 310 may be unstrained and may be free from the adhesive of the adhesive layer 340 (or may have a reduced amount of adhesive thereon). Thus less stress may occur at the unattached sides or edges defined by sections 315.

In use, the adhesive liner 350 may be removed and the dressing 310 applied to the surface of a subject's skin. Tear strips 309 on each side of the dressing at tear lines may be pulled to separate the dressing 310 from the support structure 330, attachment sheet 304 and tensioning sheet 307, after the dressing is applied to the surface of skin of a subject. When the support structure 330, attachment sheet 304 and tensioning sheet 307 are removed from the dressing 310, the stress or strain of the dressing 310 may apply a (tangential) compressive force to the skin to thereby treat the skin.

Figure 4:
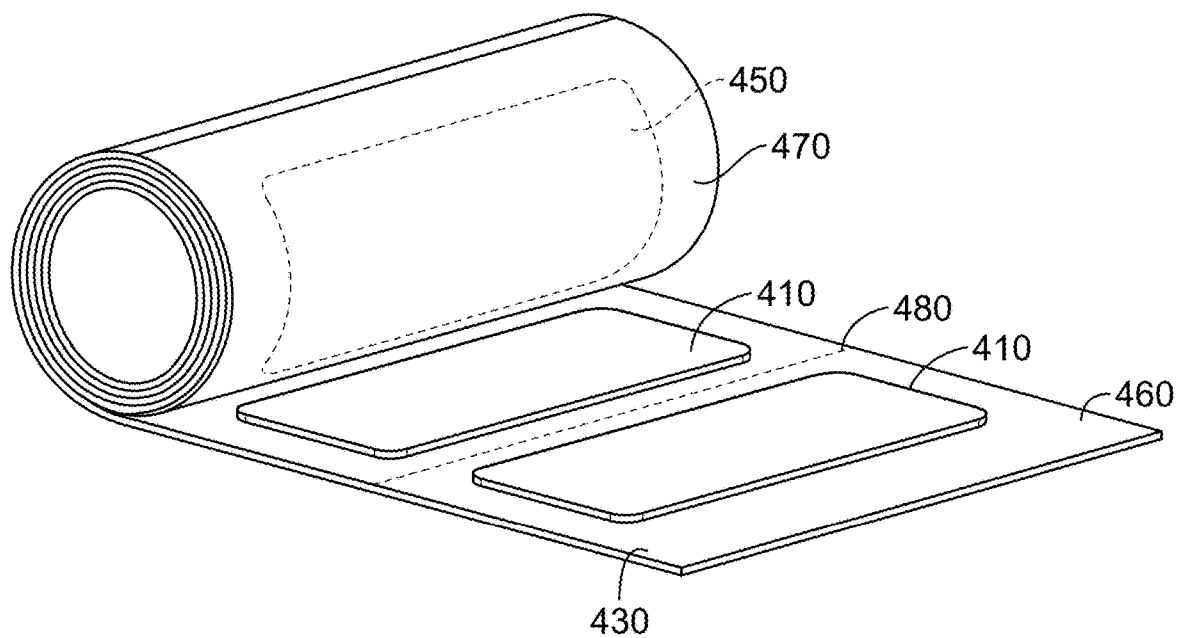
FIG. 4 is a perspective view of a plurality of pre-strained dressings on a support element.

Referring to FIG. 4, a plurality of strained dressings 410 may be strained in a manner similar to dressing 110 and then may each be attached to a first surface 460 of single support 430 which is rolled and stored in a rolled configuration for dispensing as shown in FIG. 4. The strained dressings 410 may be coupled to the first surface 460 of the single support 430 by an adhesive, such as, e.g., a high tack/low peel PSA, which maintains the dressings 410 in a strained configuration. Liners 450 may be placed on a second and opposite side 470 of the support 430 and are positioned so that when the support 430 is rolled, they are over a skin adhesive on the top of the dressings 410. The adhesive liner 450 may also help minimize creep properties of the strained dressings 410. The support 430 may be rolled to store the dressings 410. When the support 430 is unrolled, the adhesive liner 450 positioned on the second side 470 and opposing a dressing 410 may release from the dressing 410. Dressings 410 may be separated by a perforation 480 so that they may be individually used.

Figure 5:
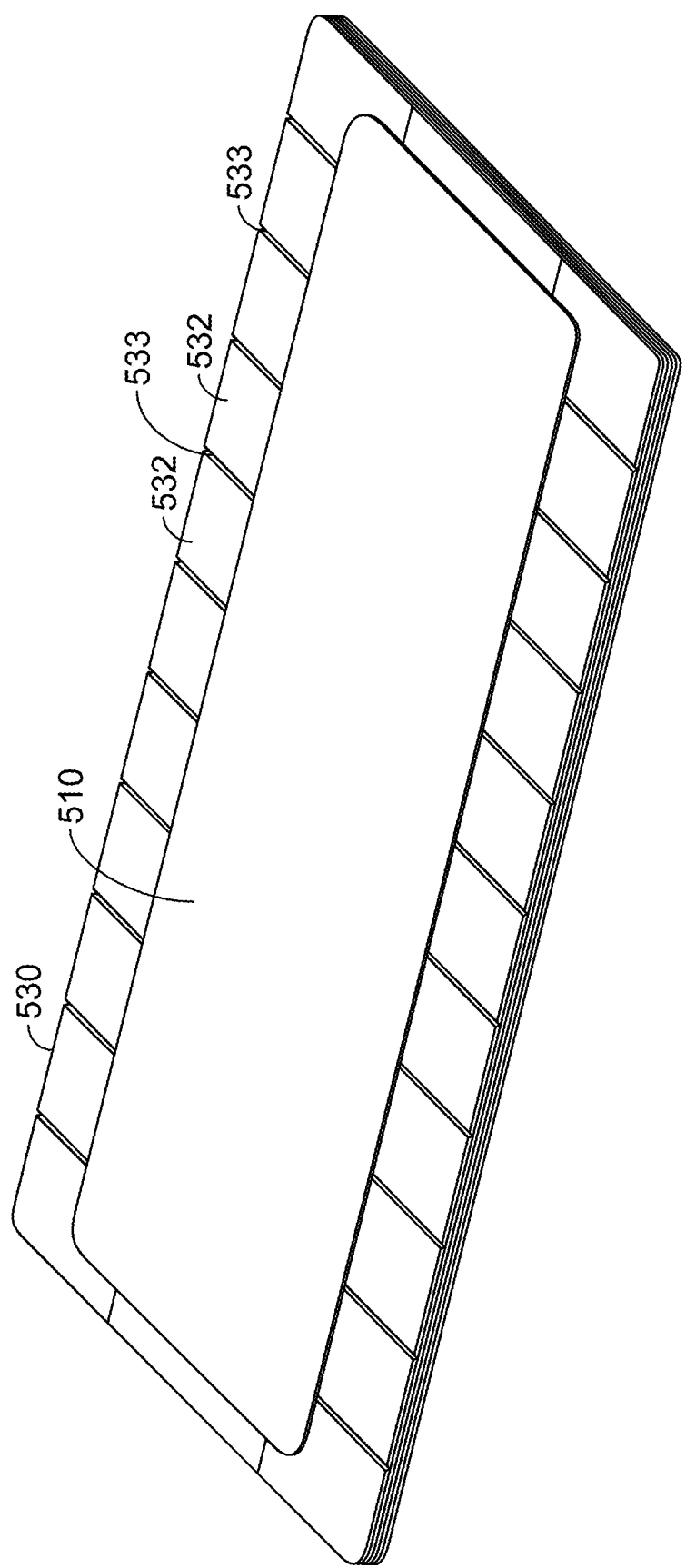
FIG. 5 illustrates a pre-strained dressing and support structure.

Referring to FIG. 5, a dressing 510 is shown in a strained configuration on a support structure 530. The support structure 530 may be constructed of relatively less flexible or relatively more rigid members 532 or segments that are flexibly coupled together with a relatively more flexible material 533. The support structure 530 may be configured to bend, flex or conform, at least in part, to the contours of a body to which the dressing 510 is to be attached. The dressing 510 may be manufactured or used in a manner similar to dressings 110, 210, 310, and 410 herein. While this invention has been particularly shown and described with references to embodiments thereof, it will be understood by those skilled in the art that various changes in form and details may be made therein without departing from the scope of the invention. For all of the embodiments described above, the steps of the methods need not be performed sequentially.

Referring to FIGS. 10A to 10B, a pre-strained dressing assembly 1000 is illustrated, comprising a pre-strained dressing 1010, a support structure 1030, an attachment structure 1020, a release structure 1025 and a removable adhesive liner 1050.

The dressing assembly 1000 is configured to deliver or apply the dressing 1010 to skin in a strained configuration where the dressing remains on the skin during a treatment period. The dressing 1010 has a skin adhesive layer 1015 on the top surface of the dressing 1010. Prior to use, a removable adhesive liner 1050 is positioned on top of the skin adhesive layer 1015 for protection of the adhesive layer 1015. According to examples of some embodiments, the dressing 1010 may be constructed of an elastomer such as, e.g., a silicone, polyurethane, TPU, TPE, or similar materials, and elastic non-woven fabrics. According to some embodiments, the dressing 1010 may have a durometer in a range between about 40 to 80. According to examples of some embodiments the dressing has a thickness between 0.1 to 7 mm. According to examples of some embodiments, the skin adhesive can comprise a medical grade skin adhesive such as, e.g., silicone, PSA, acrylic or other adhesives. The removable adhesive liner 1050 protects the skin adhesive 1015 and is removable from the skin adhesive 1015 and dressing 1010 prior to dressing application.

The support structure 1030 can be used as an applicator to apply the dressing 1010 to the skin of a subject. The support structure 1030 is configured to maintain a strain in the pre-strained dressing for a minimum period of time prior to use. The period of time may be, e.g., 2 months, 3 months, 4 months, 6 months, 8 months, less than 1 year, or up to 1 year, 2 years, 3 years, 4 years, 5 years, or more. The strain may be a minimum specified strain level for a period of time or minimum period of time. In some further variations, the material and/or configuration is selected to achieve less than a 20%, 25%, 30%, 40%, 50% force drop over the course of 3 months, 4 months, 6 months, 8 months of 12 months, for example. The force drop over the time frame may be in the range of 15-20%, 15-25%, 15-30%, 20-30%, for example. According to some embodiments, the support structure is relatively flexible and compliant in one direction to allow for conforming to contours of body regions, as compared to being stiff in an opposing direction to assist in holding the dressing in a pre-strained state. According to examples of some embodiments, the support structure is constructed of a paperboard with a Taber Stiffness of 160 to 290, or 160 to 350, in a cross direction (i.e., parallel to a strain direction of the dressing), for a paperboard with a thickness in the range of 0.020" to 0.030", for example. According to examples of some embodiments, the support structure is constructed of a paperboard such as a WESTROCK 22 pt NATRALOCK® RESIST or ULTRA SEAL (WestRock; Atlanta, GA) paperboard, or range of 0.022-0.028 caliper.

The attachment structures 1020 are configured to releasably couple the support structure 1030 to the dressing 1010. An attachment structure 1020 comprises a relatively flexible inelastic layer 1021 such as, e.g., an LDPE film, metallocene LDPE, or other material lacking a proportional loading relationship. The attachment structures 1020 may comprise, for example, an LDPE film with a thickness in the range of 0.002 inches to 0.004 inches, 0.0025 inches to 0.0035 inches, or 0.0028 inches to 0.0032 inches, or 0.06 mm to 0.10 mm, or 0.06 to 0.09 mm, or 0.07 to 0.08 mm. The flexible inelastic material may be constructed of a thermoplastic material, such as LDPE, that permits the layer to be bonded to the support structure by way of a thermal process. The attachment structures 1020 are configured to hold a dressing strain for a desired period of time under varying temperature, shipping and storage conditions. After a dressing is pre-strained, a strain is maintained when the attachment structures 1020 are attached on opposite sides 1033, 1034 of the support structure 1030 respectively to opposite sides 1013, 1014 of the dressing 1010. As illustrated in FIG. 10B, the attachment structure 1020 is coupled to the dressing 1010 at interface 1041. According to an example of some embodiments, LDPE film strips of an inelastic layer of the attachment structure 1020 is bonded to one side or edge region of an elastomeric dressing 1010 with a differential double-coat adhesive of silicone and acrylic. For example, a silicone portion may have material specifications from SA1020 manufactured by Adhesive Applications and an acrylic portion may have material specifications from SA1911 manufactured by Adhesive Applications. The elastomeric dressing may be surface treated for example with corona, flame, reactive gas, or plasma, to provide a higher surface energy material (approximately 50-60 dyne/cm) to bond to the custom differential double-coat adhesive. The attachment structures 1020 may have a single layer or multi-layer construction.

As illustrated in FIG. 10B, the attachment structure 1020 is coupled to the support structure 1030 at interface 1042. According to examples of some embodiments, the interface can be formed with a thermal bond. According to some examples, the interface 1042 is created by heat sealing one or more strips of film or material, such as the LDPE layer of the attachment structure 1020 to the support structure 1030 constructed from a paperboard film coated with a hot-melt glue or polycoat, (e.g. WESTROCK NATRALOCK® RESIST or ULTRA SEAL or UltraSeal). According to an example, a sealing temperature of 150 degrees C. at a sealing pressure of 25-28 PSI was applied for a sealing time of 1.5 seconds. In other variations, the heat seal temperature may be in the range of 140 degrees C. to 160 degrees C., and/or the heat seal time may be in the range of 1.0 seconds to 2.0 seconds.

A release structure 1025 is configured to release the dressing 1010 from the support structure 1030. According to examples of some embodiments, the release structure 1025 may comprise a portion and/or extension of the inelastic layer 1021 of an attachment structure 1020. Preferably, the portion of the inelastic layer 1021 is not directly bonded to the support structure 1030, or otherwise at the bonding interface 1042 between the attachment structure 1020 and the support structure 1030. The inelastic layer 1021 may have a grain direction that allows it to separate along a linear direction. This may be further facilitated or enhance when a stress propagating feature 1026 is provided or created, such as one more perforations, nicks or tears in the inelastic layer 1021. The linear direction may be in a machine direction that is approximately orthogonal to the cross direction or the direction of dressing strain. The grain allows a differential in the tear resistance (Elmsdorf Tear ASTM D1922) between the machine and cross directions of the material. As illustrated, the release structure 1025 comprises a stress propagating feature 1026 for example, a perforation, nick tear, or other stress propagating feature. In some examples, an air gap 1043 may be provided near the perforations 1026 to further facilitate separation. The release structure 1025 further comprises release tabs 1027 that extend out from the dressing 1010, removable adhesive lining 1050 and/or support structure 1030 to facilitate grasping and that are used to sever the inelastic layer 1021 along the grain, i.e., adjacent dressing side 1013, and support structure side 1033 and the inelastic layer 1021 adjacent dressing side 1014 and support structure side 1014 of the support structure to decouple the support structure 1030 from the dressing 1010. According to examples of some embodiments, a fabric stiffener 1028 can be positioned between the dressing 1010 and the attachment structure 1020 adjacent the interface 1041 to assist in severing the attachment structure 1020.

In use, the removable adhesive lining 1050 is removed from the skin adhesive layer 1015 and the pre-strained dressing 1010 is attached to a skin surface with the now exposed skin adhesive 1015. The release tabs 1027 are actuated to sever the attachment structures 1020 along the grain to separate the dressing 1010 from the support structure 1030.

Referring to FIGS. 11A-11F a process and subprocesses for manufacturing or assembling a pre-strained dressing are illustrated.

Figure 11A:
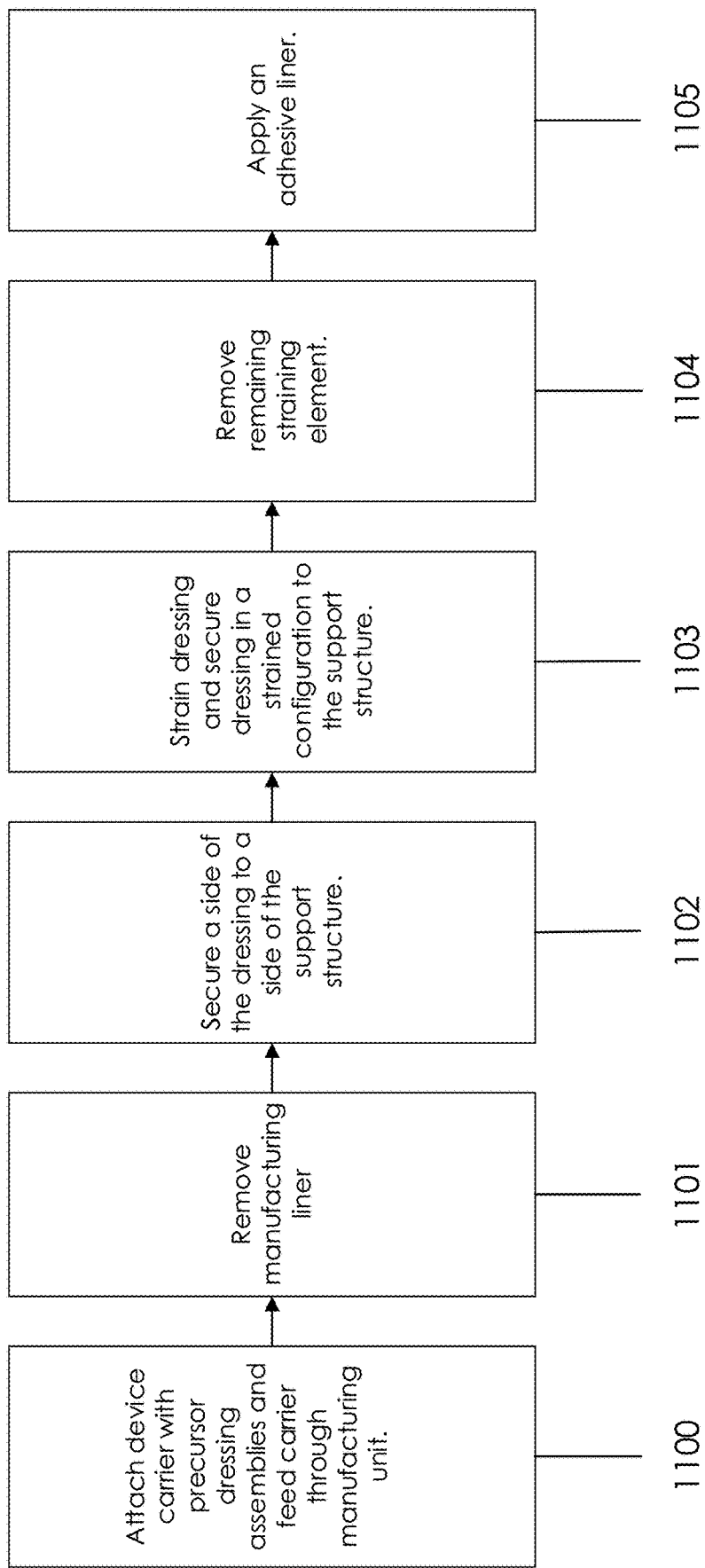
FIG. 11A is a flow chart illustrating a process and sub-processes for manufacturing a pre-strained dressing.

As shown in FIG. 11A, a device carrier with precursor dressing assemblies is attached to a manufacturing unit and the carrier is fed through the manufacturing unit 1100. An example of some embodiments of a device carrier with precursor dressing assemblies is illustrated in FIGS. 12A to 12B as described herein. Examples of some embodiments of a manufacturing unit and subunits are illustrated in FIGS. 13 to 15H as described herein. At a first stage 1101, the manufacturing liner is removed from the precursor dressing assembly. At a second stage 1102, a side of the dressing is secured or anchored to a corresponding side of the support structure. At the third stage 1103, the dressing is strained using a straining element that is attached to the dressing, and the dressing is secured to the support structure in a strained configuration. At a fourth stage 1104, any remaining unsealed portion of a straining element may be removed from the precursor dressing assembly. At a fifth stage 1105, a removable adhesive liner is applied to the skin adhesive on the dressing assembly to form a finished dressing assembly. These stages may be at different locations along the manufacturing unit 1100, or one or more may stages be performed sequentially at the same location along the manufacturing unit 1100.

Referring to FIG. 11B, a process or subprocess for removing a manufacturing liner is illustrated. The sides of the precursor dressing assembly are immobilized, 1110. For example, the sides may be clamped. The manufacturing protective liner may then be removed manually or otherwise, 1111. The precursor assembly may then proceed to a second stage.

Referring to FIG. 11C, a process or subprocess for securing or anchoring a side of the support element to a corresponding side of the support structure, 1102, is illustrated. A precursor dressing assembly, for example as illustrated in FIGS. 12A-12B, including an attachment structure as described with respect to FIGS. 10A to 10B, is indexed and/or proceeds to a second stage of a manufacturing process, 1121. The attachment structure has been provided on the precursor assembly, attached to the dressing. A side of the precursor assembly is immobilized for example, by being clamped or otherwise immobilized, 1122. A heat seal element applies heat to the attachment structure an adjacent support structure to form a heat-sealed thermal bond at the interface, to thereby couple the dressing to the support structure by way of the attachment structure, 1123. The precursor dressing assembly may then move to a third stage.

Figure 11D:
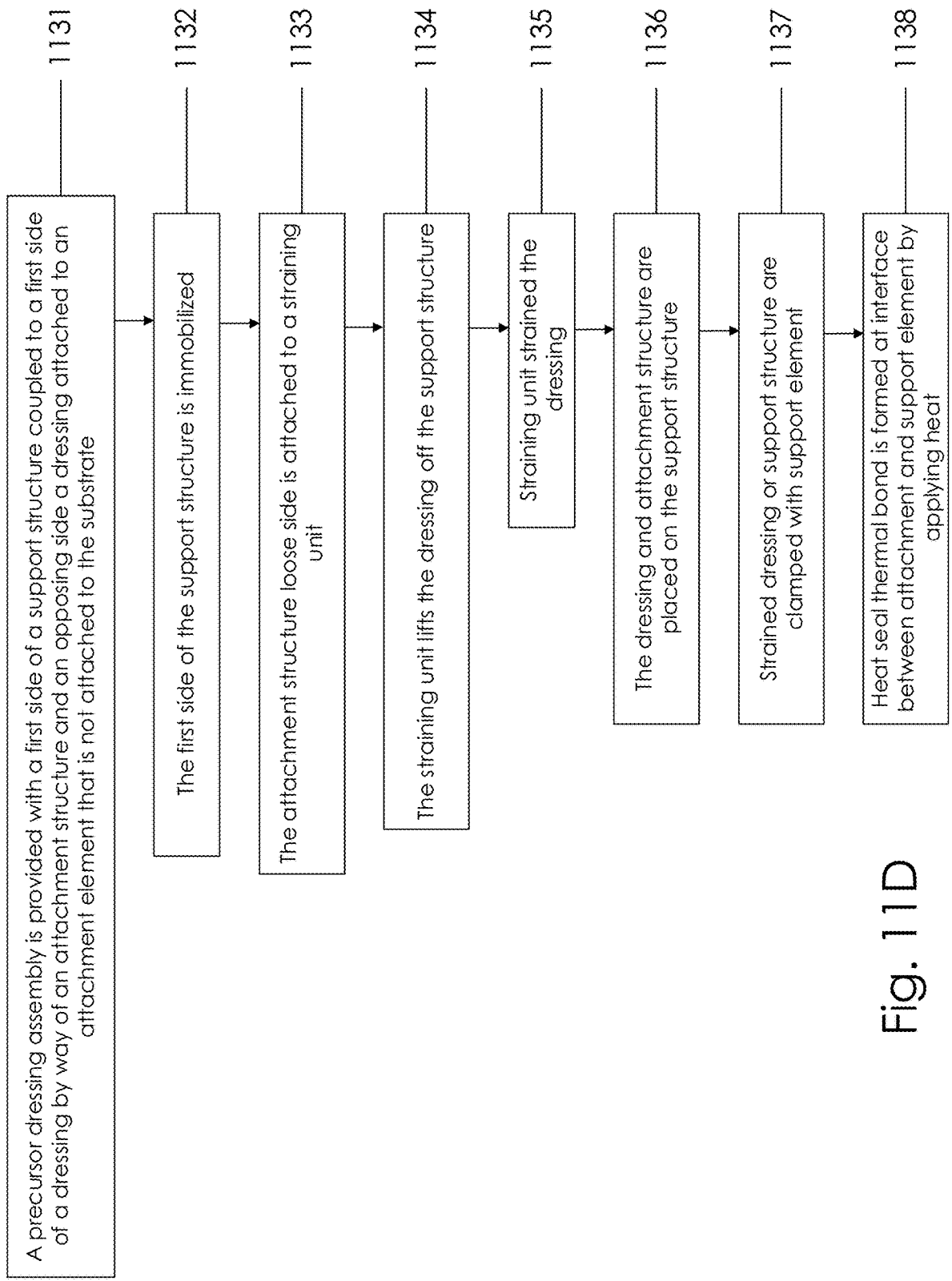
FIG. 11D is a flow chart illustrating a process for straining a dressing and securing the dressing in a strained configuration to a support structure.

Referring to FIG. 11D, a process or subprocess for straining a dressing and securing the dressing in a strained configuration to a support structure is illustrated. A precursor dressing assembly is provided, with a first side of a support structure coupled to a first side of a dressing by way of an attachment structure, and an opposing side with a dressing attached to an attachment element that is not attached to the substrate, 1131. The first side of the support structure is immobilized, e.g. clamped or otherwise immobilized, 1132. The attachment structure on the opposing side is a free flap or loose side forming a straining sheet that may extend past the side of the support structure to when the dressing is strained. The loose side straining sheet or attachment structure is attached or clamped to a straining unit 1133. The straining unit, by way to the attachment structure, then lifts the dressing off the support structure, 1134. The straining unit then strains the dressing by way of the attachment structure, 1135. The dressing and the attachment structure are then placed down on the support structure, 1136. The attachment structure between the strained dressing and heat seal location (see FIG. 16C, second heat seal 1263) is clamped, 1137. A heat seal element applies heat to the attachment structure and an adjacent support structure to form a heat-sealed thermal bond at an interface, between the support structure and the attachment structure to thereby couple the dressing to the support structure in a strained configuration, 1138. The precursor dressing assembly may then be unclamped and move to a fourth stage.

Figure 11E:
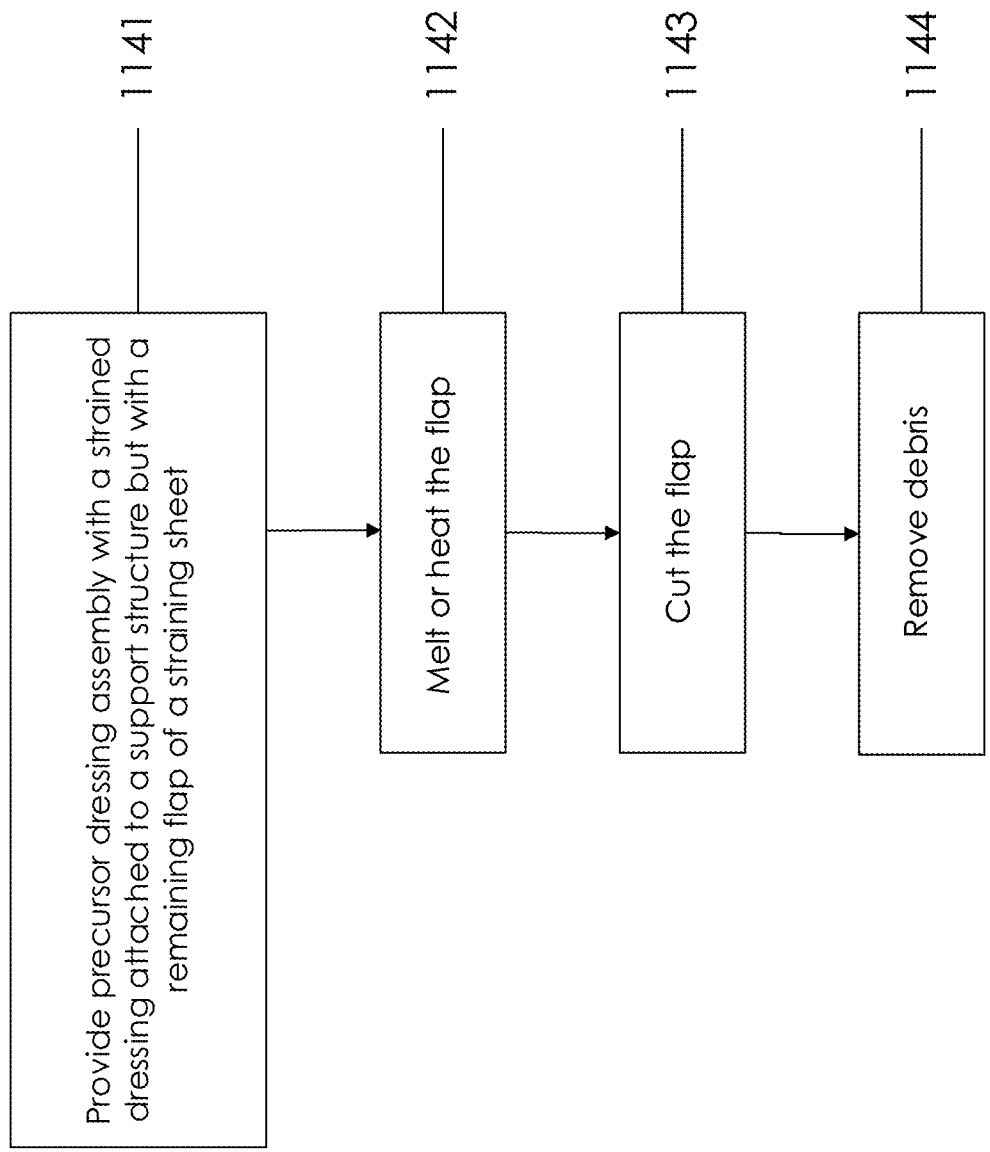
FIG. 11E is a flow chart illustrating a process for removal of a straining element.

Referring to FIG. 11E, a process or subprocess for removal of a straining element is illustrated. A precursor dressing assembly is provided with a strained dressing attached to a support structure but with a flap or remaining width of the straining sheet or attachment structure used to apply strain to the dressing, 1141. The attachment structure is heated or melted using a heating element, 1142. A knife or other cutting element strikes and cuts the attachment structure flap, 1143. An air jet may be used to remove debris or waste, 1144. The precursor dressing assembly may then move to a fifth stage.

Figure 11F:
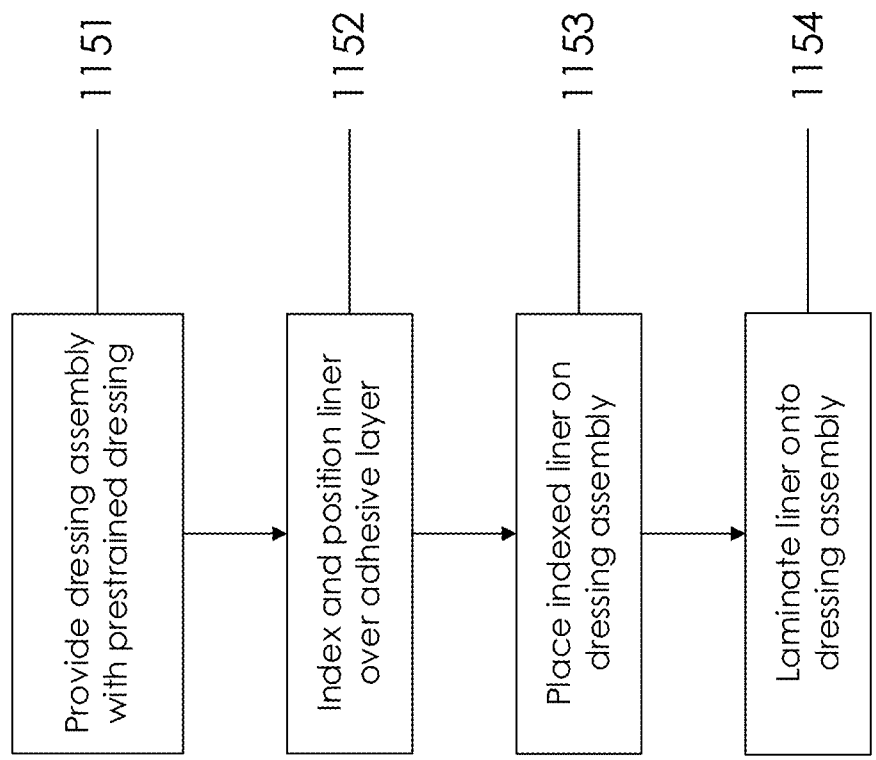
FIG. 11F is a flow chart illustrating application of an adhesive liner.

Referring to FIG. 11F, a process or subprocess for applying a liner to the dressing is illustrated. A dressing assembly with a pre-strained dressing is provided (1151). A liner is indexed into position over the skin adhesive layer of the dressing (1152.) The liner is placed on the dressing over the adhesive layer (1153) and is laminated on the dressing using an actuator with a compliant surface such as, e.g., foam, rubber, etc., 1154.

While the processes and subprocesses described herein refer to various manufacturing stages, the precursor assembly may physically move to a different stage or a manufacturing unit or may otherwise remain in place while steps in a subsequent stage or stages are performed. Any subprocess or combination of subprocesses described herein may be used in a method or pre-strained dressing manufacturing process.

Figure 13:
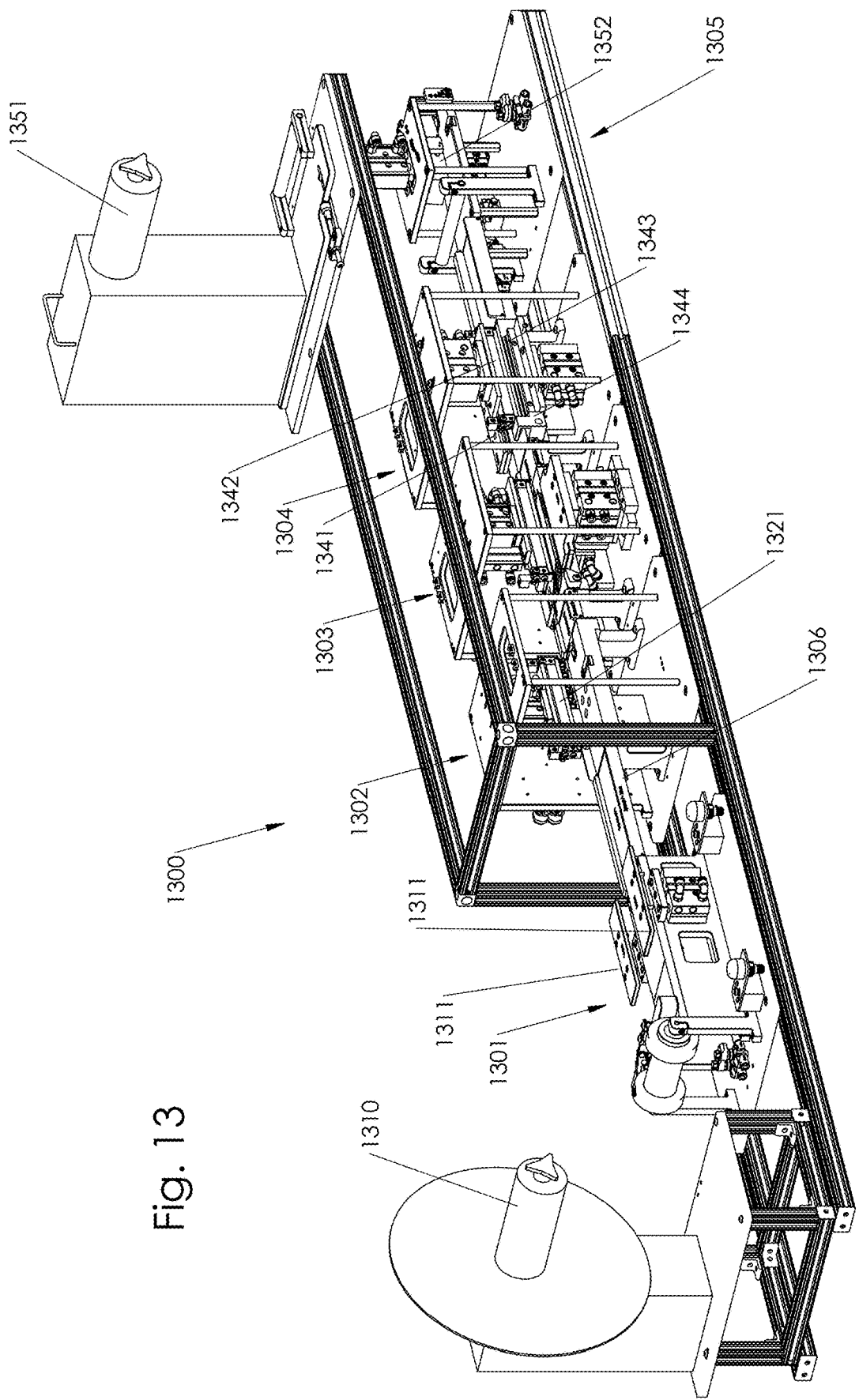
FIG. 13 is a top perspective view of a Manufacturing Unit.
Figure 14:
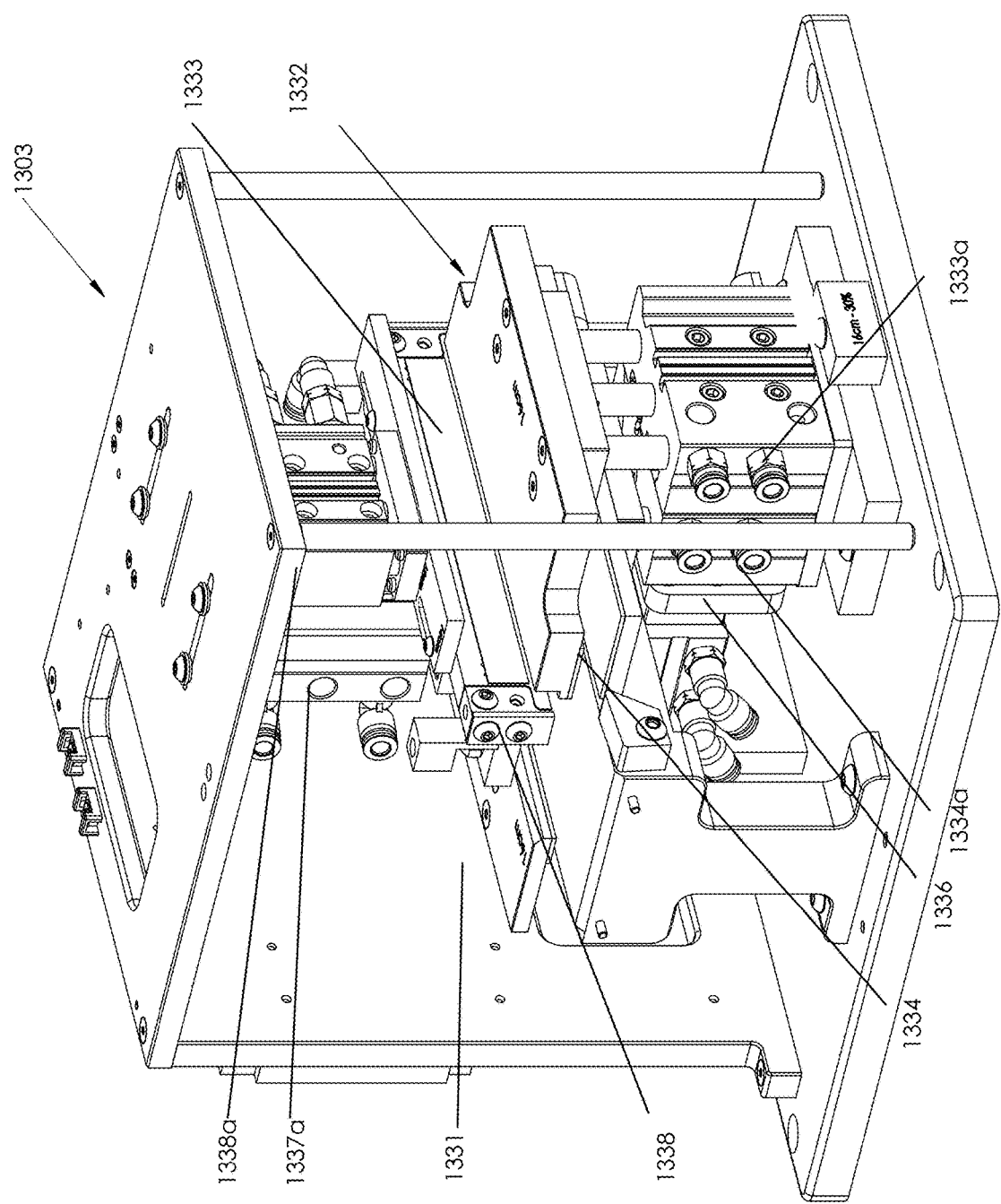
FIG. 14 is a top perspective view of a stage of the Manufacturing Unit of FIG. 13.

FIGS. 12A and 12B illustrate a device carrier 1205 with precursor dressing assemblies 1200 removably positioned on the carrier. The carrier 1205 may be a thin substrate such as POLYMASK SURFACE GUARD® Low-Tack film (Tekra; New Berlin, WI). The carrier 1205 and precursor dressing assemblies 1200 may be formed into a roll for easy dispensing and mounting onto a manufacturing or assembly unit for example as illustrated in FIG. 13 described herein. The precursor dressing assemblies 1200 are attached to the carrier 1205 with a low-tack adhesive. The carrier 1205 may be threaded through one or more stages of the manufacturing unit and may be attached at the end of the one or more stages of the manufacturing unit. The carrier 1205 moves the precursor dressing assemblies 1200 through one or more stages of the manufacturing unit.

A precursor dressing assembly 1200 as illustrated may have portions of the final dressing assembly, preassembled and then coupled to the carrier 1205. Illustrated as an example of some embodiments, the precursor dressing assembly 1200 comprises a support structure 1230 similar to support structure 1030 described in FIGS. 10A to 10B. Attachment structures 1220*a* and 1220*b* are attached to the dressing 1210 at interfaces (not shown) such as interfaces 1041 comprising an adhesive as described with reference to FIGS. 10A to 10B herein. Attachment structures 1220*a* and 1220*b* are positioned on the support structure 1230 with attachment structure 1220*a* temporarily attached to the support structure 1230 while attachment structure 1220*b* is not initially attached to the support structure 1230. Attachment structures 1220*a* and 1220*b* are formed of an inelastic flexible material with thermal bonding capabilities and a grain for preferential release in a selected direction. Examples of such materials are described with reference to FIG. 10A to 10B. The attachment structure has a flap 1229 or straining sheet that extends beyond the width of the support structure 1230 on the side 1231. A release structure 1225 comprises pull tabs 1227 and a stress propagating feature 1026 may be formed from the same sheet of material as the attachment structures 1220*a*, or 1220*b*. A temporary manufacturing liner 1260 may be placed over a skin adhesive layer on the dressing 1210

Referring to FIG. 13, a manufacturing unit 1300 is illustrated have a first subunit or station 1301, a second subunit or station 1302, a third subunit or station 1303, a fourth subunit or station 1304 and a fifth subunit or station 1305. A roller 1310 is configured to mount a roll of precursor dressing assemblies 1210 loaded on a device carrier 1205 (FIGS. 12A to 12B). The roller 1310 is further configured to feed the device carrier 1205 and precursor dressing assemblies 1210 through one or more subunits or stages of the manufacturing unit 1300. Spacers 1306 are located between subunits or stations to control dressing assembly 1210 positions in subunits 1301 to 1305.

Figure 16A:
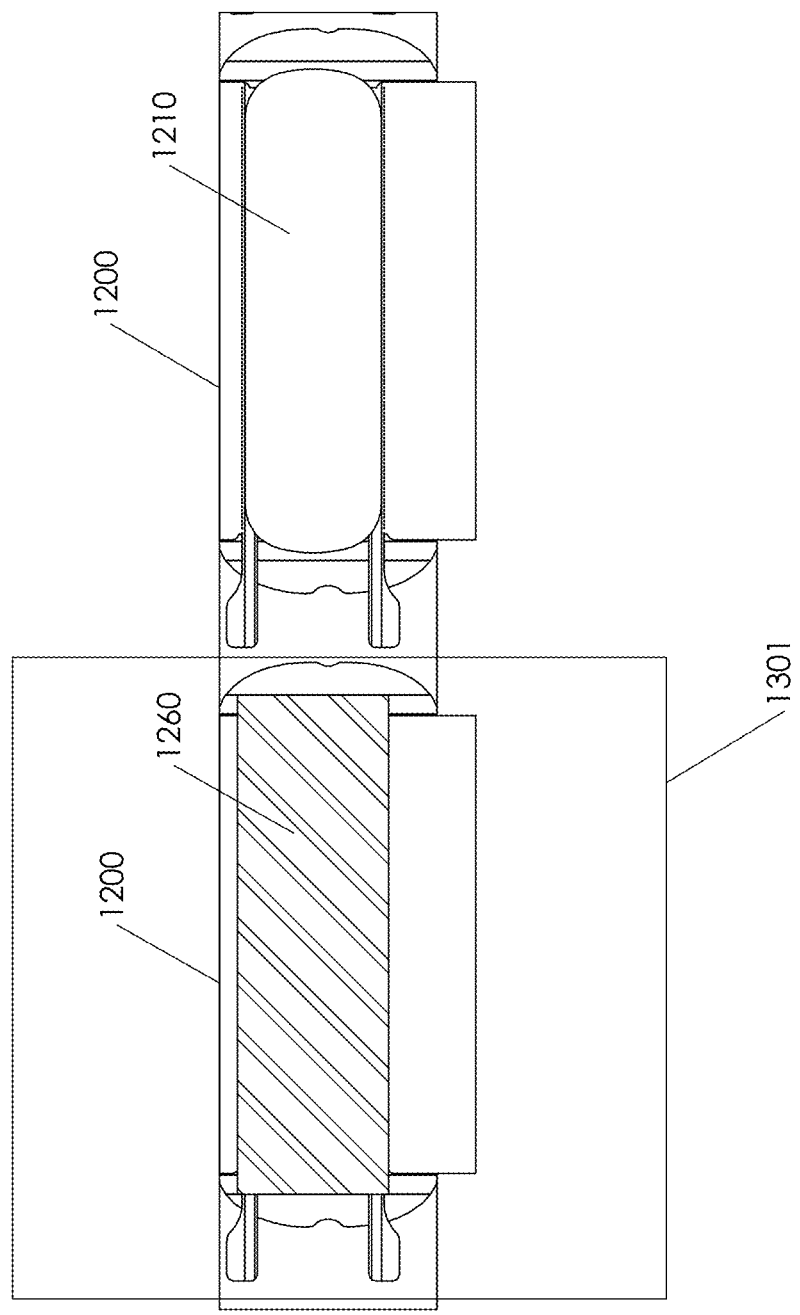
FIG. 16A is a top schematic view of a dressing assembly during and after a stage of the manufacturing assembly of FIG. 13.

The first subunit 1301, which may be a liner peel module, comprises opposing clamps 1311 that clamp the sides of the precursor dressing assemblies to enable removal of a manufacturing liner placed over the skin adhesive of the dressing. As shown in FIG. 16A, the precursor dressing assembly 1200 when entering the first subunit has a manufacturing liner 1260 over the dressing 1230. When the precursor dressing assembly leaves the first subunit the manufacturing liner 1260 is removed from the precursor dressing assembly 1200.

Figure 16B:
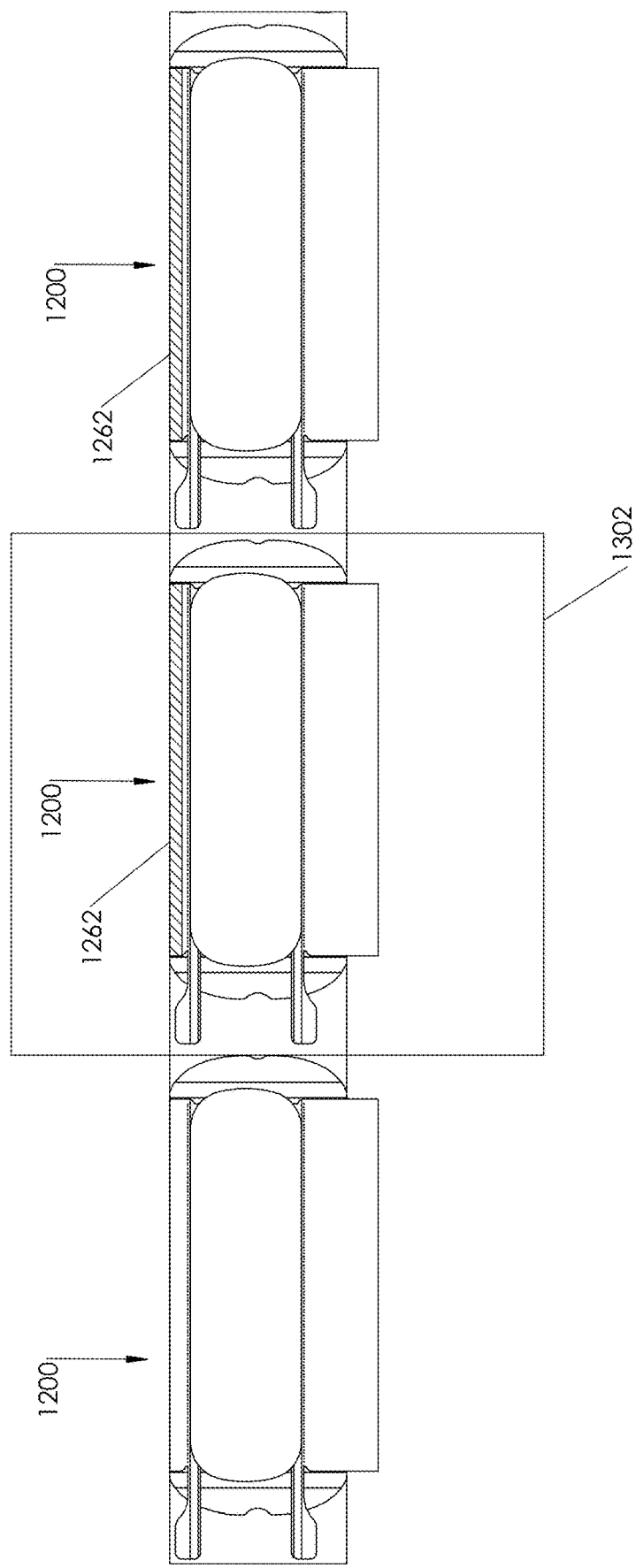
FIG. 16B is a top schematic view of a dressing assembly before, during and after a stage of the manufacturing assembly of FIG. 13.

Referring back to FIG. 13, the second subunit 1302, which may be a first sealing module, is configured to secure or anchor a side of the support element 1230 to a corresponding side of the attachment structure 1220*a*. The subunit 1302 comprises a heat seal element 1322 arranged to apply heat to apply heat to the attachment structure and adjacent support structure to form a heat-sealed thermal bond at an interface between the support structure 1230 and attachment structure 1220*a*. An indexing element 1306 positions the precursor dressing assembly 1200 in machine and cross directions so that the heat seal 1262 is precisely located, for example, at interface 1042 (between the support element 1230 and the attachment structure 1220*a* as illustrated in FIG. 10B. As shown in FIG. 16B, the precursor dressing assembly 1200, when entering the second subunit 1302, does not have a heat seal. When the precursor dressing assembly 1200 leaves the second subunit 1302, the heat seal 1262 is formed on the precursor dressing assembly 1200.

The third subunit 1303, which may be a straining and sealing module, comprises a first clamp 1331 actuated by an actuator 1331*a*. The first clamp is arranged to clamp and hold a first side of a support element 1230 when straining the dressing and heat sealing the opposite side of the dressing assembly. When the precursor dressing assembly is moved into the third subunit 1303, the first clamp 1331 is actuated by its actuator 1331*a*. The third subunit 1303 further comprises a straining unit 1332 including a second clamp 1333 and third clamp 1334 and their corresponding actuators 1333*a*, 1334*a*, which are configured to hold the loose flap 1229 during a straining and heat sealing process as described in more detail with reference to FIG. 11D. The straining unit 1332 as further illustrated in FIGS. 14 and 15A to 15H. The third subunit 1303 further comprises heat seal element 1338, which is arranged to apply heat to the attachment structure and an adjacent support structure to form a heat-sealed thermal bond at and interface, between the support structure and the attachment structure to thereby couple the dressing to the support structure in a strained configuration.

Figure 16C:
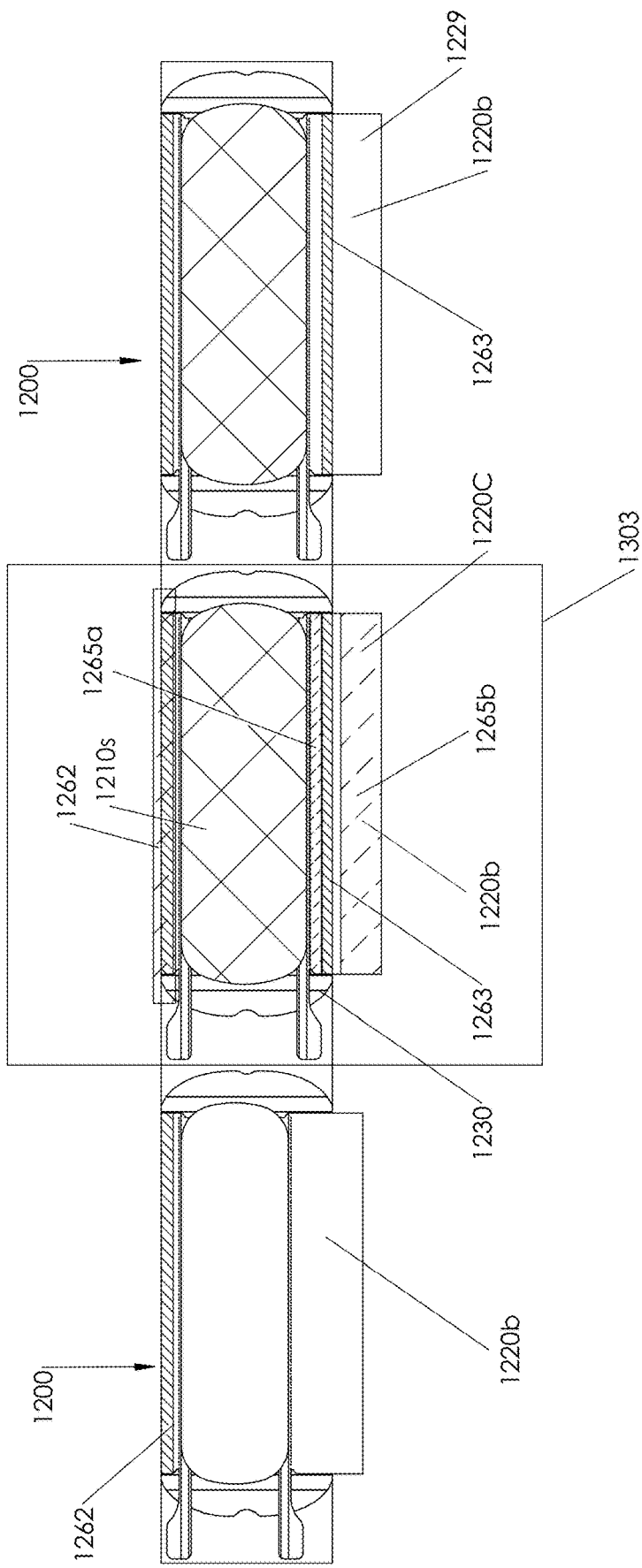
FIG. 16C is a top schematic view of a dressing assembly before, during and after a stage of the manufacturing assembly of FIG. 13.

Referring to FIG. 16C, the precursor dressing assembly 1200, when entering the third subunit 1303, is unstrained and only clamped on one side. Once in the subunit 1303, the attachment structure 1220*b* is clamped along a medial length zone 1265*a* and a lateral length zone 1265*b*, a heating element applied therebetween to form a second heat seal 1263. This second heat seal 1263 is formed on the precursor dressing assembly 1200 to attach the strained dressing 1210*s* to the support element 1230. The width of the lateral length zone 1265*b* is typically greater than the medial length zone 1265*a*, and the second heat seal 1263 may be relatively closer to (or otherwise abutting) the medial length zone 1265*a* and relatively farther from the lateral length zone 1265*b*. The clamps are then removed from the zones 1265*a* and 1265*b* after the second heat seal 1263 and the dressing assembly 1200 can then exit the third subunit 1303.

Figure 15A:
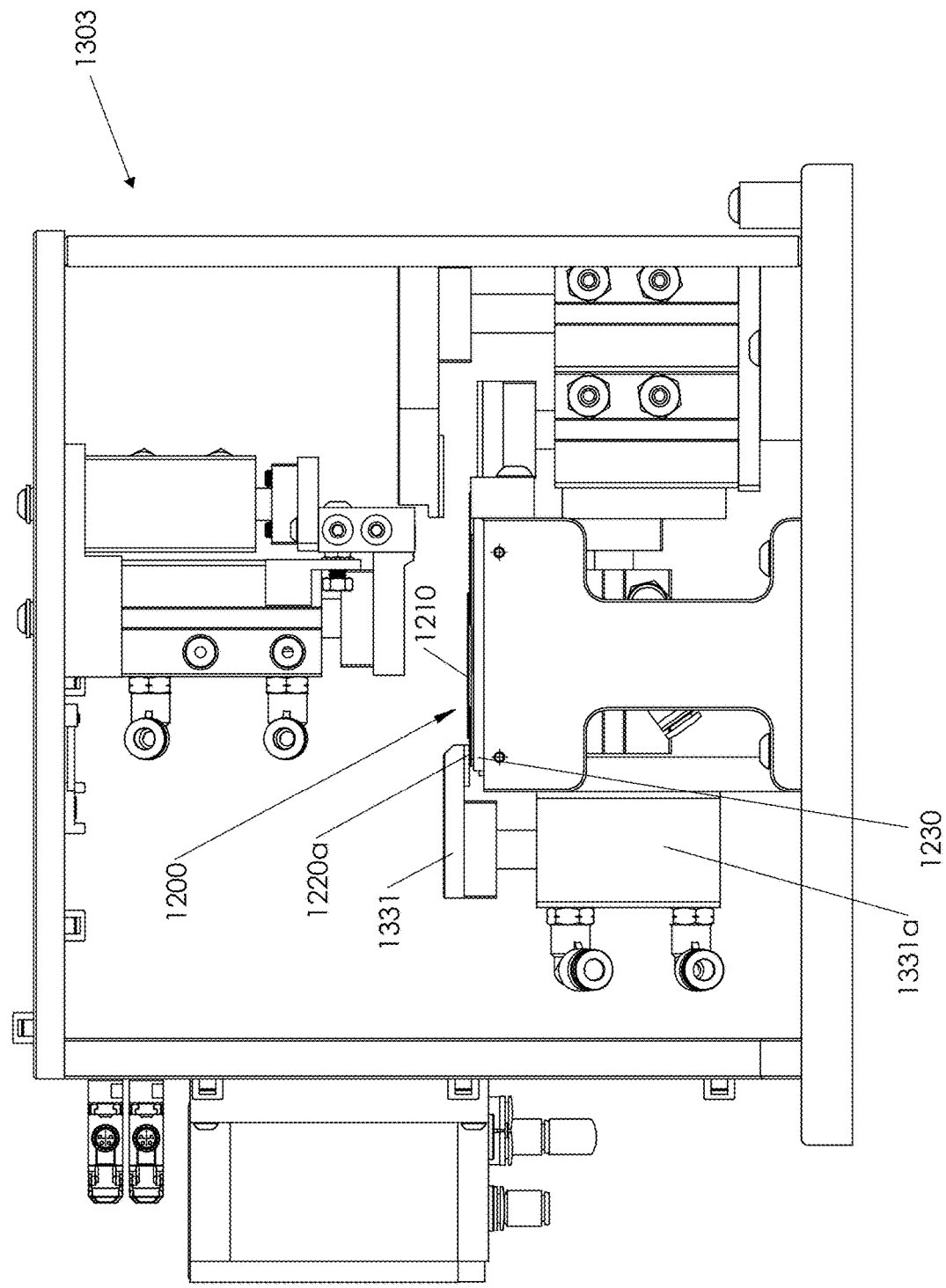
FIG. 15A is a side view of the Manufacturing Assembly of FIG. 14 at a first step.
Figure 15B:
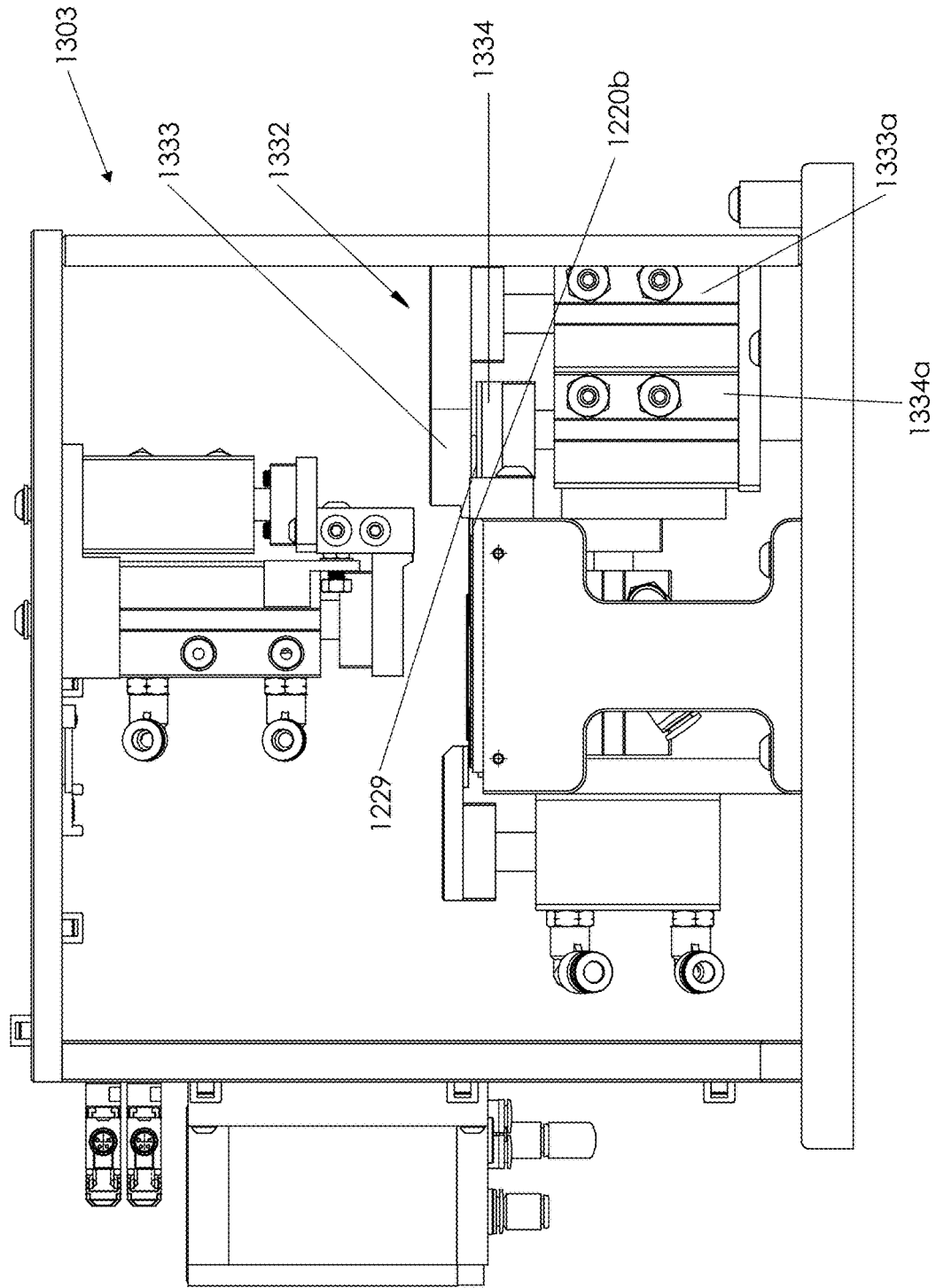
FIG. 15B is a side view of the Manufacturing Assembly of FIG. 15A at a subsequent step.
Figure 15C:
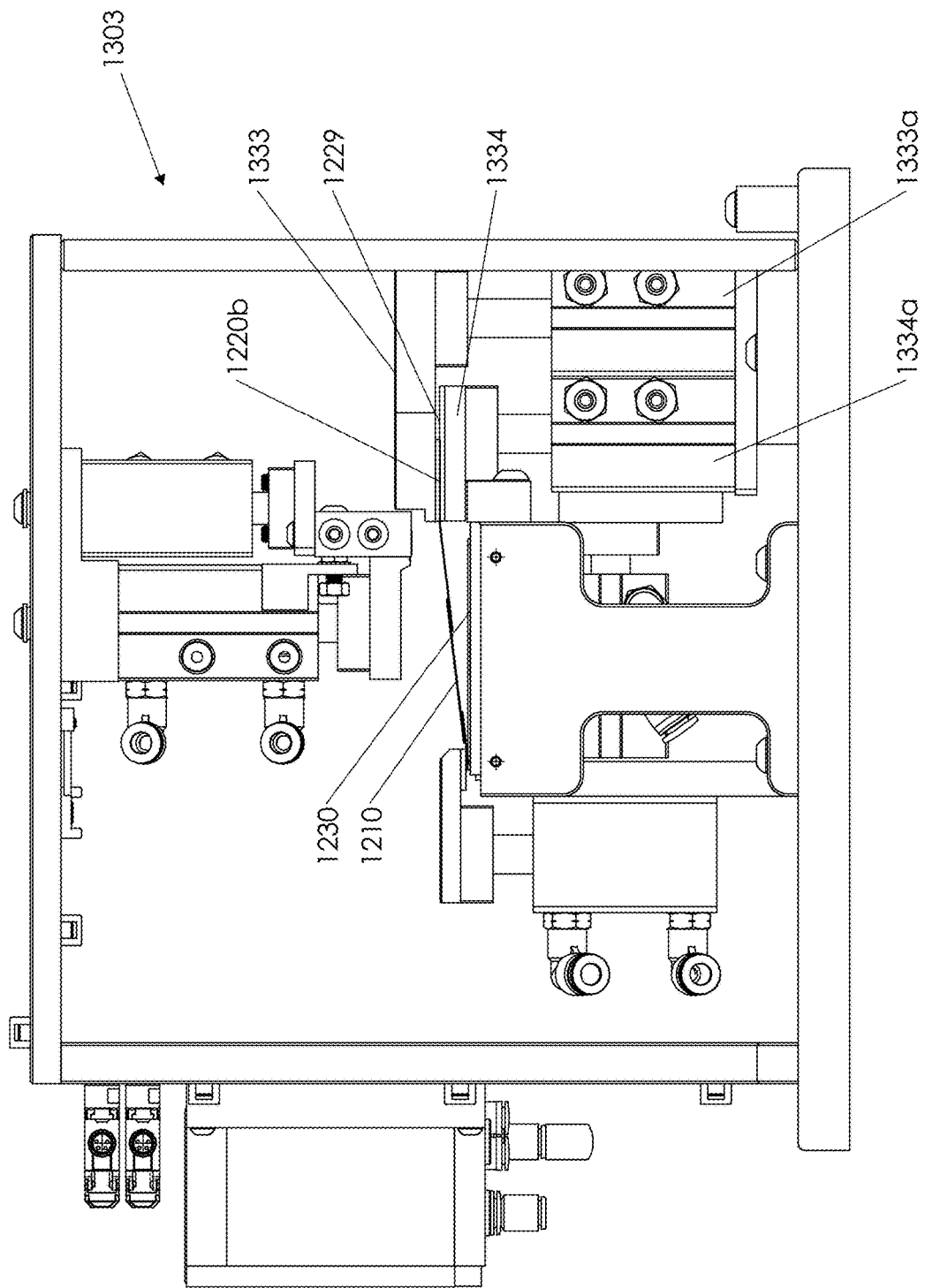
FIG. 15C is a side view of the Manufacturing Assembly of FIG. 15A at a subsequent step.
Figure 15D:
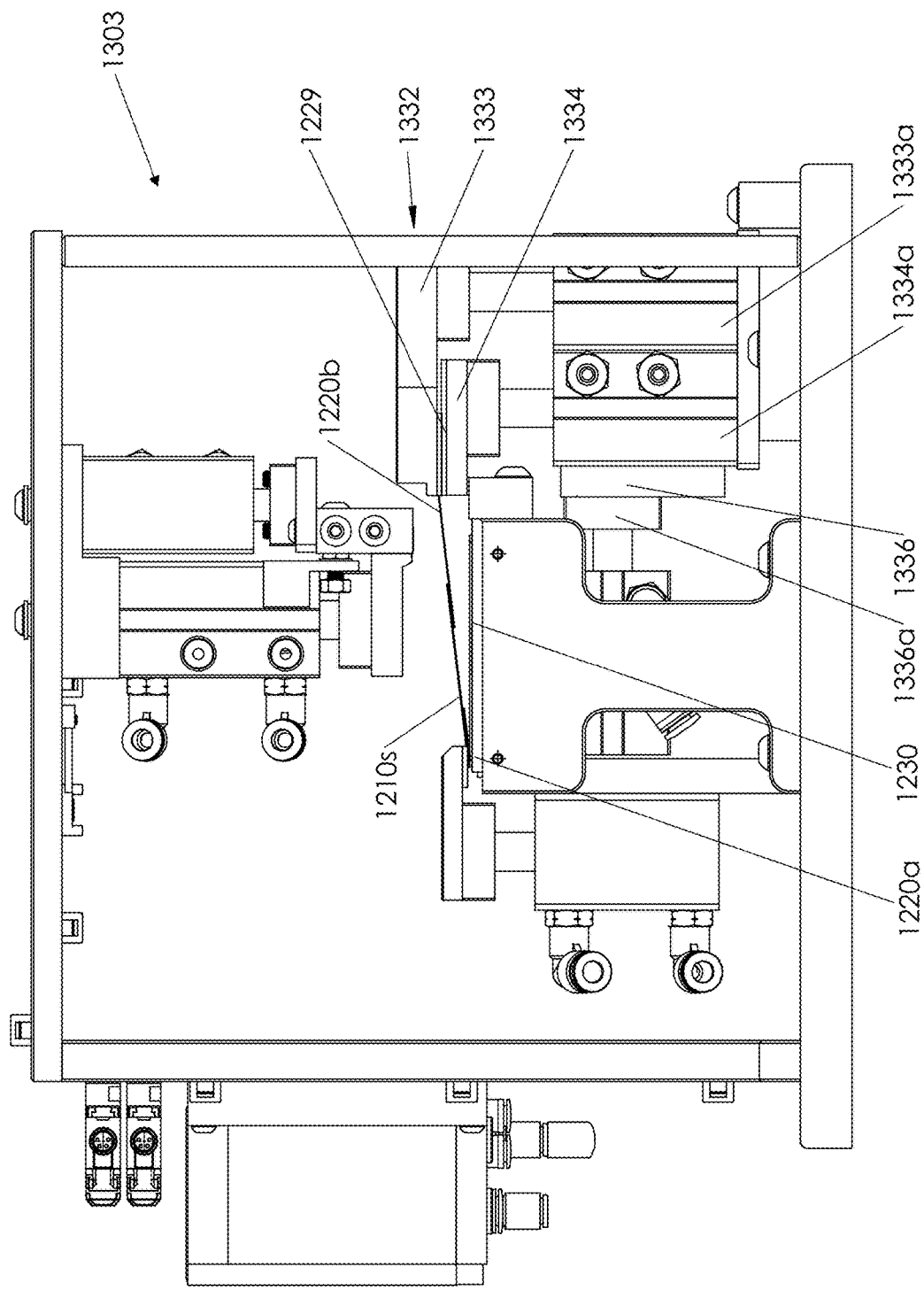
FIG. 15D is a side view of the Manufacturing Assembly of FIG. 15A at a subsequent step.
Figure 15E:
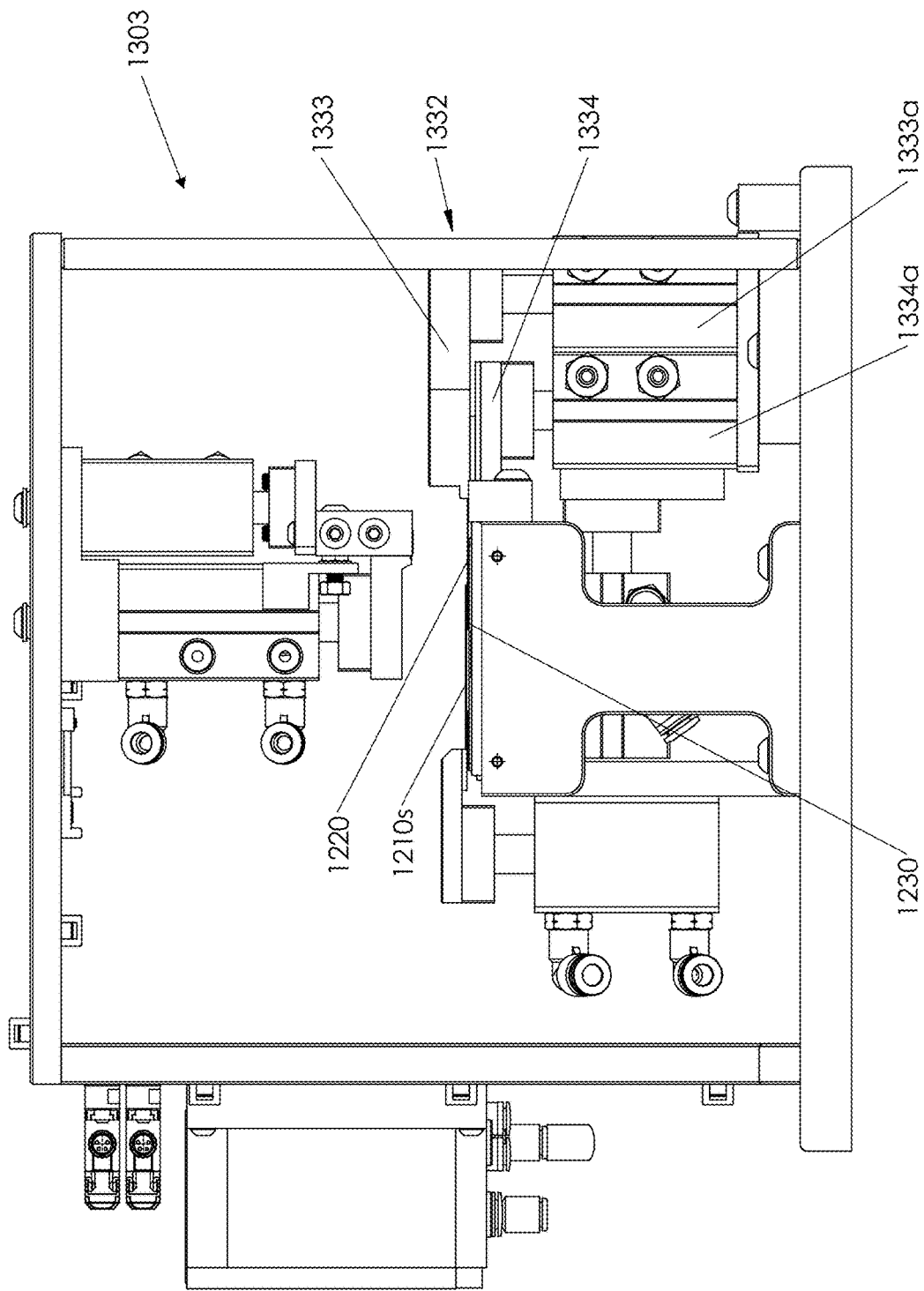
FIG. 15E is a side view of the Manufacturing Assembly of FIG. 15A at a subsequent step.
Figure 15F:
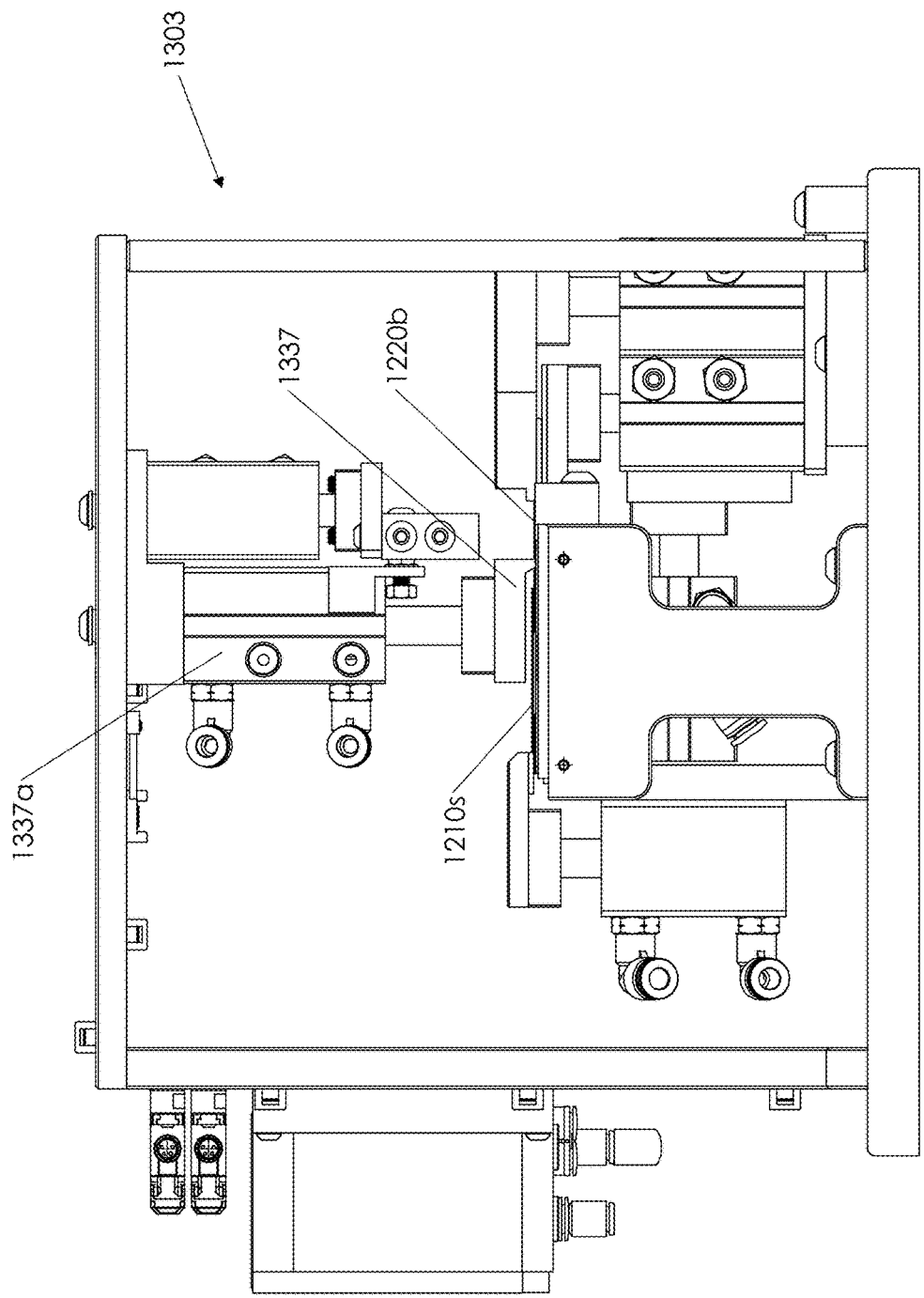
FIG. 15F is a side view of the Manufacturing Assembly of FIG. 15A at a subsequent step.
Figure 15G:
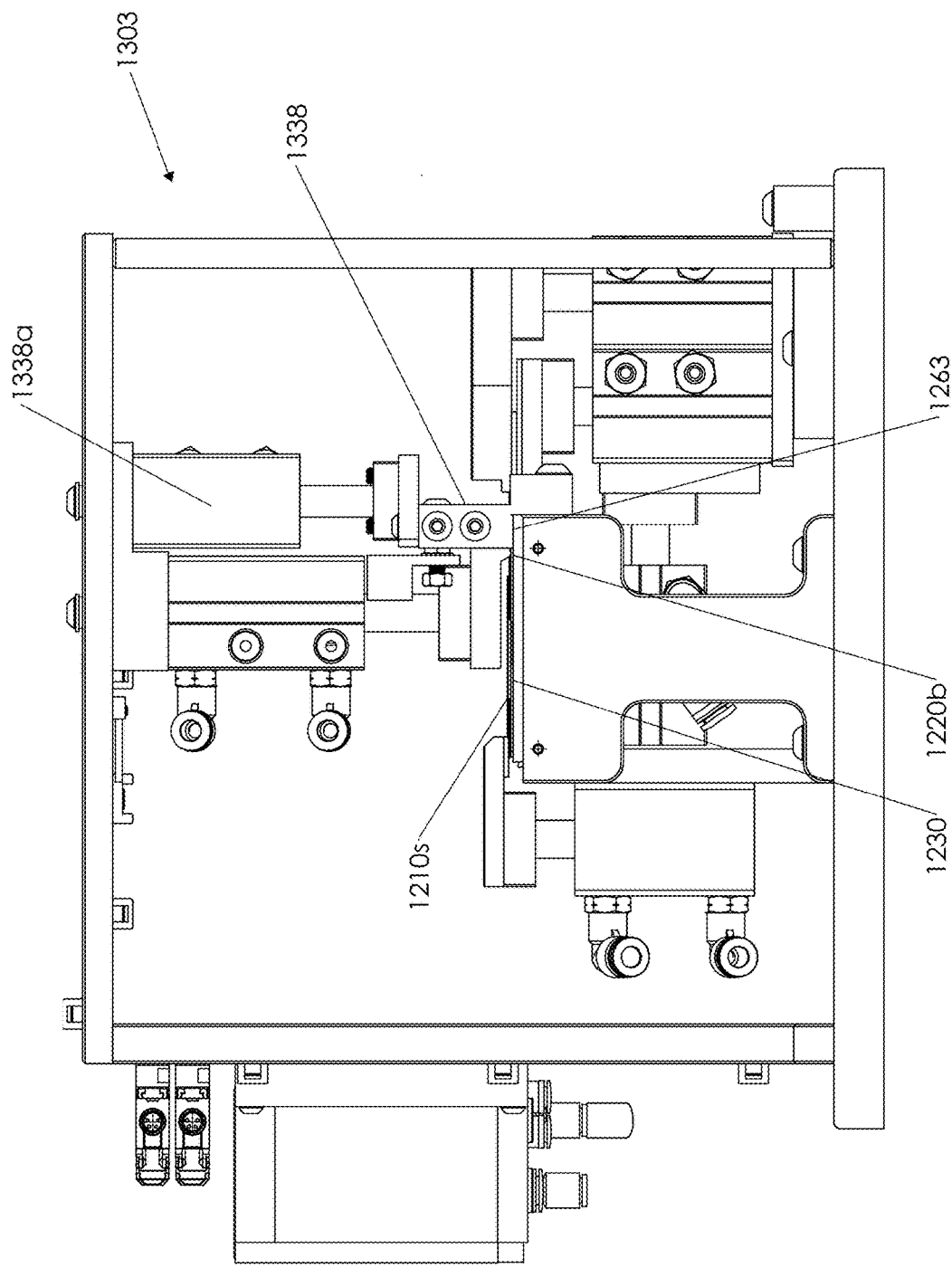
FIG. 15G is a side view of the Manufacturing Assembly of FIG. 15A at a subsequent step.
Figure 15H:
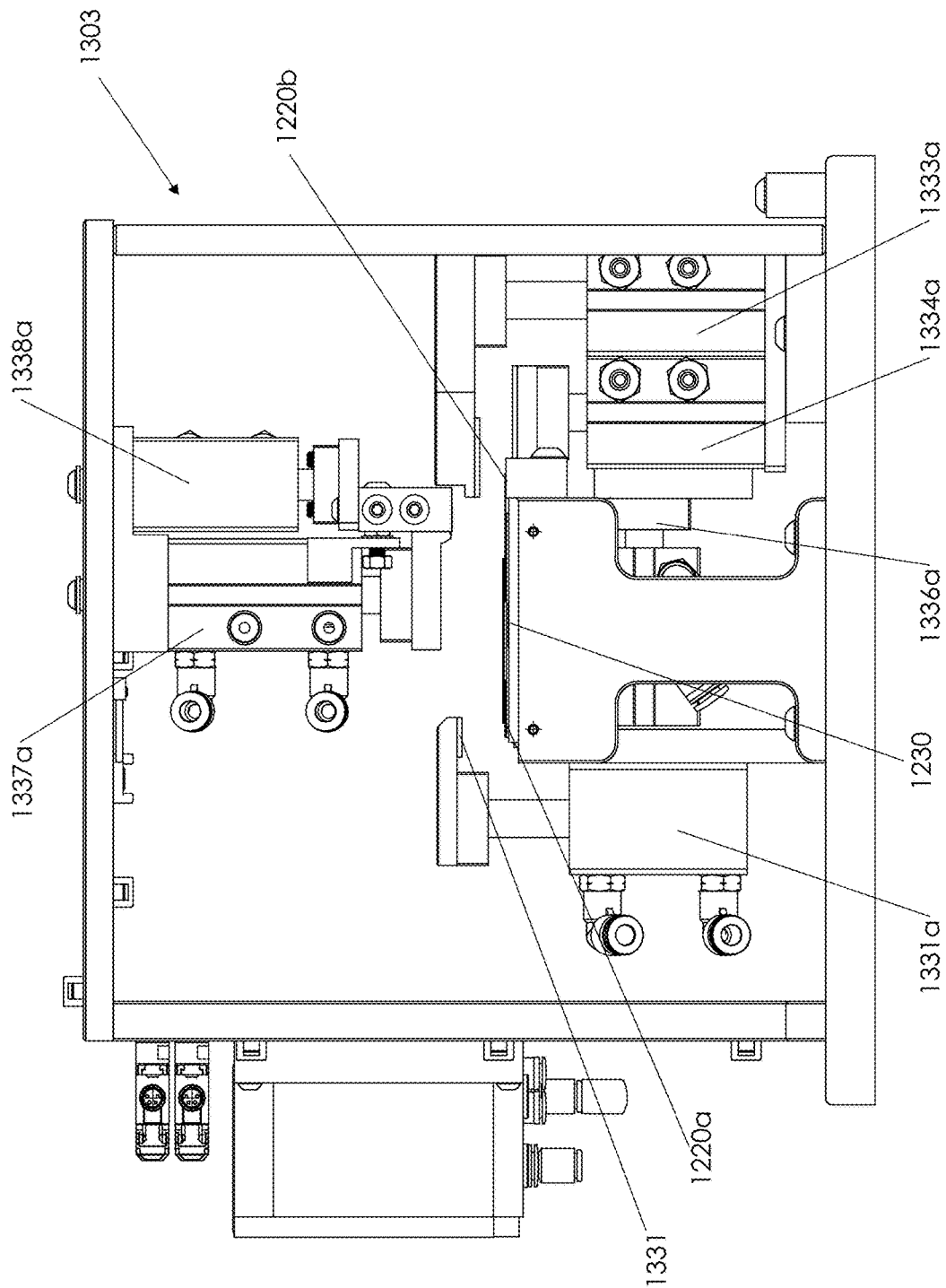
FIG. 15H is a side view of the Manufacturing Assembly of FIG. 15A at a subsequent step.

FIGS. 15A to 15H depict the straining and sealing mechanisms of the third subunit 1303 performing the functions depicted in FIG. 16C. In FIG. 15A, the precursor dressing assembly 1200 with the unstrained dressing 1210 enters the subunit 1303. A straining unit 1332 with a clamp 1331 is actuated by an actuator 1331*a* against the attachment structure 1220*a* and an edge of the support structure 1230 that were previously heat sealed in the second subunit. In FIG. 15B, the free flap 1229 of the opposing attachment structure 1220*b* is then engaged by upper/second and lower/third clamps 1333, 1334 by actuating the actuator 1333*a* of the upper clamp 1333 against the lower clamp 1334. In FIG. 15C, the actuator 1334*a* of the lower clamp 1334 is actuated to lift the dressing 1210 up and away from its support structure 1230 via the clamped attachment structure 1220*b*. In FIG. 15D, the entire straining unit 1332 is then laterally displaced using an actuator 1336*a* of a lateral displacement assembly 1336, thereby straining the dressing 1210*s* through its attachment structure 1220*b*, since the opposing attachment structure 1220*a* remains clamped. Next, in FIG. 15E, the actuator 1334*a* of the lower clamp 1334 is actuated to lower the strained dressing 1210*s* back down onto the support structure 1220. In FIG. 15F, the fourth clamp 1337 is lowered by its actuator 1337*a* to further facilitate the clamping of the attachment structure 1220*b*, so that strained dressing 1210*s* is maintained in a strained configuration on the support structure 1230. In FIG. 15G, the actuator 1338*a* of the heat seal element 1338 is lowered by its actuator 1338*a* to thereby heat seal the attachment structure 1220*b* to the support structure 1230, to form the second heat seal 1263. Then, in FIG. 15H, the actuators 1338*a*, of the heat seal element 1338 is retracted along with the actuator 1337*a* of the fourth clamp 1337. The actuators 1331*a*, 1333*a* of the first and upper/second clamps 1331, 1333 are also retracted to unclamp the attachment structures 1220*a*, 1220*b* and support structure 1230, and the actuator 1336*a* of the lateral displacement assembly 1336 is reverted back to a non-strained position or configuration. The dressing assembly 1200 is then ready for the fourth subunit.

The fourth subunit 1304, which may be configured as a removal or cutting module, comprises a clamp 1341 arranged to clamp the previously created heat seal 1262. The fourth subunit 1304 further comprises a heating element 1342 arranged to heat or melt the flap 1229 to facilitate cutting or severing. The fourth subunit 1304 further comprises a knife or other cutting element 1443 (e.g. a PEEK knife blade) arranged to strike and/or cut the flap 1229. The fourth subunit 1304 further comprises an air jet 1344 arranged to remove debris or waste.

Figure 16D:
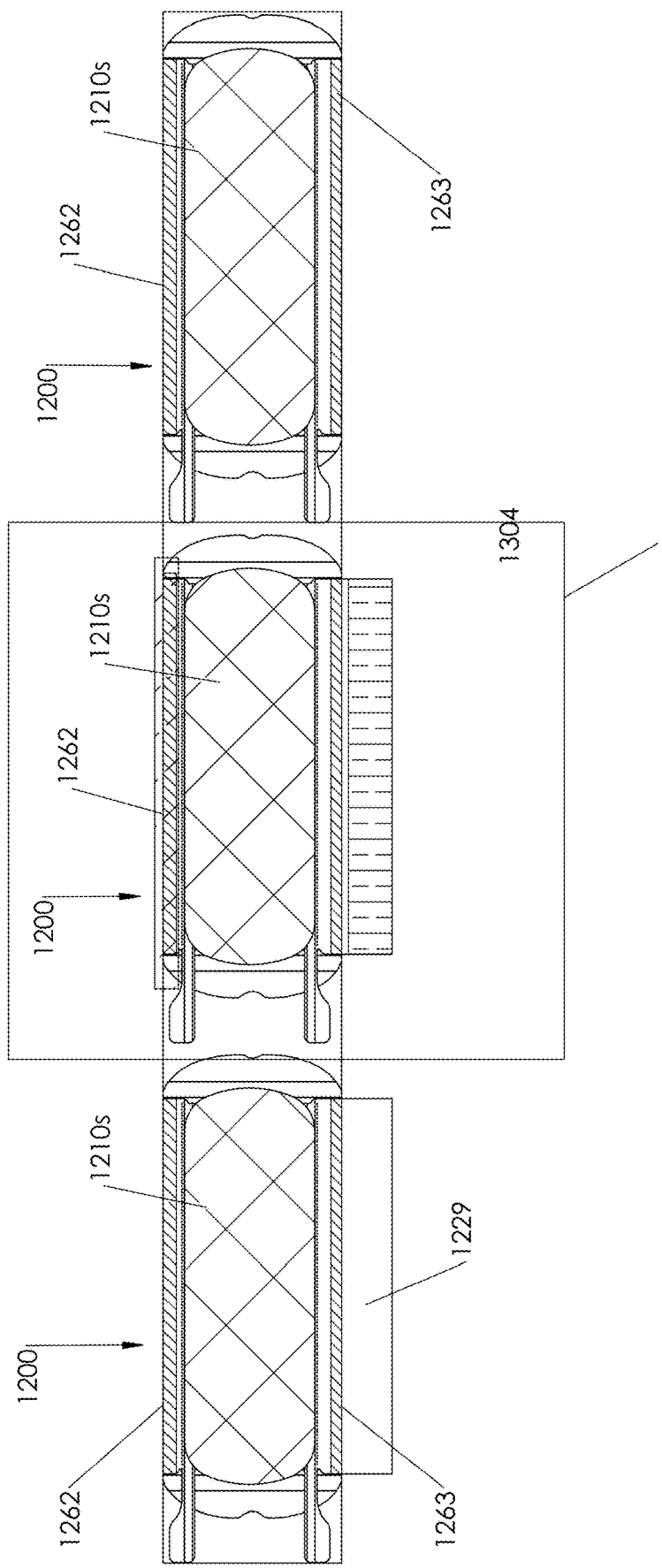
FIG. 16D is a top schematic view of a dressing assembly before, during and after a stage of the manufacturing assembly of FIG. 13.

As shown in FIG. 16D, the precursor dressing assembly 1200, when entering the fourth subunit 1304, has a flap 1229 remaining. When the precursor dressing assembly 1200 leaves the fourth subunit 1304, the flap 1229 is removed from the precursor dressing assembly 1200.

Referring back to FIG. 13, the fifth subunit 1305, which may be a liner applicator module, comprises an indexer 1351 configured to index a liner 1050 on a carrier roll or carrier strip into position over the skin adhesive layer of the dressing 1210. A laminator 1352 laminates or otherwise applies the liner 1050 on the adhesive side of the strained dressing 1210*s* via a liner carrier (not shown).

Figure 16E:
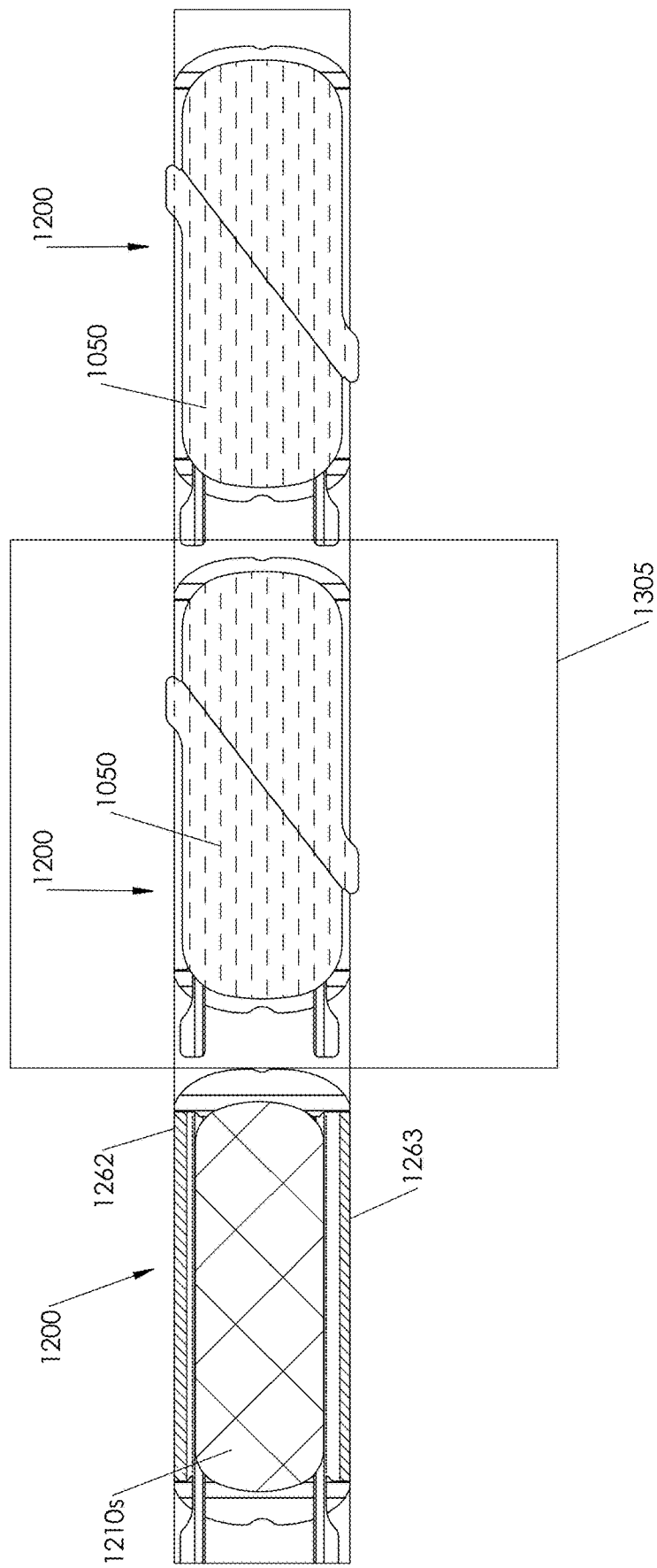
FIG. 16E is a top schematic view of a dressing assembly before, during and after a stage of the manufacturing assembly of FIG. 13.

As shown in FIG. 16E, the precursor dressing assembly 1200, when entering the fifth subunit 1305, does not have a liner 1050. When the precursor dressing assembly 1200 leaves the fifth subunit 1305, it is a finished dressing assembly with a liner 1050. This application may be performed by a roller, clamp or press. After the application of the liner 1050, the roller, clamp or press mechanism is lifted up, pulled away or separated from the strained dressing 1210*s* or liner 1050. The liner carrier may be separated or pulled away from the liner 1050 at this time or later along the manufacturing process. Likewise, the device carrier 1205 may be separated or pulled away from the support structure 1030 simultaneously, before or after the removal of the liner carrier.

While the subject matter herein has been particularly shown and described with references to embodiments thereof, it will be understood by those skilled in the art that various changes in form and details may be made therein without departing from the scope of the invention. For all of the embodiments described above, the steps of the methods need not be performed sequentially.

The invention claimed is:

1. A method of making a strained treatment device, comprising:
   attaching a device carrier to a precursor dressing assembly;
   removing a manufacturing liner from the precursor dressing assembly;
   heat melting a first region of the dressing to a first region of a support structure;
   straining the dressing and heat melting a second region of the dressing in a strained configuration to a second region of the support structure; and
   applying an adhesive liner.

2. The method of claim 1, wherein the dressing further comprises a first and second attachment structures.

3. The method of claim 1, further comprising:
   attaching a straining element to the dressing; and
   pulling the straining element away from the first region of the dressing to strain the dressing.

4. The method of claim 3, further comprising:
   lifting the straining element before pulling the straining element; and
   lowering the straining element after pulling the straining element.

5. The method of claim 3, wherein attaching the straining element to the dressing occurs after the heat melting of the first region.

6. The method of claim 2, wherein heat melting the first and second regions of the dressing are located in on the first and second attachment structures.

7. The method of claim 6, wherein the first and the second attachment structures each comprise two lengths of perforations spaced apart from each other.

8. The method of claim 7, wherein the heat melting of the first and second regions is performed lateral to the two lengths of perforations on each of the attachment structures.

* * * * *